United States Patent
Joslin et al.

(10) Patent No.: US 11,834,585 B2
(45) Date of Patent: *Dec. 5, 2023

(54) METAL PACKAGING POWDER COATING COMPOSITIONS, COATED METAL SUBSTRATES, AND METHODS

(71) Applicant: SWIMC LLC, Cleveland, OH (US)

(72) Inventors: Richard D. Joslin, Moon Township, PA (US); Charles I. Skillman, Zelienople, PA (US); Joseph Desousa, Pittsburgh, PA (US)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,494

(22) Filed: Dec. 30, 2021

(65) Prior Publication Data

US 2022/0228006 A1 Jul. 21, 2022

Related U.S. Application Data

(63) Continuation of application No. 17/097,929, filed on Nov. 13, 2020, now Pat. No. 11,248,127.

(Continued)

(51) Int. Cl.

| B05D 1/38 | (2006.01) |
|---|---|
| C09D 5/03 | (2006.01) |
| C09D 133/04 | (2006.01) |
| C09D 123/00 | (2006.01) |
| C09D 167/00 | (2006.01) |

(Continued)

(52) U.S. Cl.
CPC .............. C09D 5/031 (2013.01); B05D 1/007 (2013.01); B05D 1/38 (2013.01); B65D 23/0821 (2013.01);

(Continued)

(58) Field of Classification Search
None
See application file for complete search history.

(56) References Cited

U.S. PATENT DOCUMENTS

| 2,108,044 A | 2/1938 | Crawford et al. |
|---|---|---|
| 2,725,304 A | 11/1955 | Landrigan et al. |

(Continued)

FOREIGN PATENT DOCUMENTS

| CN | 1166178 A | 11/1997 |
|---|---|---|
| CN | 1671774 A | 9/2005 |

(Continued)

OTHER PUBLICATIONS

Cheng et al., "Thermal analysis of poly(butylene terephthalate) for heat capacity, rigid-amorphous content, and transition behavior," *Macromolecular Chemistry and Physics*, 1988; 189(10):2443-2458.

(Continued)

*Primary Examiner* — Shamim Ahmed
*Assistant Examiner* — Bradford M Gates
(74) *Attorney, Agent, or Firm* — Mueting Raasch Group

(57) ABSTRACT

Powder coating compositions, particularly metal packaging powder coating compositions, coated metal substrates, and methods; wherein the powder coating compositions include powder polymer particles comprising a polymer having a number average molecular weight of at least 2000 Daltons, wherein the powder polymer particles have a particle size distribution having a D50 of less than 25 microns; and, in certain embodiments, one or more charge control agents in contact with the powder polymer particles.

28 Claims, 3 Drawing Sheets

Related U.S. Application Data

(60) Provisional application No. 63/056,472, filed on Jul. 24, 2020, provisional application No. 62/935,404, filed on Nov. 14, 2019.

(51) Int. Cl.
  B65D 23/08 (2006.01)
  C09D 171/00 (2006.01)
  B05D 1/00 (2006.01)
  B05D 1/12 (2006.01)
  B05D 3/06 (2006.01)
  B05D 3/02 (2006.01)

(52) U.S. Cl.
  CPC ............ *C09D 5/034* (2013.01); *C09D 5/037* (2013.01); *C09D 123/00* (2013.01); *C09D 133/04* (2013.01); *C09D 167/00* (2013.01); *C09D 171/00* (2013.01); *B05D 1/12* (2013.01); *B05D 3/0272* (2013.01); *B05D 3/067* (2013.01); *B05D 2401/32* (2013.01)

(56) References Cited

U.S. PATENT DOCUMENTS

| | | | |
|---|---|---|---|
| 3,647,696 A | 3/1972 | Olson | |
| 3,893,935 A | 7/1975 | Jadwin et al. | |
| 4,093,571 A | 6/1978 | Gordon et al. | |
| 4,206,064 A | 6/1980 | Kiuchi et al. | |
| 4,224,396 A | 9/1980 | Pollet | |
| 4,338,390 A | 7/1982 | Lu | |
| 4,460,266 A | 7/1984 | Kopp et al. | |
| 4,528,257 A | 7/1985 | Polderman et al. | |
| 4,729,925 A | 3/1988 | Chen et al. | |
| 4,833,060 A | 5/1989 | Nair et al. | |
| 4,960,666 A | 10/1990 | Weagley et al. | |
| 4,965,131 A | 10/1990 | Nair et al. | |
| 5,212,032 A | 5/1993 | Wilson et al. | |
| 5,242,994 A | 9/1993 | Nield et al. | |
| 5,258,471 A | 11/1993 | Nield et al. | |
| 5,314,751 A | 5/1994 | Nield et al. | |
| 5,370,961 A | 12/1994 | Zaretsky et al. | |
| 5,434,653 A | 7/1995 | Takizawa et al. | |
| 5,450,789 A | 9/1995 | Hasegawa | |
| 5,464,884 A | 11/1995 | Nield et al. | |
| 5,609,979 A | 3/1997 | Lawson | |
| 5,639,514 A | 6/1997 | Jones et al. | |
| 5,697,028 A | 12/1997 | Kobayashi et al. | |
| 5,707,743 A | 1/1998 | Janes et al. | |
| 5,978,639 A | 11/1999 | Masuda et al. | |
| 6,038,420 A | 3/2000 | Hirabayashi et al. | |
| 6,150,021 A | 11/2000 | Blatter et al. | |
| 6,342,273 B1 * | 1/2002 | Handels ................ | D21H 23/50 427/598 |
| 6,512,024 B1 | 1/2003 | Pate et al. | |
| 6,650,860 B2 | 11/2003 | Broddin et al. | |
| 6,719,422 B2 | 4/2004 | Wu et al. | |
| 6,893,678 B2 | 5/2005 | Hirose et al. | |
| 6,955,736 B2 | 10/2005 | Rosenberger et al. | |
| 6,971,421 B2 | 12/2005 | Takagi | |
| 7,189,787 B2 | 3/2007 | O'Brien | |
| 7,198,849 B2 | 4/2007 | Stapperfenne et al. | |
| 7,279,506 B2 | 10/2007 | Sisler et al. | |
| 7,481,884 B2 | 1/2009 | Stelter et al. | |
| 7,592,047 B2 | 9/2009 | O'Brien et al. | |
| 7,670,642 B2 | 3/2010 | Pickering et al. | |
| 7,803,415 B2 | 9/2010 | Kiefer-Liptak et al. | |
| 7,820,832 B2 | 10/2010 | Yasumura et al. | |
| 7,910,170 B2 | 3/2011 | Evans et al. | |
| 7,981,515 B2 | 7/2011 | Ambrose et al. | |
| 8,007,978 B2 | 8/2011 | Klier et al. | |
| 8,101,328 B2 | 1/2012 | Lincoln et al. | |
| 8,119,719 B2 | 2/2012 | Park et al. | |
| 8,133,557 B2 | 3/2012 | Parekh et al. | |
| 8,163,850 B2 | 4/2012 | Marsh et al. | |
| 8,168,276 B2 | 5/2012 | Cleaver et al. | |
| 8,193,275 B2 | 6/2012 | Moncla et al. | |
| 8,349,929 B2 | 1/2013 | Kainz et al. | |
| 8,367,171 B2 | 2/2013 | Stenson et al. | |
| 8,574,672 B2 | 11/2013 | Doreau et al. | |
| 8,668,976 B2 | 3/2014 | Wu et al. | |
| 8,673,533 B2 | 3/2014 | Klier et al. | |
| 8,722,299 B2 | 5/2014 | Sacripante et al. | |
| 8,722,787 B2 | 5/2014 | Romick et al. | |
| 8,779,053 B2 | 7/2014 | Lundgard et al. | |
| 8,791,204 B2 | 7/2014 | Choudhery | |
| 8,946,329 B2 | 2/2015 | Wilbur et al. | |
| 9,000,074 B2 | 4/2015 | Choudhery | |
| 9,011,999 B2 | 4/2015 | Cavallin et al. | |
| 9,096,772 B2 | 8/2015 | Lespinasse et al. | |
| 9,115,241 B2 | 8/2015 | Gao et al. | |
| 9,138,985 B1 | 9/2015 | Yang et al. | |
| 9,181,448 B2 | 11/2015 | Li et al. | |
| 9,187,213 B2 | 11/2015 | Prouvost et al. | |
| 9,206,332 B2 | 12/2015 | Cavallin et al. | |
| 9,280,077 B2 | 3/2016 | Tsunemi et al. | |
| 9,321,935 B2 | 4/2016 | Seneker et al. | |
| 9,394,456 B2 | 7/2016 | Rademacher et al. | |
| 9,409,219 B2 | 8/2016 | Niederst et al. | |
| 9,416,291 B2 | 8/2016 | Wilbur et al. | |
| 9,428,663 B2 | 8/2016 | Song et al. | |
| 9,487,619 B2 | 11/2016 | Kuo et al. | |
| 9,547,246 B2 | 1/2017 | Klier et al. | |
| 9,598,601 B2 | 3/2017 | Malotky et al. | |
| 9,598,602 B2 | 3/2017 | Kuo et al. | |
| 9,632,443 B2 | 4/2017 | Noda et al. | |
| 9,639,015 B2 | 5/2017 | Morales-Tirado et al. | |
| 9,650,176 B2 | 5/2017 | Cavallin et al. | |
| 9,650,539 B2 | 5/2017 | Kuo et al. | |
| 9,683,064 B2 | 6/2017 | Rollinson et al. | |
| 9,695,264 B2 | 7/2017 | Lock et al. | |
| 9,708,504 B2 | 7/2017 | Singer et al. | |
| 9,751,107 B2 | 9/2017 | Decker et al. | |
| 9,828,522 B2 | 11/2017 | Argyropoulos et al. | |
| 9,920,217 B2 | 3/2018 | Skillman et al. | |
| 9,977,383 B2 | 5/2018 | Noda et al. | |
| 10,045,938 B2 | 8/2018 | Doshi | |
| 10,066,113 B2 | 9/2018 | Loccufier et al. | |
| 10,071,563 B2 | 9/2018 | Pervan | |
| 10,073,366 B2 | 9/2018 | Nagata et al. | |
| 10,125,218 B2 | 11/2018 | Wu et al. | |
| 10,131,796 B2 | 11/2018 | Martinoni et al. | |
| 10,328,680 B2 | 6/2019 | Pervan | |
| 10,474,050 B2 | 11/2019 | Watanabe et al. | |
| 10,792,910 B2 | 10/2020 | Ziegenbalg et al. | |
| 10,875,076 B2 | 12/2020 | Scott | |
| 10,894,891 B2 | 1/2021 | Marti Abril et al. | |
| 10,894,892 B2 | 1/2021 | Marti Abril | |
| 10,894,893 B2 | 1/2021 | Marti Abril et al. | |
| 11,248,127 B2 * | 2/2022 | Joslin ................... | C09D 133/08 |
| 11,499,061 B2 | 11/2022 | Marti Abril | |
| 2004/0018109 A1 | 1/2004 | Blatter et al. | |
| 2004/0259989 A1 | 12/2004 | O'Brien et al. | |
| 2006/0014858 A1 | 1/2006 | Takano | |
| 2006/0110601 A1 * | 5/2006 | Hennessey ............ | B05D 5/083 427/180 |
| 2007/0043156 A1 | 2/2007 | Mestach et al. | |
| 2007/0140742 A1 | 6/2007 | Slattery et al. | |
| 2008/0032222 A1 | 2/2008 | Stelter et al. | |
| 2009/0174755 A1 | 7/2009 | Boyd et al. | |
| 2011/0045397 A1 | 2/2011 | Kuroda et al. | |
| 2012/0270983 A1 | 10/2012 | Skillman et al. | |
| 2013/0115301 A1 | 5/2013 | Bele et al. | |
| 2013/0206756 A1 * | 8/2013 | Niederst ................ | B21D 5/00 220/62.12 |
| 2013/0280455 A1 | 10/2013 | Evans et al. | |
| 2013/0287451 A1 | 10/2013 | Yamamoto et al. | |
| 2013/0316109 A1 | 11/2013 | Niederst et al. | |
| 2014/0319133 A1 | 10/2014 | Castelberg et al. | |
| 2015/0021323 A1 | 1/2015 | Niederst et al. | |
| 2015/0034649 A1 | 2/2015 | Ramsey et al. | |
| 2015/0291804 A1 * | 10/2015 | Martinoni ............. | C09D 133/08 427/195 |
| 2015/0344732 A1 | 12/2015 | Witt-Sanson et al. | |

(56) References Cited

U.S. PATENT DOCUMENTS

| | | |
|---|---|---|
| 2016/0009941 A1 | 1/2016 | Rademacher et al. |
| 2016/0016687 A1 | 1/2016 | Ramsey et al. |
| 2016/0160075 A1 | 6/2016 | Seneker et al. |
| 2016/0280957 A1 | 9/2016 | Agata et al. |
| 2016/0297994 A1 | 10/2016 | Kuo et al. |
| 2016/0376446 A1 | 12/2016 | Gibanel et al. |
| 2017/0002227 A1 | 1/2017 | Gibanel et al. |
| 2017/0087589 A1 | 3/2017 | Yoshino et al. |
| 2017/0173626 A1 | 6/2017 | Ishizuka et al. |
| 2017/0173627 A1 | 6/2017 | Mikami et al. |
| 2017/0204289 A1 | 7/2017 | Kurtz et al. |
| 2018/0244862 A1 | 8/2018 | Price |
| 2018/0265729 A1 | 9/2018 | Gibanel et al. |
| 2019/0062589 A1 | 2/2019 | Skillman et al. |
| 2019/0112100 A1 | 4/2019 | Scott |
| 2019/0193112 A1 | 6/2019 | Saito et al. |
| 2020/0002555 A1 | 1/2020 | Marti Abril |
| 2020/0207516 A1 | 7/2020 | Seneker et al. |
| 2021/0147692 A1 | 5/2021 | Joslin et al. |
| 2022/0228006 A1 | 7/2022 | Joslin et al. |

FOREIGN PATENT DOCUMENTS

| | | |
|---|---|---|
| CN | 103347963 A | 10/2013 |
| CN | 106010150 A | 10/2016 |
| CN | 106552747 A | 4/2017 |
| CN | 106890773 A | 6/2017 |
| CN | 106890774 A | 6/2017 |
| CN | 107922667 A | 4/2018 |
| CN | 108025493 A | 5/2018 |
| CN | 112280478 A | 1/2021 |
| EP | 1 267 214 A1 | 12/2002 |
| EP | 1 293 835 B1 | 9/2007 |
| EP | 2 270 602 A1 | 1/2011 |
| JP | H11-300271 A | 11/1999 |
| JP | 2002-194289 A | 7/2002 |
| JP | 2004-000891 A | 1/2004 |
| KR | 20110135479 A | 12/2011 |
| WO | WO 1996/015199 A1 | 5/1996 |
| WO | WO 2007/006780 A2 | 1/2007 |
| WO | WO 2011/019840 A1 | 2/2011 |
| WO | WO 2012/078681 A1 | 6/2012 |
| WO | WO 2012/109278 A2 | 8/2012 |
| WO | WO 2014/078618 A1 | 5/2014 |
| WO | WO 2014/140057 A1 | 9/2014 |
| WO | WO 2015/057932 A1 | 4/2015 |
| WO | WO 2015/160788 A1 | 10/2015 |
| WO | WO 2015/164703 A1 | 10/2015 |
| WO | WO 2015/179064 A1 | 11/2015 |
| WO | WO 2016/196174 A1 | 12/2016 |
| WO | WO 2016/196190 A1 | 12/2016 |
| WO | WO 2017/040893 A1 | 3/2017 |
| WO | WO 2017/112837 A1 | 6/2017 |
| WO | WO 2017/122170 A1 | 7/2017 |
| WO | WO 2017/180895 A1 | 10/2017 |
| WO | WO 2018/075762 A1 | 4/2018 |
| WO | WO 2018/085052 A9 | 5/2018 |
| WO | WO 2018/125895 A1 | 7/2018 |
| WO | WO 2019/046700 A1 | 3/2019 |
| WO | WO 2019/046750 A1 | 3/2019 |
| WO | WO 2019/060403 A1 | 3/2019 |
| WO | WO 2019/078925 A1 | 4/2019 |
| WO | WO 2021/097308 A1 | 5/2021 |
| WO | WO 2021/105970 A1 | 6/2021 |
| WO | WO 2022/246120 A1 | 11/2022 |
| WO | WO 2022/246127 A1 | 11/2022 |

OTHER PUBLICATIONS

"Comparison Between Dynamic Image Analysis, Laser Diffraction and Sieve Analysis," Microtrac MRB, Aug. 9, 2017. Online [retrieved Nov. 9, 2020]. Retrieved from the Internet: <URL:https://www.azom.com/article.aspx?ArticleID=14331>; 15 pgs.

Galliford, "Chemically Prepared Toner (CPT)", No date available, believed to be as early as Oct. 2016, Galliford Consulting and Marketing, 12 pages. Available on the internet: <http://gallifordconsulting.com/wp-content/uploads/2016/10/Chemically-Prpared-Toner-Basics.pdf>.

Galliford, "Manufacturing Color Toner—Who How and Where", Aug. 24, 2021, Hot Industry Issues, Technologies, 9 pages. Available on the internet: <https://www.rtmworld.com/features/manufacturing-color-toner-who-how-and-where>.

"Guidance for Industry: Preparation of Premarket Submissions for Food Contact Substances (Chemistry Recommendations)," Office of Food Additive and Safety, Food and Drug Administration, FDA Docket No. FDA-2013-S-0610, Dec. 2007. Online [retrieved Nov. 9, 2020]. Retrieved from the Internet:<URL:https://www.regulations.gov/docket?D=FDA-2013-S-0610>; 23 pgs.

Hogan, Jr. et al., "Charged Droplet Dynamics in the Submicrometer Size Range," J. Phys. Chem. B, 2009, 113(4):970-976.

International Search Report and Written Opinion for International Application No. PCT/US2020/060538, dated Feb. 16, 2021, 7 pages.

International Preliminary Report on Patentability dated May 27, 2022 for International Application No. PCT/US2020/060538 filing date Nov. 13, 2020, 6 pages.

International Application No. PCT/US2022/030120, filed May 19, 2022, International Search Report and Written Opinion dated Aug. 23, 2022, 9 pages.

International Application No. PCT/US2022/030129, filed May 19, 2022, International Search Report and Written Opinion dated Sep. 6, 2022, 8 pages.

International Standard ASTM D1238-13, (2013), "Standard test method for melt flow rates of thermoplastics by extrusion plastometer," 16 pages.

International Standard ASTM D3418-15, (2015), "Standard Test Method for Transition Temperatures and Enthalpies of Fusion and Crystallization of Polymers by Differential Scanning Calorimetry," 7 pages.

International Standard ASTM D 3359-17, (2017), "Standard Test Methods for Rating Adhesion by Tape Test," 9 pages.

International Standard ASTM D4145-10, (2010, Reapproved 2018), "Standard Test Method for Coating Flexibility of Prepainted Sheet," 4 pages.

International Standard ASTM D 5768-02 (Reapproved 2006) entitled "Standard Test Method for Determination of Iodine Values of Tall Oil Fatty Acids," 4 pages.

International Standard ASTM D7481-18, (2018), "Standard Test Methods for Determining Loose and Tapped Bulk Densities of Powders using a Graduated Cylinder," 4 pages.

International Standard ISO 13322-2:2006(E), (2006), "Particle Size Analysis—Image analysis methods—Part 2: Dynamic image analysis methods," 32 pages.

International Standard ISO 13320:2009(E), (2009), "Particle size analysis—Laser diffraction methods," 60 pages.

Jones, "Chapter 6: Carrier Materials for Imaging", 2002, Handbook of Imaging Materials, $2^{nd}$ Edition, Diamond, et al., editors, Marcel Dekker, Inc. New York, New York. Title Page, copyruight information page, and pp. 209-238.

Julien, et al. "Chapter 5: Dry Toner Technology", 2002, Handbook of Imaging Materials, $2^{nd}$ Edition, Diamond, et al., editors, Marcel Dekker, Inc, New York, New York, Title page, copyright page, and pp. 173-208.

Kmiecik-Lawrynowicz, "New EA Toners for High Quality Digital Color Printing," DPP2003: IS&Ts International Conference on Digital Production Printing and Industrial Application, Barcelona, Spain. Online [retrieved Nov. 9, 2020]. Retrieved from the Internet: <URL:https://www.imaging.org/site/PDFS/Papers/2003/DPP-0-289/9025.pdf>; 3 pgs.

"Printing Toners Market to Exceed $5.5bn by 2024," Global Market Insights, Inc., Oct. 18, 2017. Online [retrieved Nov. 9, 2020]. Retrieved from the Internet: <URL:https://www.globenewswire.com/news-release/2017/10/18/1149093/0/en/Printing-Toners-Market-to-exceed-5-5bn-by-2024-Global-Market-Insights-Inc.html#:~:text=Printing%20Toners%20Market%20share%20will,printing%20toners%20market%20by%202024>; 4 pgs.

(56) References Cited

OTHER PUBLICATIONS

Ragelis, Extraction Test Method for Flexible Barrier Materials, *Journal of A.O.A.C.*, Apr. 1, 1964; 47(2):386-388.
*RT Imaging World*, 2021, Issue 119, Comexposium Recycling Times Exhibition Services Limited (RT) and RT ImagingWorld, 48 pages.
Schein, Electrophotography and Development Physics, Springer Series in Electrophysics, 1988; vol. 14. Title page, copyright page, and table of contents pages, 6 pages total.
Stelter, et al., "Powder Coating and Printing on Metal with Electrophotographic Technology," Jan. 17, 2015, NexPress Solutions, Inc., 12 pages.
Tyagi, "Polyester-Based Chemically Prepared Toner for High-Speed Digital Production Printing," 2007, NIP23 and Digital Fabrication Final Program and Proceedings, Society for Imaging Science and Technology, pp. 270-273.
Chao; "Application of degassing agent to gas-permeable powder coatings", Jun. 2008, *Electroplating & Finishing*, 27(6):49-50. With English Abstract.
Chinese Office Action for CN 202080077995.5 issued by the Chinese Patent Office dated Oct. 9, 2023; 24 pgs. Including machine translation of Office action in English.

\* cited by examiner

METAL PACKAGING POWDER COATING COMPOSITIONS, COATED METAL SUBSTRATES, AND METHODS

CROSS-REFERENCE TO RELATED APPLICATIONS

This is a continuation application of U.S. patent application Ser. No. 17/097,929, filed Nov. 13, 2020, which claims the benefit of U.S. Provisional Application Ser. No. 62/935,404, filed Nov. 14, 2019, and U.S. Provisional Application Ser. No. 63/056,472, filed Jul. 24, 2020, each of which are incorporated herein by reference in their entireties.

BACKGROUND

A wide variety of liquid applied coating compositions have been used to provide hardened coatings on the surfaces of metal packaging articles (e.g., food and beverage cans, metal closures). For example, metal cans are sometimes coated with liquid coating compositions using "coil coating" or "sheet coating" operations, i.e., a planar coil or sheet of a suitable substrate (e.g., steel or aluminum metal) is coated with a suitable liquid coating composition, which is subsequently hardened (e.g., cured). The coated substrate then is formed into the can end or body. Alternatively, liquid coating compositions may be applied (e.g., by spraying, dipping, rolling, etc.) to the formed article and then hardened (e.g., cured) to form a continuous coating.

Metal packaging coatings should preferably be capable of high-speed application to the substrate and provide the necessary properties when hardened to perform in this demanding end use. For example, the hardened coating should preferably be safe for food contact, not adversely affect the taste of the packaged food or beverage product, have excellent adhesion to the substrate, resist staining and other coating defects such as "popping," "blushing" and/or "blistering," and resist degradation over long periods of time, even when exposed to harsh environments. In addition, the hardened coating should generally be capable of maintaining suitable film integrity during can fabrication and be capable of withstanding the processing conditions to which the can may be subjected during product packaging. The hardened coating should also generally be capable of surviving routine can drop events (e.g., from a store shelf) in which the underlying metal substrate is dented, without rupturing or cracking.

Liquid packaging coatings largely satisfy the needs of the rigid metal packaging market today, but there are some notable disadvantages associated with their use. Liquid coatings contain large volumes of water and/or organic solvents that contribute to shipping costs. Then as the liquid coating composition is applied, a significant amount of energy must be expended, often in the form of burning fossil fuels, to remove the water or solvent during the coating hardening process. Once organic solvent is driven out of the hardening film, it either contributes to Volatile Organic Content (VOC) generation or it must be mitigated by large, energy-consuming, thermal oxidizers. Additionally, these processes can emit significant volumes of carbon dioxide.

One alternative to conventional liquid packaging coatings is the use of laminate coatings. In this process, a laminated or extruded plastic film is adhered to the metal via a heating step. The product is a coated metal substrate that can then be used to produce various food and beverage can parts. The process required to produce laminate films is only compatible with a limited number of thermoplastic materials (e.g., the materials must have the tensile strength required to be stretched into thin films). There is also a limit on the extent to which such films can be stretched, restricting how thin the final coating can be applied on the substrate. There can also be a significant capital investment required to retrofit an existing can-making line to accept laminated steel or aluminum.

Another alternative, powder coating, has seen narrow utility in rigid metal packaging (e.g., powdered side seam stripes for welded can bodies). Its use is limited, however, because the relatively large particle size of traditionally ground powders (greater than 30 microns) is not amenable to the low film thickness required for packaging coatings (typically less than 10 microns).

Although smaller particles (e.g., 5 microns) can be formed using grinding/milling techniques, the low molecular weights of these polymeric materials (a limitation of the properties required for such intense grinding) are not believed to be amenable to forming films having the performance standards required of metal packaging coatings needed in the food and beverage industry.

There are methods available to produce finer particle sizes other than mechanical methods such as grinding (i.e., chemically produced powders), but traditional powder application of such fine powders often results in inconsistent or otherwise low-quality films.

What is needed is an improved coating composition for rigid metal packaging applications, which overcomes the above disadvantages associated with conventional liquid, powder, and laminate packaging coating compositions.

SUMMARY

The present disclosure provides powder coating compositions, particularly metal packaging (e.g., a food, beverage, aerosol, or general packaging container (e.g., can), portion thereof, or a metal closure) powder coating compositions, coated metal substrates, and methods—method of making a metal packaging powder coating composition, method of coating a metal substrate, and method of making a metal packaging container (e.g., a food, beverage, or aerosol can), a portion thereof, or a metal closure for a container.

In one embodiment, a metal packaging powder coating composition (i.e., a coating composition in the form of a free-flowing powder) is provided. The powder coating composition includes: powder polymer particles comprising a polymer having a number average molecular weight of at least 2000 Daltons, wherein the powder polymer particles have a particle size distribution having a D50 of less than 25 microns; and one or more charge control agents in contact with the powder polymer particles.

The powder polymer particles are preferably chemically produced. Preferably, the powder polymer particles are not mechanically produced, e.g., ground polymer particles or polymer particles formed from other similar fracturing or pulverization processes. More preferably, the powder polymer particles are spray dried powder particles.

In one embodiment, a method of making a metal packaging powder coating composition is provided. The method includes: providing powder polymer particles comprising a polymer having a number average molecular weight of at least 2000 Daltons; wherein the powder polymer particles have a particle size distribution having a D50 of less than 25 microns; and applying one or more charge control agents to the powder polymer particles and forming a powder coating composition; wherein the powder coating composition is a metal packaging coating composition.

In one embodiment, a method of coating a metal substrate suitable for use in forming metal packaging (e.g., a container such as a food, beverage, or aerosol container, a portion thereof, or a metal closure) is provided. The method includes: providing a metal packaging powder coating composition, wherein the powder coating composition comprises powder polymer particles including a polymer having a number average molecular weight of at least 2000 Daltons, wherein the powder polymer particles have a particle size distribution having a D50 of less than 25 microns; directing the powder coating composition to at least a portion of the metal substrate, wherein the metal substrate has an average thickness of up to 635 microns; and providing conditions effective for the powder coating composition to form a hardened continuous adherent coating on at least a portion of the metal substrate, wherein the hardened continuous adherent coating has an average thickness of up to 100 microns (preferably up to 50 microns, more preferably up to 25 microns, even more preferably up to 20 microns, still more preferably up to 15 microns, and most preferably up to 10 microns).

In one embodiment, a coated metal substrate including a metal substrate having a hardened continuous adherent coating disposed on at least a portion of a surface thereof is provided, wherein: the metal substrate has an average thickness of up to 635 microns; the hardened continuous adherent coating has an average thickness of up to 100 microns (preferably up to 50 microns, more preferably up to 25 microns, even more preferably up to 20 microns, still more preferably up to 15 microns, and most preferably up to 10 microns); and the hardened continuous adherent coating is formed from a metal packaging powder coating composition. Such powder coating composition includes: powder polymer particles including a polymer having a number average molecular weight of at least 2000 Daltons, wherein the powder polymer particles have a particle size distribution having a D50 of less than 25 microns; and preferably a lubricant.

In one embodiment, a method of making metal packaging (e.g., a container such as a food, beverage, aerosol, or general packaging container, a portion thereof, or a metal closure, which may be used for a metal container or container of other materials, e.g., glass) is provided. The method includes: providing a metal substrate having a continuous adherent coating disposed on at least a portion of a surface thereof; and forming the substrate into at least a portion of a metal packaging container, a portion thereof, or a metal closure. The metal substrate has an average thickness of up to 635 microns. The hardened continuous adherent coating is formed from a metal packaging powder coating composition; wherein the powder coating composition preferably includes a lubricant and powder polymer particles, wherein the powder polymer particles comprise a polymer having a number average molecular weight of at least 2000 Daltons, and wherein the powder polymer particles have a particle size distribution having a D50 of less than 25 microns.

Herein, "metal packaging" coating compositions refer to coating compositions that are suitable for coating on rigid metal directly (as opposed to, e.g., a free-standing plastic film of at least 10 microns thick, paper or other fibrous material, or metal foil, which is then applied (e.g., adhered) to rigid metal packaging), or indirectly on a pre-treatment layer or a primer layer that is not derived from a free-standing film (i.e., a film formed before being applied to another substrate, such as by lamination) overlying a substrate. Thus, by way of example, a powder coating composition applied either to a paper layer overlying a metal substrate, or to a laminated plastic layer overlying a metal substrate, is not a metal packaging coating composition as used herein.

The particle size may be determined by laser diffraction particle size analysis for starting materials (e.g., primary polymer particles, charge control agents, lubricants, etc.), using a Beckman Coulter LS 230 Laser Diffraction Particle Size Analyzer or equivalent, calibrated as recommended by the manufacturer. The particle size of the polymer agglomerates and powder polymer compositions may be determined by laser diffraction particle size analysis, or by dynamic image analysis (DIA), which measures size (as well as other parameters) based on particle images, according to, e.g., ISO 13322-2 (2006) test method, using a CAMSIZER X2 device (Retsch Technology GmbH, Haan, Germany) equipped with the X-Jet plug-in cartridge and its related software, according to device manufacturer's recommendations. Alternatively, differential mobility analysis (DMA), followed by detection using an aerodynamic particle spectrometer (APS) or optical particle spectrometer (OPS) (*J. Phys. Chem. B,* 2009, 113, 970-976), may be used to determine particle size distribution of starting materials, polymer agglomerates, or powder polymer compositions.

The D-values—D50, D90, D95, and D99—are the particle sizes which divide a sample's volume into a specified percentage when the particles are arranged on an ascending particle size basis. For example, for particle size distributions the median is called the D50 (or ×50 when following certain ISO guidelines). The D50 is the particle size in microns that splits the distribution with half above and half below this diameter. The Dv50 (or Dv0.5) is the median for a volume distribution. The D90 describes the particle size where ninety percent of the distribution has a smaller particle size and ten percent has a larger particle size. The D95 describes the particle size where ninety five percent of the distribution has a smaller particle size and five percent has a larger particle size. The D99 describes the particle size where ninety nine percent of the distribution has a smaller particle size and one percent has a larger particle size. Unless specified otherwise herein, D50, D90, D95, and D99 refer to $D_v50$, $D_v90$, $D_v95$, and $D_v99$, respectively. The D-values specified herein may be determined by laser diffraction particle size analysis, DIA, or DMA.

A "powder coating composition" refers to a composition that includes powder particles and does not include a liquid carrier, although it may include trace amounts of water or an organic solvent that may have been used in the preparation of the powder particles. The powder coating composition is typically in the form of a finely divided free-flowing powder polymer particles, which may or may not be in the form of agglomerates.

Herein, an agglomerate (or cluster) is an assembly of particles, the latter of which are referred to as primary particles.

A "hardened" coating refers to one wherein particles are covalently cured via a crosslinking reaction (e.g., a thermoset coating) or simply fused into a continuous layer in the absence of a crosslinking reaction (e.g., a thermoplastic coating), and adhered to a metal substrate, thereby forming a coated metal substrate. The term "hardened" does not imply anything related to the relative hardness or softness (Tg) of a coating.

An "adherent" coating refers to a hardened coating that adheres to a substrate, such as a metal substrate, according to the Adhesion Test described in the Examples Section. An adhesion rating of 9 or 10, preferably 10, is considered to be adherent.

A "continuous" coating refers to a hardened coating that is free of pinholes and other coating defects that result in exposed substrate. Such film imperfections/failures can be indicated by a current flow measured in milliamps (mA) using the Flat Panel Continuity Test described in the Examples Section.

The term "substantially free" of a particular component means that the compositions or hardened coatings of the present disclosure contain less than 1,000 parts per million (ppm) of the recited component, if any. The term "essentially free" of a particular component means that the compositions or hardened coatings of the present disclosure contain less than 100 parts per million (ppm) of the recited component, if any. The term "essentially completely free" of a particular component means that the compositions or hardened coatings of the present disclosure contain less than 10 parts per million (ppm) of the recited component, if any. The term "completely free" of a particular component means that the compositions or hardened coatings of the present disclosure contain less than 20 parts per billion (ppb) of the recited component, if any.

The term "bisphenol" refers to a polyhydric polyphenol having two phenylene groups that each include six-carbon rings and a hydroxyl group attached to a carbon atom of the ring, wherein the rings of the two phenylene groups do not share any atoms in common. By way of example, hydroquinone, resorcinol, catechol, and the like are not bisphenols because these phenol compounds only include one phenylene ring.

The term "food-contact surface" refers to a surface of an article (e.g., a food or beverage can) intended for prolonged contact with food product. When used, for example, in the context of a metal substrate of a food or beverage container (e.g., can), the term generally refers to an interior metal surface of the container that would be expected to contact food product in the absence of powder coating composition applied thereon. By way of example, a base layer, intermediate layer, and/or polymer top-coat layer applied on an interior surface of a metal food or beverage can is considered to be applied on a food-contact surface of the can.

The term "on," when used in the context of a coating applied on a surface or substrate, includes both coatings applied directly (e.g., virgin metal or pre-treated metal such as electroplated steel) or indirectly (e.g., on a primer layer) to the surface or substrate. Thus, for example, a coating applied to a pre-treatment layer (e.g., formed from a chrome or chrome-free pretreatment) or a primer layer overlying a substrate constitutes a coating applied on (or disposed on) the substrate.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.).

The term "phenylene" as used herein refers to a six-carbon atom aryl ring (e.g., as in a benzene group) that can have any substituent groups (including, e.g., halogens, hydrocarbon groups, oxygen atoms, hydroxyl groups, etc.). Thus, for example, the following aryl groups are each phenylene rings: —$C_6H_4$—, —$C_6H_3(CH_3)$—, and —$C_6H(CH_3)_2Cl$—. In addition, for example, each of the aryl rings of a naphthalene group are phenylene rings.

Herein, the term "comprises" and variations thereof do not have a limiting meaning where these terms appear in the description and embodiments. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the embodiments, and the equivalents of those structures. Any of the elements that are positively recited in this specification as alternatives may be explicitly included in the embodiments or excluded from the embodiments, in any combination as desired. Although various theories and possible mechanisms may have been discussed herein, in no event should such discussions serve to limit the subject matter.

DETAILED DESCRIPTION OF ILLUSTRATIVE EMBODIMENTS

Figure 1A:
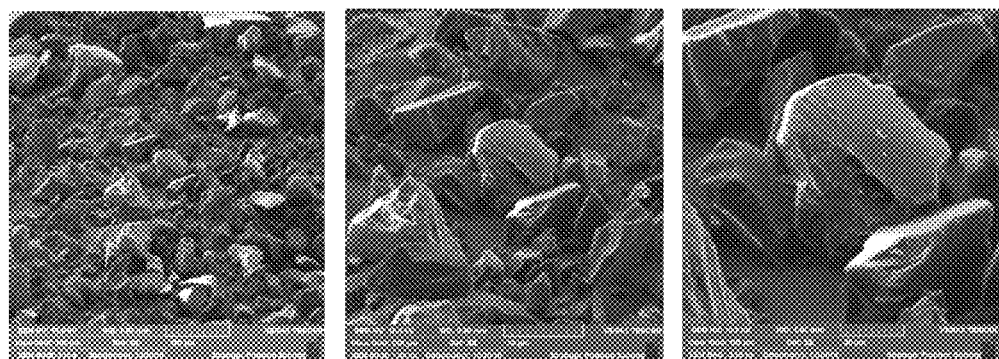
FIG. 1A is a scanning electron microscope (SEM) image of conventional milled polyester powder coating particles, which are too large and too angular for use in electromagnetic fields.

The present disclosure provides powder coating compositions (i.e., coating compositions), particularly metal packaging powder coating compositions, coated metal substrates, methods—e.g., method of making a metal packaging powder coating composition, method of coating a metal substrate, and method of making metal packaging (e.g., a container, a portion thereof, or a metal closure)—as well as the metal packaging. Examples of metal packaging containers include food, beverage, aerosol, and general metal packaging containers. Examples of metal closures include twist-off caps or lids with threads or lugs and crowns that are crimped on bottles. Such closures are metal but useful on metal or non-metal packaging containers.

The metal packaging powder coating compositions are particularly useful on food-contact surfaces of such metal packaging containers and metal closures. Although the metal packaging powder coating compositions of the present disclosure are particularly useful on a food-contact surface of a metal substrate, they may also be useful on other types of substrates for packaging foods, beverages, or other products such as glass (e.g., glass bottles), rigid and flexible plastic, foil, paper, paperboard, or substrates that are a combination thereof.

The resultant coated food-contact surfaces of metal packaging containers and metal closures of the present disclosure are particularly desirable for packaging liquid-containing products. Packaged products that are at least partially liquid in nature (e.g., wet) place a substantial burden on coatings due to intimate chemical contact with the coatings. Such intimate contact can last for months, or even years. Furthermore, the coatings may be required to resist pasteurization or cooking processes during packaging of the product. In the food or beverage packaging realm, examples of such liquid-containing products include beer, alcoholic ciders, alcoholic mixers, wine, soft drinks, energy drinks, water, water drinks, coffee drinks, tea drinks, juices, meat-based products (e.g., sausages, meat pastes, meat in sauces, fish, mussels, clams, etc.), milk-based products, fruit-based products, vegetable-based products, soups, mustards, pickled products, sauerkraut, mayonnaise, salad dressings, and cooking sauces.

Many coatings that are used to package dry products do not possess the stringent balance of coating properties necessary for use with the above "wet" products. For example, it would not be expected that a coating used on the interior of a decorative metal tin for individually packaged cookies would exhibit the necessary properties for use as an interior soup can coating.

Although containers of the present disclosure may be used to package dry powdered products that tend to be less aggressive in nature towards packaging coatings (e.g., powdered milk, powdered baby formula, powdered creamer, powdered coffee, powdered cleaning products, powdered medicament, etc.), due to the higher volumes in the marketplace, more typically the coatings will be used in conjunction with more aggressive products that are at least somewhat "wet" in nature. Accordingly, packaging coatings formed from powder coating compositions of the present disclosure are preferably capable of prolonged and intimate contact, including under harsh environmental conditions, with packaged products having one or more challenging chemical features, while protecting the underlying metal substrate from corrosion and avoiding unsuitable degradation of the packaged product (e.g., unsightly color changes or the introduction of odors or off flavors). Examples of such challenging chemical features include water, acidity, fats, salts, strong solvents (e.g., in cleaning products, fuel stabilizers, or certain paint products), aggressive propellants (e.g., aerosol propellants such as certain dimethyl-ethercontaining propellants), staining characteristics (e.g., tomatoes), or combinations thereof.

Accordingly, in certain embodiments, the metal packaging powder coating compositions, and preferably, the hardened coatings, of the present disclosure are substantially free of each of bisphenol A, bisphenol F, and bisphenol S, structural units derived therefrom, or both. In certain embodiments, the powder coating compositions, and preferably, the hardened coatings, of the present disclosure are essentially free of each of bisphenol A, bisphenol F, and bisphenol S, structural units derived therefrom, or both. In certain embodiments, the powder coating compositions, and preferably, the hardened coatings, of the present disclosure are essentially completely free of each of bisphenol A, bisphenol F, and bisphenol S, structural units derived therefrom, or both. In certain embodiments, the powder coating compositions, and preferably, the hardened coatings, of the present disclosure are completely free of each of bisphenol A, bisphenol F, and bisphenol S, structural units derived therefrom, or both.

In certain embodiments, the metal packaging powder coating compositions, and preferably the hardened coatings, of the present disclosure are substantially free of all bisphenol compounds, structural units derived therefrom, or both. In certain embodiments, the powder coating compositions, and preferably the hardened coatings, of the present disclosure are essentially free of all bisphenol compounds, structural units derived therefrom, or both. In certain embodiments, the powder coating compositions, and preferably the hardened coatings, of the present disclosure are essentially completely free of all bisphenol compounds, structural units derived therefrom, or both. In certain embodiments, the powder coating compositions, and preferably the hardened coatings, of the present disclosure are completely free of all bisphenol compounds, structural units derived therefrom, or both.

Preferably, tetramethyl bisphenol F (TMBPF) is not excluded from the powder coating compositions or hardened coatings of the present disclosure. TMBPF is 4-[(4-hydroxy-3,5-dimethylphenyl)methyl]-2,6-dimethylphenol, shown below, made by the following reaction:

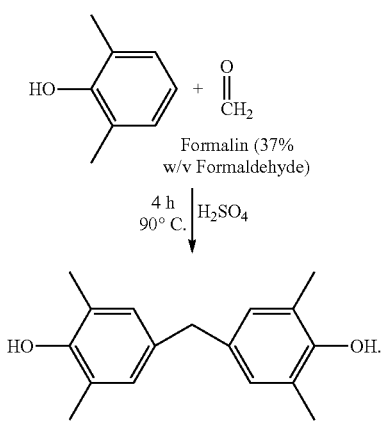

In this context, a "structural unit derived therefrom" is a sub-molecular component of any monomeric or polymeric molecule that derives its structure from the referenced molecule as a result of the referenced molecule being practically used in the direct synthesis thereof. By way of example, these include aromatic diglycidyl ether compounds (e.g., diglycidyl ethers of bisphenol (BADGE), diglycidyl ethers of bisphenol F (BFDGE)), and epoxy novalacs. Furthermore, as used herein, this term does not include TMBPF (i.e., TMBPF is not derived from bisphenol F).

For example, a powder coating composition is not substantially free of bisphenol A that includes 600 ppm of bisphenol A and 600 ppm of the diglycidyl ether of bisphenol A (BADGE)—regardless of whether the bisphenol A and BADGE are present in the composition in reacted or unreacted forms, or a combination thereof.

The amount of bisphenol compounds (e.g., bisphenol A, bisphenol F, and bisphenol S) can be determined based on starting ingredients; a test method is not necessary and parts per million (ppm) can be used in place of weight percentages for convenience in view of the small amounts of these compounds.

Although intentional addition of bisphenol compounds is generally undesirable, it should be understood that non-intentional, trace amounts of bisphenols, may potentially be present in compositions or coatings of the present application due to, e.g., environmental contamination.

Although the balance of scientific evidence available to date indicates that the small trace amounts of these compounds that might be released from existing coatings does not pose any health risks to humans, these compounds are nevertheless perceived by some people as being potentially harmful to human health. Consequently, there is a desire by some to eliminate these compounds from coatings on food-contact surfaces.

Also, it is desirable to avoid the use of components that are unsuitable for such surfaces due to factors such as taste, toxicity, or other government regulatory requirements.

For example, in preferred embodiments, the powder coating composition is "PVC-free." That is, the powder coating composition preferably contains, if any, less than 2% by weight of vinyl chloride materials and other halogenated vinyl materials, more preferably less than 0.5% by weight of vinyl chloride materials and other halogenated vinyl materials, and even more preferably less than 1 ppm of vinyl chloride materials and other halogenated vinyl materials, if any.

In certain embodiments, as a general guide to minimize potential, e.g., taste and toxicity concerns, a hardened coating formed from the powder coating composition includes, if it includes any detectable amount, less than 50 ppm, less than 25 ppm, less than 10 ppm, or less than 1 ppm, extractables, when tested pursuant to the Global Extraction Test described in the Examples Section. An example of these testing conditions is exposure of the hardened coating to 10 wt-% ethanol solution for two hours at 121° C., followed by exposure for 10 days in the solution at 40° C.

In some embodiments, such reduced global extraction values may be obtained by limiting the amount of mobile or potentially mobile species in the hardened coating. In this context, "mobile" refers to material that may be extracted from a cured coating according to the Global Extraction Test of the Examples Section. This can be accomplished, for example, by using pure, rather than impure reactants, avoiding the use of hydrolyzable components or bonds, avoiding or limiting the use of low molecular weight additives that may not efficiently react into the coating, and using optimized cure conditions optionally in combination with one or more cure additives. This makes the hardened coatings formed from the powder coating compositions described herein particularly desirable for use on food-contact surfaces.

In certain embodiments, the powder coating composition includes at least 50 weight percent (wt-%), at least 60 wt-%, at least 70 wt-%, at least 80 wt-%, or at least 90 wt-% of the powder polymer particles, based on the total weight of the powder coating composition. In certain embodiments, the powder coating composition includes up to 100 wt-%, up to 99.99 wt-%, up to 95 wt-%, or up to 90 wt-%, of the powder polymer particles, based on the total weight of the powder coating composition. Various optional additives (e.g., charge control agent, lubricant, etc.) can be present in an amount up to 50 wt-%, based on the total weight of the powder coating composition.

In certain embodiments, the powder polymer particles are in contact with one or more charge control agents. In certain embodiments, one or more charge control agents are on a surface of the powder polymer particles. In certain embodiments, one or more charge control agents are adhered to a surface of the powder polymer particles.

In certain embodiments, one or more charge control agents are present in an amount of at least 0.01 weight percent (wt-%), at least 0.1 wt-%, or at least 1 wt-%, based on the total weight of the powder coating composition (e.g., the charge control agent(s) and powder polymer particles). In certain embodiments, one or more charge control agents are present in an amount of up to 10 wt-%, up to 9 wt-%, up to 8 wt-%, up to 7 wt-%, up to 6 wt-%, up to 5 wt-%, up to 4 wt-%, or up to 3 wt-%, based on the total weight of the powder coating composition (e.g., the charge control agent(s) and powder polymer particles).

Preferred powder coating compositions herein are "dry" powder coating compositions. That is, the powder particles are not dispersed in a liquid carrier, but rather are present in dry powder form. It should be understood, however, that in certain embodiments the dry powder may contain a de minimis amount of water or organic solvent (e.g., less than 2 wt-%, less than 1 wt-%, less than 0.1 wt-%, etc.). Even when subjected to drying processes, powders will typically include at least some residual liquid, for example, such as might be present from atmospheric humidity.

Powder Coating Composition and Method of Making

In one embodiment, a metal packaging (e.g., a food, beverage, or aerosol can) powder coating composition (i.e., a coating composition in the form of a free-flowing powder) is provided. Such compositions can form a hardened adherent coating on a substrate, such as a metal substrate. In particular, such compositions may also be useful for coating food, beverage, or aerosol cans, general metal packaging cans or other containers, portions thereof, or metal closures for metal packaging containers or other containers (e.g., closures for glass jars). The powder coating composition includes powder polymer particles and preferably one or more charge control agents in contact with the powder polymer particles (e.g., present on, and typically adhered to, surfaces of the powder polymer particles).

Polymer Particles

The molecular weight of the polymer in the powder coating composition may be described by a few key metrics given that a typical polymer covers a range of molecular weights. Number average molecular weight (Mn) is determined by dividing the total weight of a sample by the total number of molecules in that sample. Weight average molecular weight (Mw) is determined by calculating the sum of each distinct molecular weight in the sample multiplied by the weight fraction of the sample at that molecular weight. Polydispersity index (Mw/Mn) is used to express how broad the molecular weight range is of the sample. The higher the polydispersity index, the broader the molecular weight range. The Mn, Mw, and Mw/Mn can all be determined by Gel Permeation Chromatography (GPC), measured against a set of polystyrene standards of varying molecular weights.

In certain embodiments, the number average molecular weight (Mn) of the polymer of the powder particles is at least 2000 Daltons, at least 5,000 Daltons, at least 10,000 Daltons, or at least 15,000 Daltons. In certain embodiments, the Mn of the polymer of the powder particles is in the millions (e.g., 10,000,000 Daltons), such as can occur with emulsion polymerized acrylic polymers or certain other emulsion polymerized latex polymers, although in certain embodiments the Mn is up to 10,000,000 Daltons, up to 1,000,000 Daltons, up to 100,000 Daltons, up to 20,00 Daltons. In certain embodiments, the Mn of the polymer of the polymer particles is at least 2000 Daltons and up to 10,000,000 Daltons, at least 5000 Daltons and up to 1,000,000 Daltons, at least 10,000 Daltons and up to 100,000 Daltons, or at least 15,000 Daltons and up to 20,000 Daltons.

In certain embodiments, the powder polymer particles are made from a polymer having a polydispersity index (Mw/Mn) of less than 4, less than 3, less than 2, or less than 1.5. In certain other embodiments, it may be advantageous, however, for the polymer to have a polydispersity index outside the preceding ranges. For example, without intending to be bound by theory, it may be desirable to have a higher polydispersity index to achieve the benefits of both higher molecular weight (e.g., for flexibility and other mechanic properties) and lower molecular weight (e.g., for flow and leveling) in the same material.

The powder polymer particles have a particle size distribution having a D50 of less than 25 microns, less than 20 microns, less than 15 microns, or less than 10 microns. In certain embodiments, the powder polymer particles have a particle size distribution having a D90 of less than 25 microns, less than 20 microns, less than 15 microns, or less than 10 microns. In certain embodiments, the powder polymer particles have a particle size distribution having a D95 of less than 25 microns, less than 20 microns, less than 15 microns, or less than 10 microns. In certain embodiments, the powder polymer particles have a particle size distribution having a D99 of less than 25 microns, less than 20 microns, less than 15 microns, or less than 10 microns.

In certain embodiments, the powder coating composition as a whole (i.e., all of the particles of the overall powder coating composition or the overall composition) has a particle size distribution having a D50 of less than 25 microns, less than 20 microns, less than 15 microns, or less than 10 microns. In certain embodiments, the powder coating composition as a whole has a particle size distribution having a D90 of less than 25 microns, less than 20 microns, less than 15 microns, or less than 10 microns. In certain embodiments, the powder coating composition as a whole has a particle size distribution having a D95 of less than 25 microns, less than 20 microns, less than 15 microns, or less than 10 microns. In certain embodiments, the powder coating composition as a whole has a particle size distribution having a D99 of less than 25 microns, less than 20 microns, less than 15 microns, or less than 10 microns.

The particle size distributions described herein (e.g., D50, D90, D95, D99, etc.) are not restricted on the lower particle size end. In some embodiments, however, the D50 (in certain embodiments, the D90, D95, or D99) may be greater than 1 micron, greater than 2 microns, greater than 3 microns, or greater than 4 microns.

The above particle size distributions (e.g., D50, D90, D95, and D99) should be interpreted to factor in any additional materials that may optionally be present on the surface of some, or all, of the polymer particles. Thus, by way of example, if the polymer particles have a D50 of 6.5 microns prior to application of an optional charge control agent, and a D50 of 7 microns after application of the optional charge control agent, as well as in the fully formulated powder coating composition, then 7 microns is the pertinent D50 for the final polymer particles.

In embodiments in which one or more charge control agents are present on the surface of the polymer particles, the above particle size distributions (e.g., D50, D90, D95, and D99, whether determined by laser diffraction particle size analysis, DIA, or DMA), apply to the overall polymer particles inclusive of the charge control agent(s) present on the polymer particles.

Although the powder polymer powder particles, and optionally also the overall coating composition (i.e., powder coating composition as a whole), preferably have a narrow or very narrow distribution of particle sizes in an effort to get a very smooth coating (e.g., as opposed to an orange-peel appearance), as well as to minimize the amount of applied coating material and thus cost, it is contemplated that powder coating compositions of the disclosure may include polymer particles having particle sizes outside the particle size parameters described above. Preferably, the total amount of such optional "larger" and/or "smaller" polymer particles or other particles included in the powder coating composition is sufficiently low so that the desired properties of the powder coating composition and/or hardened coating are substantially preserved (e.g., the desired application properties of the powder coating composition; the desired adhesion, flexibility, chemical resistance, coating aesthetics, etc., of the cured coating). In such embodiments, preferably a substantial majority, by volume %, (e.g., 65% or more, 80% or more, 90% or more, 95% or more, 99% or more, etc.) of the total particles present in the powder coating composition exhibit a particle size pursuant to the particle size parameters described above.

A useful method for determining particle sizes of the primary polymer particles before agglomeration and other starting materials (e.g., charge control agents, lubricants, etc.) is laser diffraction particle size analysis. An exemplary device for such analysis is a Beckman Coulter LS 230 Laser Diffraction Particle Size Analyzer or equivalent, calibrated as recommended by the manufacturer. It is believed that the particle size analysis of this analyzer embodies the principles of International Standard ISO 13320:2009(E).

Samples for laser diffraction particle size analysis can be prepared, for example, by diluting the samples in a substantially non-swelling solvent (such as cyclohexanone or 2-butoxyethanol) and shaking them until evenly dispersed. The choice of a suitable solvent will depend upon the particular particles to be tested. Solvent screening tests may need to be conducted to identify a suitable substantially non-swelling solvent. By way of example, a solvent in which a polymer particle swells by about 1% or less (as determined by laser diffraction particle size analysis) would be considered a substantially non-swelling solvent.

A useful method for determining particle sizes of the polymer powder particles, which may or may not be agglomerated, or the powder coating compositions, is also laser diffraction particle size analysis or dynamic image analysis (DIA). DIA measures size (as well as other parameters) based on particle images, according to, e.g., ISO 13322-2 (2006) test method, using a CAMSIZER X2 device (Retsch Technology GmbH, Haan, Germany) equipped with the X-Jet plug-in cartridge and its related software, according to device manufacturer's recommendations. For samples where a measurable portion of the powder coating particles may be less than one micron in diameter, laser diffraction particle size analysis (using, for example, the instrument listed above) is a suitable substitute for DIA.

The DIA method uses a flow of particles passing a camera system in front of an illuminated background. A dynamic image analysis system measures free falling particles and suspensions, and also features dispersion by air pressure for those particles that are inclined to agglomerate. A wide range of size and shape parameters are measured using particle images. Size parameters typically include length, width, and diameter of an equivalent circle. The particle width is the common DIA parameter used to compare to sieve analysis.

Powder samples for dynamic image analysis can be prepared, for example, by dispersing a sample of the powder to be measured in an appropriate fluid. The prepared samples can then be measured in a dynamic image analyzer such as the CAMSIZER X2, which employs a dynamic imaging technique, rather than actual physical sieving of the particles. Samples are dispersed by pressurized air and passed through a gap illuminated by two bright, pulsed LED light sources. The images of the dispersed particles (more specifically of their shadows, or projections) are then recorded by two digital cameras and analyzed for size and shape in order to determine a variety of length and width descriptors for the particles, as required, e.g., by ISO test method 13322-2 (2006) (on particle size analysis via dynamic imaging). Such descriptors include, e.g., the width of the particle (i.e., the shortest chord of the measured set of maximum chords of a particle's projection (Camsizer parameter $X_c$ min, also called the minimum largest chord diameter)); the maximum Feret diameter (Camsizer parameter XFe max); or the aspect ratio AR (Camsizer parameter b/h). The particle width is the preferred particle size parameter since this parameter is most closely related to physical screening using sieving techniques. A particle with a width smaller than a sieve aperture is able to pass the sieve even if the length of such particle is larger than the width. Thus, the terms "particle size" and "sieve diameter" are nearly the same, and may be used interchangeably herein.

An alternative method for determining particle sizes of the polymer powder particles, which may or may not be agglomerated, the primary polymer particles before agglomeration and other starting materials (e.g., charge control agents, lubricants, etc.), or the powder coating compositions, uses differential mobility analysis (DMA). The particle charge could be determined by using differential mobility analysis (DMA) to separate particles based on their ion mobility, followed by detection using an aerodynamic particle spectrometer (APS) or optical particle spectrometer (OPS) to determine particle size distribution. Details of this approach are included by reference (*J. Phys. Chem. B*, 2009, 113, 970-976).

It will be understood by those skilled in the art that the particle size of the primary particles can be measured prior to the coating process, but this cannot be readily determined once agglomerates are formed. That is, the particle size of the primary particles that form agglomerates is determined based on the starting materials. Furthermore, to measure the particle size of agglomerates, a sample of the agglomerates is collected during the coating process (e.g., during a spray drying process). Once the coating is formed, an accurate determination of the particle size of the agglomerates cannot be readily determined.

Powder polymer particles of the disclosure may be of any suitable shape, including, for example, flake, sheet, rod, globular, potato-shaped, spherical, or mixtures thereof. For example, precipitated polymer particles are typically spherical. In certain embodiments, the particles are potato-shaped or spherical, or a mixture thereof.

While any suitable powder polymer particles may be used, preferred polymer particles are chemically produced polymer particles. Chemically produced powders can be generically defined as fine powders prepared by methods other than mechanical processing (e.g., other than by traditional grinding). Such polymer particles have surface morphologies and/or particle shapes that are distinct from those typically achieved via mechanical processing means (e.g., grinding, milling, and the like). Such mechanical techniques entail taking larger size solid masses of polymer material and breaking them up in some manner to produce smaller size polymer particles. Such processes, however, typically yield irregular, angular particle shapes and rough, irregular surface morphologies and result in wide particle size distributions, thereby necessitating additional filtering to achieve a desired particle size distribution, which results in waste and additional cost. The polymer particles resulting from such mechanical processes are often referred to as "pulverized" or "ground" (conventionally prepared) particles. By way of example, see FIG. 1A, which shows a scanning electron microscope (SEM) image of conventional milled polyester powder coating particles that are angular, irregular, and have a broad particle size distribution.

Figure 1B:
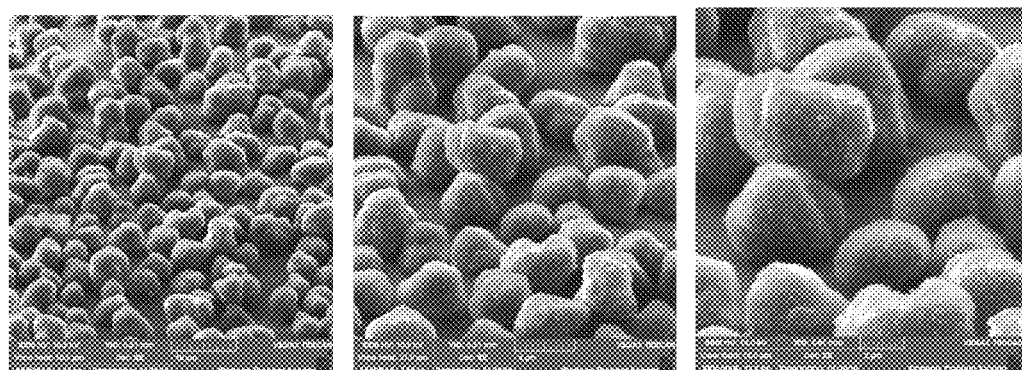
FIGS. 1B and 1C are SEMs of chemically produced polymer particles.
Figure 1C:
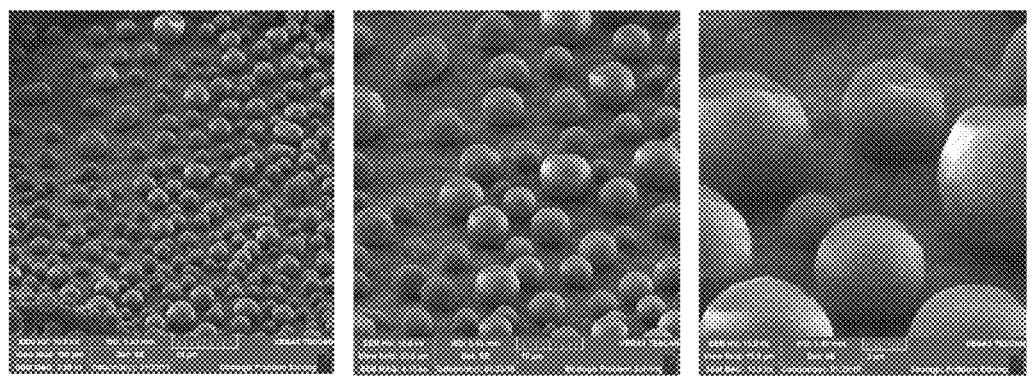

In contrast, chemically produced polymer particles tend to have more regular and smooth surface morphologies and more regular and consistent particle shapes and sizes. In addition, the particle size distribution can be more exactly targeted and controlled, without generating appreciable waste. While not intending to be bound by theory, it is believed the enhanced homogeneity and regularity of chemically produced particles (e.g., in terms of shape, surface morphology, and particle size distribution) relative to mechanically produced particles will lead to better and more predictable and efficient transfer and application onto substrate and ultimately better coating performance properties for hardened adherent packaging coatings produced therefrom. By way of example, see FIGS. 1B (generally potato shaped particles) and 1C (generally spherical particles), which show chemically produced polymer particles having a generally narrow particle size distribution.

Examples of chemical processes for producing polymer particles include polymerization, such as interfacial polymerization, polymerization in organic solution, emulsion or dispersion polymerization in aqueous medium; dispersion of polymers in surfactants (e.g., in disperse or continuous phases) using low molecular weight or polymeric hydrophilic, hydrophobic, or fluorophilic surfactants; precipitation of polymers, such as controlled precipitation; melt blending polymers; particle aggregation; microencapsulation; recrystallization; core-shell formation; as well as other processes that form "composite" powder polymer particles.

In certain embodiments, the powder polymer particles (in certain embodiments, all the particles of the overall powder coating composition) have a shape factor of at least 100, and in certain embodiments at least 120. In certain embodiments (e.g., using ground or pulverized particles), the shape factor may be up to 165, or up to 155, or up to 140. Accordingly, the particles may be spherical (having a shape factor of from 100 to less than 120) or potato shaped (having a shape factor of from at least 120 up to 140) or a mixture of spherical and potato shaped. In contrast, conventional mechanically produced polymer particles typically have a shape factor of greater than 145. In certain embodiments, the powder polymer particles are preferably potato shaped. The shape factor can be determined using the following equation:

$$\text{Shape Factor} = ((ML)^2 / A) \times (\pi/4)) \times 100$$

wherein: ML=Maximum Length of Particle (sphere=2r); and
A=Projected Area (sphere=$\pi r^2$).

Shape factor can be determined, for example, using a flow-type particle dynamic image analyzer (DIA) CAMSIZER X2. Particle shape parameters include convexity, sphericity, symmetry, and aspect ratio (ratio of length to width). The sample can be prepared, for example, using the sample preparation described herein for particle size measurement.

Shape factor can also be determined by Scanning Electron Microscopy (SEM), using image analysis to determine an aspect ratio. For example, a representative powder sample could be transferred to a piece of carbon adhesive tape and then examined using a Vega3 Tescan SEM. An image could then be obtained using either a secondary electron detector or a backscattering electron detector, at an appropriate accelerating voltage and detection angle to achieve acceptable contrast between the particles and the background. Imaging analysis could then be done on a statistically relevant number of particles to determine the average aspect ratio using, for example, MountainLabs Expert (version 8.0) software.

It may also be possible to determine particle shape via the DMA method described above (*J. Phys. Chem. B*, 2009, 113, 970-976).

In certain embodiments, the powder polymer particles (in certain embodiments, all the particles of the overall powder coating composition) have a compressibility index of at least 1, and in certain embodiments up to 20. In certain embodiments, the compressibility index may be 1 to 10, 11 to 15, or 16 to 20. The compressibility index can be determined using the following equation:

$$\text{Compressibility Index} = \\ ((\text{Tap Density} - \text{Bulk Density}) / (\text{Tap Density})) \times 100$$

wherein the tap density and the bulk are each determined pursuant to ASTM D7481-18 (2018).

In certain embodiments, the powder polymer particles (in certain embodiments, all the particles of the overall powder coating composition) have a Haussner Ratio of at least 1.00, and in certain embodiments up to 1.25. In certain embodiments, the Haussner Ratio is 1.00 to 1.11, 1.12 to 1.18, or 1.19 to 1.25. The Haussner Ratio can be determined using the following equation:

$$\text{Haussner Ratio} = \text{Tap Density} / \text{Bulk Density}$$

wherein tap density and bulk density are as defined/determined above.

In certain embodiments, the powder polymer particles have at least fair flow characteristics (e.g., have a compressibility index of 16 to 20 and a Haussner Ratio is 1.19 to 1.25), or at least good flow characteristics (e.g., have a compressibility index of 11 to 15 and a Haussner Ratio is 1.12 to 1.18), or excellent flow characteristics (e.g., have a compressibility index of 1 to 10 and a Haussner Ratio is 1.00 to 1.11).

Similar to the particle size distributions (e.g., D50 and the like) discussed above for the powder polymer particles, the shape factor, compressibility index, and Haussner Ratio, should be inclusive of any additional materials (e.g., charge control agent) that may optionally be present on the surface of the polymer particles in the final powder coating composition.

In preferred embodiments, the overall powder coating composition exhibits one or more of, two or more of, three or more of, four or more of, five or more of, and preferably all of, a D50, a D90, a D95, a D99, a shape factor, a compressibility index, and a Haussner Ratio falling within the ranges disclosed above for the powder polymer particles.

Although as discussed above, chemically produced powder polymer particles are presently preferred, mechanically produced particles (e.g., via grinding, milling, and the like) may be used. If used, such mechanically produced powder polymer particles should preferably (i) be used in minor amounts relative to the overall powder coating composition or (ii) exhibit both a particle size distribution and a shape factor, and preferably also a Hausner ratio, pursuant to the ranges disclosed herein. With respect to (ii) above, it may not be possible to achieve such powder polymer particle populations using currently available mechanical processing techniques, at least not without incurring prohibitive processing costs.

In certain embodiments, the powder polymer particles are in the form of agglomerates (i.e., assemblies of primary polymer particles). In certain embodiments, the agglomerates (i.e., clusters) may have a particle size of up to 25 microns, up to 20 microns, up to 15 microns, or up to 10 microns. Although the lower size range of the agglomerate particle sizes is not restricted, typically the particle sizes will be at least 1 micron, at least 2 microns, at least 3 microns, or at least 4 microns. In certain embodiments, the primary polymer particles have a primary particle size of at least 0.05 micron, and in certain embodiments, up to 8 microns, up to 5 microns, up to 3 microns, up to 2 microns, or up to 1 micron. The primary particle size may be determined by laser diffraction particle size analysis, or DMA, of starting materials, and the particle size of the polymer agglomerates (e.g., of the agglomerates collected during a spray drying process) may be determined by dynamic image analysis (DIA), laser diffraction particle size analysis, or DMA.

Agglomerated particles are typically formed by spray drying. Agglomerates are assemblies of primary particles, the latter of which are formed by a polymerization process. The spray drying process typically involves forming liquid droplets, wherein each droplet includes primary particles therein, using a spray nozzle. The droplets are then dried to form agglomerates (i.e., each of which is a cluster or assembly of the primary particles that were in each droplet). The particle size of an agglomerate, which may be referred to as the secondary particle size, is determined by the number of primary particles within the agglomerate. This can be controlled by the size of the liquid droplet and/or the concentration of primary particles within each droplet. For example, small agglomerates may be formed by increasing the spray nozzle pressure to form a fine mist of small droplets. Also, small agglomerates may be formed by reducing the concentration of the primary particles in the liquid, but using lower spray nozzle pressure and forming larger droplets.

Each powder polymer particle may be formed from a single type of polymer material or may include two or more different types of polymer materials. In addition to one or more types of polymer materials, if desired, the powder polymer particles, which may or may not be agglomerated, may incorporate up to 50 wt-% of one or more optional additives, based on the total weight of the powder polymer particles. Thus, preferably, the powder polymer particles include one or more polymers in an amount of at least 50 wt-%, based on the total weight of the powder polymer particles. More preferably, the powder polymer particles include one or more polymers in an amount of at least 60 wt-%, at least 70 wt-%, at least 80 wt-%, at least 90 wt-%, at least 95 wt-%, at least 98 wt-%, at least 99 wt-%, or 100 wt-%, based on the total weight of the powder polymer particles.

Such optional additives may include, for example, lubricants, adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, metal driers, and combinations thereof. Such optional additives may additionally, or alternatively, be present in other particles that are included in the powder coating composition in addition to the powder polymer particles.

The polymer particles may include any suitable combination of one or more thermoplastic polymers, one or more thermoset polymers, or a combination thereof. In certain embodiments, the polymer particles may include any suitable combination of one or more thermoplastic polymers. The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

In certain embodiments, the polymer material has a melt flow index greater than 15 grams/10 minutes, greater than 50 grams/10 minutes, or greater than 100 grams/10 minutes. In certain embodiments, the polymer material has a melt flow index of up to 200 grams/10 minutes, or up to 150 grams/10 minutes. In some embodiments, the powder coating composition as a whole exhibits such a melt flow index. The "melt flow index" referred to herein is measured pursuant to ASTM D1238-13 (2013) at 190° C. and with a 2.16 kilogram weight.

In certain embodiments, the polymer particles are made from semi-crystalline, crystalline polymers, amorphous polymers, or combinations thereof. Suitable semi-crystalline or crystalline polymers may exhibit any suitable percent crystallinity. In some embodiments, the powder coating composition of the disclosure includes at least one semi-crystalline or crystalline polymer having a percent crystallinity (on a volume basis) of at least 5%, at least 10%, or at least 20%. By way of example, the percent crystallinity for a given polymer may be assessed via differential scanning calorimetry (DSC) testing using the following equation:

$$\text{Percent crystallinity } (\%) = [A/B] \times 100$$

wherein: "A" is the heat of fusion of the given polymer (i.e., the total area "under" the melting portion of the DSC curve) in Joules per gram (J/g); and "B" is the heat of fusion in J/g for the 100% crystalline state of the polymer.

For many polymers, a theoretical B value may be available in the scientific literature and such value may be used. For polyester polymers, for example, if such a B value is not available in the literature, then a B value of 145 kg may be used as an approximation, which is the heat of fusion for 100% crystalline polybutylene terephthalate (PBT) as reported in: Cheng, Stephen; Pan, Robert; and Wunderlich, Bernard; "Thermal analysis of poly(butylene terephthalate) for heat capacity, rigid-amorphous content, and transition behavior," *Macromolecular Chemistry and Physics, Volume* 189, Issue 10 (1988): 2443-2458.

In certain embodiments of the powder coating compositions of the disclosure, at least one polymer material of the polymer particles (and more preferably substantially all, or all, of the polymer material present in the polymer particles) is at least semi-crystalline (e.g., semi-crystalline or crystalline). In certain embodiments, the polymer particles may include amorphous polymer material or a blend of at least semi-crystalline polymer material and amorphous polymer material. ASTM-D3418-15 (2015) is an example of a useful methodology for assessing the crystallization properties (crystallization peak temperature) of polymers.

The polymers used may exhibit any suitable glass transition temperature (Tg) or combinations of Tg's. In certain embodiments, the powder polymer particles are made from an amorphous polymer having a glass transition temperature (Tg) of at least 0° C., at least 30° C., at least 40° C., at least 50° C., at least 60° C., or at least 70° C. and in certain embodiments, a Tg of up to 150° C., up to 125° C., up to 110° C., up to 100° C., or up to 80° C.

Lower Tg polymers (e.g., having a Tg lower than 40° C., such as those with a Tg of at least 0° C. or at least 30° C.) may be used in making the powder polymer particles used herein at long as the particles include at least one polymer with a higher Tg (e.g., at least 40° C.).

The polymer particles may additionally be of a core-shell morphology (i.e., the outer portion, or shell, of the polymer particle is of a different composition than the inner portion, or core). In such cases, the shell ideally comprises 10% by weight or greater of the total polymer particles, and the Tg preferences above would only apply to the shell of the polymer particle. In other words, the shell of the polymer particle is preferably made from a polymer having a Tg of at least 40° C., at least 50° C., at least 60° C., or at least 70° C., and a Tg of up to 150° C., up to 125° C., up to 110° C., up to 100° C., or up to 80° C.

In certain embodiments, the powder polymer particles are made from a crystalline or semi-crystalline polymer having a melting point of at least 40° C., and in certain embodiments, a melting point of up to 130° C.

In certain preferred embodiments, substantially all (i.e., more than 50 wt-%) of the polymer material of the polymer particles exhibits such a melting point or Tg. Classic amorphous polymers do not, for example, exhibit any discernible melting point (e.g., do not exhibit a DSC melting peak) nor include any crystalline regions. Thus, such classic amorphous polymers would be expected to exhibit a percent crystallinity of 0%. Accordingly, powder coating compositions of the disclosure may include one or more amorphous polymers having a percent crystallinity of 0% or substantially 0%. If desired, however, powder coating compositions of the disclosure may include one or more "amorphous" polymers having a percent crystallinity other than 0 (e.g., less than 5%, less than 2%, less than 1%, less than 0.5%, less than 0.1%, etc.).

The one or more polymers of the polymer particles may be aliphatic or aromatic, or a combination of one or more aliphatic polymers and one or more aromatic polymers. Similarly, the one or more polymer may be saturated or unsaturated, or a combination of one or more saturated polymers and one or more unsaturated polymers.

Suitable polymer particles can be prepared from water (e.g., latex polymers) or from organic solvents (e.g., nonane, decane, dodecane, or isohexadecane), or combinations thereof. Water-based polymers are preferred because of cost considerations, to keep VOC levels down during processing, and to keep residual organic solvents out of the powder coating compositions.

In certain embodiments, the powder polymer particles are emulsion, suspension, solution, or dispersion polymerized polymer particles (i.e., particles made from an emulsion, suspension, solution, or dispersion polymerization process). Typically, such polymers include self-emulsifiable groups (e.g., carboxylic, sulphonic, phosphonic acid groups, or salts thereof), although this is not a requirement. Neutralizing agents (e.g., amines, ammonia, or ammonium hydroxide), particularly volatile ones, can also be used in making such polymer particles, as is well-known to those skilled in the art. Conversely, if desired, base groups that are neutralized with acids may also be used. Non-ionic polar groups may also alternatively or additional be used.

In certain embodiments, the powder polymer particles are precipitated polymer particles (i.e., particles made from a precipitation process). In certain embodiments, the powder polymer particles can be formed via polymerization in liquid media followed by a suitable drying process (e.g., spray drying, vacuum drying, fluid bed drying, radiant drying, flash drying, and the like.) In certain embodiments, the powder polymer particles can be formed via melt-blending (e.g., using a kneader, mixer, extruder, etc.) optionally coupled to a dispenser such as used for emulsification (see, e.g., U.S. Pat. No. 6,512,024 (Pate et al.) for a description of such process equipment). In certain embodiments, however, the powder polymer particles are not ground polymer particles or polymer particles formed from other similar fracturing or pulverization processes. Preferably, the powder polymer particles are spray dried particles.

In certain embodiments, the polymer of the powder polymer particles may be a polyacrylic (i.e., acrylic, acrylate, or polyacrylate), polyether, polyolefin, polyester, polyurethane, polycarbonate, polystyrene, or a combination thereof (i.e., copolymer or mixture thereof such as acrylonitrile butadiene styrene). In certain embodiments, the polymers may be engineering plastics. Engineering plastics are a group of thermoplastic materials that have better mechanical and/or thermal properties than the more widely used commodity plastics (such as polystyrene, polypropylene, and polyethylene). Examples of engineering plastics include acrylonitrile butadiene styrene (ABS), polycarbonates, and polyamides. Preferably, the polymer of the powder polymer particles is a polyacrylic, a polyether, a polyolefin, a polyester, or a combination thereof.

Individual particles may be made of one polymer or two or more polymers. Individual particles may be uniform throughout or have a "core-shell" configuration having 1, 2, 3, or more "shell" layers or have a gradient architecture (e.g., a continuously varying architecture). Such "core-shell" particles may include, for example, multi-stage latexes created via the emulsion polymerization of two or more different stages, emulsion polymerizations conducted using a polymeric surfactant, or combinations thereof. Populations of particles may include mixtures of polymers, including mixtures of uniform and core-shell particles.

In certain embodiments, the inclusion of a sufficient number of cyclic groups, and in some embodiments aryl and/or heteroaryl groups (e.g., phenylene groups), in the polymers is an important factor for achieving suitable coating performance for food-contact packaging coatings, especially when the product to be packaged is a so called "hard-to-hold" food or beverage product. Sauerkraut is an example of a hard-to-hold product. Although cyclic groups providing such performance are often aryl or heteroaryl groups, suitable aliphatic cyclic groups such as, e.g., aliphatic bridged bicyclic (e.g., norbornane or norbornene groups), aliphatic bridged tricyclic groups (e.g., tricyclodecane groups), or cyclobutane groups (e.g., as provided using structural units derived from 2,2,4,4-tetramethyl-1,3-cyclobutanediol), cyclobutene groups, or spirodicyclic groups (e.g., as provided using 3,9-bis(1,1-dimethyl-2-hydroxyethyl)-2,4,8,10-tetraoxaspiro[5.5]undecane (PSG)) may provide such performance.

In certain embodiments such as, for example, when the polymer particles are formed from certain polyether or polyester polymers, cyclic groups, and more preferably aryl and/or heteroaryl groups, preferably constitute at least 25 wt-%, more preferably at least 30 wt-%, even more preferably at least 35 wt-%, and optimally at least 45 wt-% of such polymers. The upper concentration of cyclic groups (e.g., aryl/heteroaryl groups) is not particularly limited, but preferably the amount of such groups is configured such that the Tg of the polymer is preferably within the Tg ranges discussed herein. The total amount of cyclic groups (e.g., aryl and/or heteroaryl groups) in such polymers will typically constitute less than about 80 wt-%, more preferably less than 75 wt-%, even more preferably less than about 70 wt-%, and optimally less than 60 wt-% of the polyether polymer. The total amount of cyclic groups (e.g., aryl and/or heteroaryl groups) in such polymers can be determined based on the weight of cyclic group-containing polymerizable compound (e.g., aryl- or heteroaryl-containing polymerizable compound) incorporated into the polymers and the weight fraction of such polymerizable compound that constitutes cyclic groups (e.g., aryl or heteroaryl groups).

Preferred aryl or heteroaryl groups include less than 20 carbon atoms, more preferably less than 11 carbon atoms, and even more preferably less than 8 carbon atoms. The aryl or heteroaryl groups preferably have at least 4 carbon atoms, more preferably at least 5 carbon atoms, and even more preferably at least 6 carbon atoms. Substituted or unsubstituted phenylene groups are preferred aryl or heteroaryl groups.

In some embodiments, at least some, or even all, of the cyclic groups are polycyclic groups (e.g., bicyclic, tricyclic, or polycyclic groups having 4 or more rings).

In certain embodiments, the powder polymer particles may include a polyester polymer. Suitable polyesters include polyesters formed from one or more suitable polycarboxylic acid components (e.g., dicarboxylic acid components, tricarboxylic acid components, tetracarboxylic acid components, etc.) and one or more suitable polyol components (e.g., diol components, triol components, polyols having four hydroxyl groups, etc.). One or more other comonomers may optionally be used, if desired. Dicarboxylic acid components and diol components are preferred in certain embodiments.

Suitable dicarboxylic acid components include, for example, aromatic dicarboxylic acids such as terephthalic acid, isophthalic acid, phthalic acid, naphthalenedicarboxylic acid (e.g., 2,6-napthalene dicarboxylic acid), and furandicarboxylic acid (e.g., 2,5-furandicarboxylic acid); aliphatic dicarboxylic acids such as adipic acid, cyclohexane dicarboxylic acid, sebacic acid and azelaic acid; unsaturated acids such as maleic anhydride, itaconic acid, and fumaric acid; and mixtures thereof. Examples of other suitable polycarboxylic acids (or anhydrides) include benzene-pentacarboxylic acid; mellitic acid; 1,3,5,7 napthalene-tetracarboxylic acid; 2,4,6 pyridine-tricarboxylic acid; pyromellitic acid; trimellitic acid; trimesic acid; 3,5,3',5'-biphenyltetracarboxylic acid; 3,5,3',5'-bipyridyltetracarboxylic acid; 3,5,3',5'-benzophenonetetracarboxylic acid; 1,3,6,8-acridinetetracarboxylic acid; 1,2,4,5-benzenetetracarboxylic acid; nadic anhydride; trimellitic anhydride; pyromellitic anhydride, and mixtures thereof. Anhydrides or esters of the aforementioned acids and mixtures of such acids, anhydrides or esters may also be used.

Suitable diol components include, for example, polymethylene glycols represented by the formula HO—$(CH_2)_n$—OH (where n is about 2 to 10) such as ethylene glycol, propylene glycol, butanediol, hexanediol and decamethylene glycol; branched glycols represented by the formula HO—$CH_2$—$C(R_2)$—$CH_2$—OH (where R is an alkyl group having 1 to 4 carbon atoms) such as neopentyl glycol; diethylene glycol and triethylene glycol; diols having a cyclohexane ring such as cyclohexane dimethanol (CHDM); 2-methyl-1,3 propane diol; diols having a cyclobutane ring such as 2,2,4,4-tetramethyl-1,3-cyclobutanediol; isosorbide; tricyclodecanedimethanol; spirodicyclic diols (e.g., 3,9-bis (1,1-dimethyl-2-hydroxyethyl)-2,4,8,10-tetraoxaspiro[5.5] undecane (PSG)); and mixtures thereof. Glycerol, trimethylol propane (TMP), and other suitable trifunctional or higher polyols may also be used alone or in combination with any other suitable polyol.

In certain embodiments, the polyester polymer particles are made from semi-crystalline or crystalline polymers. Suitable exemplary crystalline and semi-crystalline polyester polymers include polyethylene terephthalate ("PET"), copolymers of PET such as PET/I, polybutylene terephthalate ("PBT"), polyethylene naphthalate ("PEN"), poly-1,4-cyclohexylenedimethylene terephthalate, and copolymers and combinations thereof. In some embodiments, the polyester material may be formed from ingredients including dimer fatty acids. Non-limiting examples of useful commercially available polyester materials may include polyesters commercially available under the tradename DYNAPOL such as, for example, DYNAPOL L912 (includes polycyclic groups derived from tricyclodecanedimethanol), DYNAPOL L952, DYNAPOL P1500, DYNAPOL P1500 HV (has a melting point temperature of about 170° C., a glass transition temperature of about 20° C., and a number average molecular weight of approximately 20,000), DYNAPOL P1510, and DYNAPOL P1550 (each available from Hüls AG and based on monomers including terephthalic acid and/or isophthalic acid); polyester materials commercially available under the TRITAN tradename (available from Eastman Chemical Company and based on monomers including 2,2,4,4-Tetramethyl-1,3-cyclobutanediol); and polyester materials commercially available under the tradename GRILTEX such as, for example, GRILTEX DD2267EG and GRILTEX D2310EG (each available from EMS-Chemie and based on monomers including terephthalic acid and/or isophthalic acid).

Exemplary polyester polymers that may be used in making suitable powder polymer particles are described, for example, in U.S. Pat. Pub. No. 2014/0319133 (Castelberg et al.), U.S. Pat. Pub. No. 2015/0344732 (Witt-Sanson et. al.), U.S. Pat. Pub. No. 2016/0160075 (Seneker et al.), International Application No. PCT/US2018/051726 (Matthieu et al.), U.S. Pat. No. 5,464,884 (Nield et al.), U.S. Pat. No. 6,893,678 (Hirose et al.), U.S. Pat. No. 7,198,849 (Stapperfenne et al.), U.S. Pat. No. 7,803,415 (Kiefer-Liptak et al.), U.S. Pat. No. 7,981,515 (Ambrose et al.), U.S. Pat. No. 8,133,557 (Parekh et al.), U.S. Pat. No. 8,367,171 (Stenson et al.), U.S. Pat. No. 8,574,672 (Doreau et al.), U.S. Pat. No. 9,096,772 (Lespinasse et al.), U.S. Pat. No. 9,011,999 (Cavallin et al.), U.S. Pat. No. 9,115,241 (Gao et al.), U.S. Pat. No. 9,187,213 (Prouvost et al.), U.S. Pat. No. 9,321,935 (Seneker et al.), U.S. Pat. No. 9,650,176 (Cavallin et al.), U.S. Pat. No. 9,695,264 (Lock et al.), U.S. Pat. No. 9,708,504 (Singer et al.), U.S. Pat. No. 9,920,217 (Skillman et al.), U.S. Pat. No. 10,131,796 (Martinoni et al.), and U.S. Pat. Pub. No. 2020/0207516 (Seneker et al.).

In some embodiments, polyester polymers having C4 rings can be used such as, for example, are present in certain structural segments derived from cyclobutanediol-type compounds such as, e.g., including 2,2,4,4-tetramethyl-1,3-cyclobutanediol). Exemplary such polyesters including such $C_4$ rings are described, for example, in WO2014/078618 (Knotts et al.), U.S. Pat. No. 8,163,850 (Marsh et. al.), U.S. Pat. No. 9,650,539 (Kuo et. al.), U.S. Pat. No. 9,598,602 (Kuo et. al.), U.S. Pat. No. 9,487,619 (Kuo et. al.), U.S. Pat. No. 9,828,522 (Argyropoulos et al.), and U.S. Pat. Pub. No. 2020/0207516 (Seneker et al.).

In certain embodiments, the powder polymer particles may include a polyether polymer. In some embodiments, the polyether polymer contains a plurality of aromatic segment, more typically aromatic ether segments. The polyether polymer may be formed using any suitable reactants and any suitable polymerization process. The polyether polymer may be formed, for example, from reactants including an extender compound (e.g., a diol, which is preferably a polyhydric phenol, more preferably a dihydric phenol; a diacid; or a compound having both a phenol hydroxyl group and a carboxylic group) and a polyepoxide. In certain preferred embodiments, the polyepoxide is a polyepoxide of a polyhydric phenol (more typically a diepoxide of, e.g. a diglycidyl ether of, a dihydric phenol). In some embodiments, (i) the polyhydric phenol compound is an ortho-substituted diphenol (e.g., tetramethyl bisphenol F), (ii) the diepoxide is a diepoxide of an ortho-substituted diphenol (e.g., tetramethyl bisphenol F), or (iii) both (i) and (ii).

In some embodiments, a polyether polymer is formed from reactants including a diepoxide of an ortho-substituted diphenol (e.g., the diglycidyl ether of tetramethyl bisphenol F) and a dihydric phenol having only one phenol ring (e.g., hydroquinone, resorcinol, catechol, or a substituted variant thereof).

In certain embodiments, a polyether polymer is prepared from reactants including a diepoxide (typically a diglycidyl ether or diglycidyl ester) that is not derived from a polyhydric phenol, and which includes one or more backbone or pendant aryl or heteroaryl groups. Such aromatic diepoxides may be prepared, for example, from aromatic compounds having two or more reactive groups such as diols, diacids, diamines, and the like. Suitable such exemplary aromatic compounds for use in forming the aromatic diepoxides include 1-phenyl-1,2-propanediol; 2-phenyl-1,2-propanediol; 1-phenyl-1,3-propanediol; 2-phenyl-1,3-propanediol; 1-phenyl-1,2-ethanediol; vanillyl alcohol; 1,2-, 1,3- or 1,4-benzenedimethanol; furandimethanol (e.g., 2,5-furandimethanol); terephthalic acid; isophthalic acid; and the like.

In some embodiments, a polyether polymer is prepared from reactants including one or more aliphatic polyepoxides, which are typically aliphatic diepoxides, and more typically cycloaliphatic diepoxides. Exemplary aliphatic diepoxides include diepoxides of (which are typically diglycidyl ethers of): cyclobutane diol (e.g., 2,2,4,4-tetramethyl-1,3-cyclobutanediol), isosorbide, cyclohexanedimethanol, neopentyl glycol, 2-methyl 1,3-propanediol, tricyclodecanedimethanol, 3,9-bis(1,1-dimethyl-2-hydroxyethyl)-2,4,8,10-tetraoxaspiro[5.5]undecane (PSG), and mixtures thereof.

Exemplary reactants, polymerization processes, and polyether polymers that can be used in making suitable powder particles are described in U.S. Pat. No. 7,910,170 (Evans et al.), U.S. Pat. No. 9,409,219 (Niederst et al.), U.S. Pat. Pub. No. 2013/0280455 (Evans et al.), U.S. Pat. Pub. No. 2013/0316109 (Niederst et al.), U.S. Pat. Pub. No. 2013/0206756 (Niederst et al.), U.S. Pat. Pub. No. 2015/0021323 (Niederst et al.), International Pub. Nos. WO 2015/160788 (Valspar Sourcing), WO 2015/164703 (Valspar Sourcing), WO 2015/057932 (Valspar Sourcing), WO 2015/179064 (Valspar Sourcing), and WO 2018/125895 (Valspar Sourcing).

In some embodiments, the polyether polymers are not formed using ingredients that include any bisphenols or any epoxides of bisphenols, although non-intentional, trace amounts may potentially be present due to, e.g., environmental contamination. Examples of suitable reactants for forming such bisphenol-free polyether polymers include any of the diepoxides derived from materials other than bisphenols described in the patent documents referenced in the preceding paragraph and any of the extender compounds other than bisphenols disclosed in such patent documents. Hydroquinone, catechol, resorcinol, and substituted variants thereof, are non-limiting examples of suitable extender compounds for use in making such bisphenol-free polyether polymers.

In certain embodiments, the powder polymer particles may include a polymer formed via free-radical polymerization of ethylenically unsaturated monomers, with acrylic polymers being preferred examples of such polymers. Such polymers are referred to herein as "acrylic polymers" for convenience given that such polymers typically include one or more monomers selected from (meth)acrylates or (meth) acrylic acid. Preferred acrylic polymers include organic-solution polymerized acrylic polymers and emulsion polymerized acrylic latex polymers. A suitable acrylic polymer includes a reaction product of components that include a (meth)acrylic acid ester, an optional ethylenically unsaturated mono- or multi-functional acid, and an optional vinyl compound. For example, the acrylate film-forming polymer could be a reaction product of components that include ethyl acrylate, acrylic acid, and styrene (preferably in the presence of 2,2'-azobis(2-methyl-butyronitrile) and tert-butyl peroxybenzoate free radical initiators). In some embodiments, only acrylic polymers that are free from structural units derived from styrene are used.

Examples of suitable (meth)acrylic acid esters (i.e., methacrylic acid esters and acrylic acid esters) include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-hydroxyethyl (meth)acrylate, 2-ethylhexyl (meth)acrylate, cyclohexyl (meth)acrylate, decyl (meth)acrylate, isodecyl (meth)acrylate, benzyl (meth) acrylate, 2-hydroxypropyl (meth)acrylate, lauryl (meth) acrylate, isobornyl (meth)acrylate, octyl (meth)acrylate, and nonyl (meth)acrylate. Any suitable isomer or combination of isomers of the above may be used. By way of example, disclosure of "butyl (meth)acrylate" is intended to disclose all isomers such as n-butyl (meth)acrylate, sec-butyl (meth) acrylate, tert-butyl (meth)acrylate, and the like. In general, as disclosed herein, unless specifically indicated to the contrary, disclosure of all isomers for a given monomer is intended.

Examples of suitable ethylenically unsaturated mono- or multi-functional acids include methacrylic acid, acrylic acid, crotonic acid, itaconic acid, maleic acid, mesaconic acid, citraconic acid, sorbic acid, and fumaric acid.

Examples of suitable vinyl compounds include styrene, halostyrene, isoprene, a conjugated butadiene, alpha-methylstyrene, vinyl toluene, vinyl naphthalene, vinyl chloride, acrylonitrile, methacrylonitrile, vinyl acetate, vinyl propionate, vinyl cyclohexane, vinyl cyclooctane, vinyl cyclohexene, and vinyl stearate. As previously discussed, in some embodiments, styrene is not used.

Examples of commercially available acrylic polymers include those available under the trade names VIACRYL SC 454/50BSNB, VIACRYL SC383w/50WA, and VANCRYL 2900 DEV (all from Cytec Industries Inc., West Patterson, NJ), as well as NEOCRYL A-639, NEOCRYL XK-64, URACON CR203 M3, and URACON CS113 S1G (all from DSM Neoresins BV, 5140 AC Waalwijk, Netherlands).

Exemplary acrylic polymers that may be used in making suitable powder particles are described in U.S. Pat. No. 8,168,276 (Cleaver et al.), U.S. Pat. No. 7,189,787 (O'Brien), U.S. Pat. No. 7,592,047 (O'Brien et al.), U.S. Pat. No. 9,181,448 (Li et al.), U.S. Pat. No. 9,394,456 (Rademacher et al.), U.S. Pat. Pub. No 2016/0009941 (Rademacher et al.), U.S. Pat. Pub. No. US2016/0376446 (Gibanel et al.), U.S. Pat. Pub. No. 2017/0002227 (Gibanel et al.), U.S. Pat. Pub. No. 2018/0265729 (Gibanel et al.), WO2016/196174 (Singer et al.), WO2016/196190 (Singer et al.), WO2017/112837 (Gibanel et al.), WO2017/180895 (O'Brien et. al.), WO2018/085052 (Gibanel et al.), WO2018/075762 (Gibanel et al.), WO2019/078925 (Gibanel et al.), WO2019/046700 (O'Brien et al.), and WO2019/046750 (O'Brien et al.).

In certain embodiments, the powder polymer particles include dried latex particles that include both polyether polymer and acrylic polymer. Examples of such latex particles are described, e.g., in WO2017/180895 (O'Brien et. al.) and International App. No. WO2019046700 (O'Brien et al.).

In certain embodiments, the powder polymer particles may include a polyolefin polymer. Examples of suitable polyolefin polymers include maleic-modified polyethylene, maleic-modified polypropylene, ethylene acrylic acid copolymers, ethylene methacrylic acid copolymers, propylene acrylic acid copolymers, propylene methacrylic acid copolymers, and ethylene vinyl alcohol copolymers.

Examples of commercially available polyolefin polymers include those available under the trade names DOW PRIMACOR 5980i, DUPONT NUCREL, POLYBOND 1103, NIPPON SOARNOL (EVOH), ARKEMA OREVAC 18751, and ARKEMA OREVAC 18360. Exemplary polyolefin polymers that may be used in making suitable powder particles are described in U.S. Pat. No. 9,000,074 (Choudhery), U.S. Pat. No. 8,791,204 (Choudhery), International Pub. No. WO 2014/140057 (Akzo Nobel), U.S. Pat. No. 8,722,787 (Romick et al.), U.S. Pat. No. 8,779,053 (Lundgard et al.), and U.S. Pat. No. 8,946,329 (Wilbur et al.).

In some embodiments, suitable polyolefin particles are prepared from aqueous dispersions of polyolefin polymer. See, for example, U.S. Pat. No. 8,193,275 (Moncla et al.) for a description of suitable processes for producing such aqueous polyolefin dispersions. Examples of commercially available aqueous polyolefin dispersions include the CANVERA line of products available from Dow, including, for example, the CANVERA 1110 product, the CANVERA 3110-series, and the CANVERA 3140-series. Dry powder polymer particles of the specifications disclosed herein can be achieved using any suitable process, including any of the suitable processes disclosed herein such as, for example, spray drying. Preferably, spray drying is used to form dry powder polymer particles of the specifications disclosed herein.

In some embodiments, the powder polymer particles may include an unsaturated polymer in combination with one or both of an ether component or a metal drier. In some embodiments, the ether component is present in the unsaturated polymer itself. While not intending to be bound by theory, it is believed that the presence of a suitable amount of unsaturation (e.g., aliphatic or cycloaliphatic carbon-carbon double bonds such as present in, e.g., norbornene groups and saturated structural units derived from maleic anhydride, itaconic acid, functionalized polybutadiene, and the like) in combination with a suitable amount of ether component or metal drier (e.g., aluminum, cobalt, copper, oxides thereof, salts thereof) can result in molecular weight build during thermal cure of the powder coating composition to form a hardened coating. See, for example, U.S. Pat. No. 9,206,332 (Cavallin et al.) for further discussion of such reaction mechanisms and suitable materials and concentrations. In some embodiments, the polymer of the powder polymer particles may have an iodine value of at least 10, at least 20, at least 35, or at least 50. The upper range of suitable iodine values is not particularly limited, but in most such embodiments the iodine value typically will not exceed about 100 or about 120. The aforementioned iodine values are expressed in terms of the centigrams of iodine per gram of the material. Iodine values may be determined, for example, using ASTM D 5768-02 (Reapproved 2006) entitled "Standard Test Method for Determination of Iodine Values of Tall Oil Fatty Acids."

Optional Charge Control Agents

In certain embodiments of the powder coating compositions of the present disclosure, one or more charge control agents are included in the coating composition. That is, in certain embodiments, the powder polymer particles are in contact with one or more charge control agents.

In certain embodiments, one or more charge control agents are disposed on a surface of the powder polymer particles. In certain embodiments, the polymer particles are at least substantially coated, or even completely coated, with one or more charge control agents. In certain embodiments, one or more charge control agents are adhered to a surface of the powder polymer particles.

Charge control agent(s) enables the powder coating particles to efficiently accept a charge (preferably, a triboelectric charge) to better facilitate electrostatic application to a substrate. The charge control agent(s) also allow the powder coating particles to better maintain a latent triboelectric charge for a longer period of time, avoiding a degradation of the electrostatic application properties over time. In addition to the benefits achieved by incorporating one or more charge control agents, the agent(s) should not negatively impact the system. For example, the charge control agent(s) should not interfere in any deleterious way with the function of the any component of the application equipment (such as the fuser) or the performance of the hardened coating (such as adhesion, color development, clarity, or product resistance).

Accordingly, such combination of particles and charge control agent(s) is referred to herein as "triboelectrically chargeable powder polymer particles" (or simply "chargeable polymer particles" or "chargeable particles"). The use and orientation of the charge control agent(s) with respect to the powder polymer particles is well-known to those in the toner printing industry.

In certain embodiments, during application to a substrate, the charge control agent provides a charge to the powder polymer particles by friction thereby forming charged (i.e., triboelectrically charged) powder polymer particles.

In certain embodiments, the charge control agents are for use with positive charged powder coating compositions. In other embodiments, the charge control agents are for use with negative charged powder coating compositions.

In certain embodiments, the charge control agent includes inorganic particles, organic particles, or both (e.g., inorganic modified organic particles or organometallic particles). In certain embodiments, the charge control agent includes inorganic particles. Charge control agents can be either positively charged or negatively charged.

In certain embodiments, the charge control agent particles may be of any suitable size. Typically, the charge control agent particles have particle sizes in the sub-micron range (e.g., less than 1 micron, 100 nanometers or less, 50 nanometers or less, or 20 nanometers or less), although any suitable size may be employed. In certain embodiments, the particle size of the charge control agent particles is of 0.001 micron to 0.10 micron. A useful method for determining particle sizes of the charge control agent particles is laser diffraction particle size analysis, as described herein for the powder polymer particles.

Examples of suitable charge control agents include hydrophilic fumed aluminum oxide particles, hydrophilic precipitated sodium aluminum silicate particles, metal carboxylate and sulfonate particles, quaternary ammonium salts (e.g., quaternary ammonium sulfate or sulfonate particles), polymers containing pendant quaternary ammonium salts, ferromagnetic particles, transition metal particles, nitrosine or azine dyes, copper phthalocyanine pigments, metal complexes of chromium, zinc, aluminum, zirconium, calcium, or combinations thereof.

Optional Additives

In certain embodiments, the powder coating composition of the present disclosure may include one or more other optional additives to provide desired effects. For example, such optional additives may be included in the coating composition to enhance composition aesthetics, to facilitate manufacturing, processing, handling, and application of the composition, and to further improve a particular functional property of the coating composition or a hardened coating resulting therefrom. One or more optional additives may form a part of the particles themselves, such as part of spray dried particles.

Because hardened coatings of the present disclosure are preferably used on food-contact surfaces, it is desirable to avoid the use of additives that are unsuitable for such surfaces due to factors such as taste, toxicity, or other government regulatory requirements.

Examples of such optional additives, particularly those suitable for use in coatings used on food-contact surfaces, include lubricants, adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, metal driers, and combinations thereof. In certain embodiments, the powder coating composition includes one or more lubricants, pigments, crosslinkers, or a combination thereof.

In certain preferred embodiments, powder coating compositions of the present disclosure include one or more lubricants, e.g., for flexibility. Examples of suitable lubricants include carnauba wax, synthetic wax (e.g., Fischer-Tropsch wax), polytetrafluoroethylene (PTFE) wax, polyolefin wax (e.g., polyethylene (PE) wax, polypropylene (PP) wax, and high-density polyethylene (HDPE) wax), amide wax (e.g., micronized ethylene-bis-stearamide (EBS) wax), combinations thereof, and modified version thereof (e.g., amide-modified PE wax, PTFE-modified PE wax, and the like). In some embodiments, the lubricants are micronized waxes, which may optionally be spherical. Lubricants facilitate manufacture of metal cans, particularly metal riveted can ends and pull tabs, by imparting lubricity, and thereby flexibility, to sheets of coated metal substrates.

In certain embodiments, one or more lubricants may be present in a powder coating composition of the present disclosure in an amount of at least 0.1 wt-%, at least 0.5 wt-%, or at least 1 wt-%, based on the total weight of the powder coating composition. In certain embodiments, one or more lubricants may be present in an amount of up to 4 wt-%, up to 3 wt-%, or up to 2 wt-%, based on the total weight of the powder coating composition.

The lubricant may be present in the powder polymer particles, on the powder polymer particles, in another ingredient used to form the powder coating composition, or a combination thereof. The lubricant may also be applied in a second powder coating composition that is applied in a separate powder layer. For example, the lubricant may be applied in a "dust-on-dust" approach on a base powder layer including the powder polymer particles of the present disclosure, prior to cure of the base powder layer.

Examples of suitable commercially available lubricants include the CERETAN line of products from Munzig (e.g., the CERETAN MA 7020, MF 5010, MM 8015, MXF 2999, MT 9120, MXD 3920, and the MXF 9899 products); the LUBA-PRINT line of products from Munzig (e.g., the LUBA-PRINT 255/B, 276/A (ND), 351/G, 501/S-100, 749/PM, and CA30 products); the SST-52, S-483, FLUOROSLIP 893-A, TEXTURE 5347W, and SPP-10 products from Shamrock; the CERAFLOUR line of products from BYK (e.g., the CERAFLOUR 981, 988, 996, 258, 970, and 916 products); and the CERACOL 607 product from BYK.

Particles sizes of some of these lubricants, and methods used to determine such particle sizes as identified by the suppliers (although, herein, such lubricant particle sizes may be measured by laser diffraction particle size analysis), are presented in the following table.

| Supplier | Lubricant | Chemistry of Lubricant* | Particle Size* | Method* |
| --- | --- | --- | --- | --- |
| Munzing | Ceretan MA 7020 | Micronized ethylene-bis-stearamide wax | D99 < 20 μm/ D50 < 5 μm | LV 5 ISO 13320 |
| Munzing | Ceretan MF 5010 | Spherical, micronized PTFE modified polyolefin wax | D99 < 10 μm/ D50 < 4 μm | LV 5 ISO 13320 |

-continued

| Supplier | Lubricant | Chemistry of Lubricant* | Particle Size* | Method* |
|---|---|---|---|---|
| Munzing | Ceretan MM 8015 | Sperical, micronized montan wax | D99 < 15 μm/ D50 < 6 μm | LV 5 ISO 13320 |
| Munzing | Ceretan MXF 2999 | Micronized functional blend, coated with PTFE | D50 < 50 μm | LV 5 ISO 13320 |
| Munzing | Ceretan MT 9120 | High melting, spherical, micronized Fischer-Tropsch wax | D99 < 20 μm/ D50 < 7 μm | LV 5 ISO 13320 |
| Munzing | Ceretan MXD 3920 | Coated, micronized wax with diamond-like hardness | D99 < 20 μm/ D50 < 4 μm | LV 5 ISO 13320 |
| Munzing | Ceretan MXF 9899 | Spherical, micronized functional blend with PTFE coating | D50 < 50 μm | LV 5 ISO 13320 |
| Munzing | LUBA-print 255/B | Carnauba wax dispersion | D50: 2-3 μm/ D98: <6 μm | Picture-Particle-Analyzing System |
| Munzing | LUBA-print 276/A | Polyethylene-wax/PTFE dispersion | D50: 2-3 μm/ D98: <8 μm | Picture-Particle-Analyzing System |
| Munzing | LUBA-print 351/G | Functional blend wax dispersion | D50: 2-3 μm/ D98: <5 μm | Picture-Particle-Analyzing System |
| Munzing | LUBA-print 501/S-100 | Polyethylene-wax dispersion | D50: 2.5-4 μm/ D98: <8 μm | Picture-Particle-Analyzing System |
| Munzing | LUBA-print 749/PM | Amide-wax dispersion | D50: 2-3 μm/ D98: <5 μm | Picture-Particle-Analyzing System |
| Munzing | LUBA-print CA 30 | Carnauba wax dispersion | D98: 3.0 μm | Single pass test |
| BYK | Ceraflour 981 | Micronized PTFE | D50: 3 μm/ D90: 6 μm | Laser diffraction - volume distribution |
| BYK | Ceraflour 988 | Micronized, amide-modified polyethylene wax | D50: 6 μm/ D90: 13 μm | Laser diffraction - volume distribution |
| BYK | Ceraflour 996 | Micronized, PTFE-modified polyethylene wax | D50: 6 μm/ D90: 11 μm | Laser diffraction - volume distribution |
| BYK | Ceraflour 970 | Micronized polypropylene wax | D50: 9 μm/ D90: 14 μm | Laser diffraction - volume distribution |
| BYK | Ceraflour 916 | Micronized, medified HDPE wax/polymer mix | D50: 46 μm/ D90: 82 μm | Laser diffraction - volume distribution |
| BYK | Ceramat 258 | Dispersion of an oxidized HDPE wax | 30 μm | Hegman |
| BYK | Ceracol 607 | PTFE-modified polyethylene wax dispersion | D50: 4 μm/ D90: 10 μm | Laser diffraction - volume distribution |

*According to Manufacturer's Literature

In certain preferred embodiments, powder coating compositions of the present disclosure include one or more crosslinkers and/or catalysts. Additionally, or alternatively, the powder coating composition may include one or more self-crosslinkable polymers. Examples of suitable crosslinkers (e.g., phenolic crosslinker, amino crosslinker, or a combination thereof) and catalysts (e.g., a titanium-containing catalyst, a zirconium-containing catalyst, or a combination thereof) are described in U.S. Pat. No. 8,168,276 (Cleaver et al.).

The term "crosslinker" refers to a molecule capable of forming a covalent linkage between polymers or between two different regions of the same polymer. Examples of suitable crosslinkers include carboxyl-reactive curing resins, with beta-hydroxyalkyl-amide crosslinkers being preferred such crosslinkers (e.g., available commercially under the trade name PRIMID from EMS-Griltech (e.g. the PRIMID XL-552 and PRIMID QM-1260 products) and hydroxyl-curing resins such as, for example, phenolic crosslinkers, blocked isocyanate crosslinkers, and aminoplast crosslinkers. Other suitable curing agents may include benzoxazine curing agents such as, for example, benzoxazine-based phenolic resins or hydroxy alkyl ureas. Examples of benzoxazine-based curing agents are provided in U.S. Pat. Pub. No. 2016/0297994 (Kuo et al.). Examples of hydroxy alkyl ureas are provided in U.S. Pat. Pub. No. 2017/0204289 (Kurtz et al.).

Phenolic crosslinkers include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast crosslinkers are typically the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

In some embodiments, the powder coating composition does not include any added crosslinkers. In such embodiment, the polymer of the powder particles may, or may not, be a self-crosslinking polymer, depending on the chemistry of the selected polymer and the desired coating properties.

In certain embodiments, one or more crosslinkers may be present in a powder coating composition of the present disclosure in an amount of at least 0.1 wt-%, at least 1 wt-%, at least 2 wt-%, at least 5 wt-%, or at least 8 wt-% based on the total weight of the powder coating composition. In certain embodiments, one or more crosslinkers may be present in an amount of up to 40 wt-%, up to 30 wt-%, up to 20 wt-%, or up to 10 wt-%, based on the total weight of the powder coating composition.

In certain preferred embodiments, powder coating compositions of the present disclosure include one or more colorants, such as a pigment and/or dye. Examples of suitable colorants for use in the powder coating composition include titanium dioxide, barium sulfate, carbon black, and iron oxide, and may also include organic dyes and pigments.

In certain embodiments, one or more colorants may be present in a powder coating composition of the present disclosure in an amount of, for example, at least 1 wt-%, at least 2 wt-%, at least 5 wt-%, at least 10 wt-%, or at least 15 wt-%, based on the total weight of the powder coating composition. In certain embodiments, one or more colorants may be present in an amount of up to 50 wt-%, up to 40 wt-%, up to 30 wt-%, or up to about 20%, based on the total weight of the powder coating composition. The use of a higher colorant concentration may be advantageous to achieve good coverage with thinner coatings.

In certain embodiments, powder coating compositions of the present disclosure include one or more inorganic fillers. Exemplary inorganic fillers used in the powder coating composition of the present disclosure include, for example, clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof.

The inorganic fillers are preferably nonreactive, and may be incorporated into the powder coating composition in the form of a powder, preferably with a particle size distribution that is the same or smaller than that of the blend of one or more powder polymer particles.

In certain embodiments, one or more inorganic fillers may be present in a powder coating composition of the present disclosure in an amount of at least 0.1 wt-%, at least 1 wt-%, or at least 2 wt-%, based on the total weight of the powder coating composition. In certain embodiments, one or more inorganic fillers may be present in an amount of up to 20 wt-%, up to 15 wt-%, or up to 10 wt-%, based on the total weight of the powder coating composition.

In certain preferred embodiments, powder coating compositions of the present disclosure include one or more flow control agents. The flow control agent may assist in achieving a uniform thin film and may further assist in reducing lumping and dust issues that may otherwise occur with fine powder particles.

Examples of flow control agents are inorganic particles, such as silica particles (e.g., hydrophobic fumed silica particles, hydrophilic fumed silica particles, hydrophobic precipitated silica particles, hydrophilic precipitated silica particles), and organic resins, such as polyacrylics.

Examples of commercially available materials for use as flow control agents include the AEROSIL, AEROXIDE, and SIPERNAT lines of products from Evonik (e.g., the AEROSIL R972, R816, 200, and 380 products; the AEROXIDE Alu C product; and the SIPERNAT D 17, 820A, 22 S, 50 S, and 340 products); the BONTRON series of products from Orient Corporation of America (e.g., the BONTRON E-Series, S-Series, N-Series, and P-Series lines of products); and the HDK line of pyrogenic silica products from Wacker (e.g., the HDK H1303VP, H2000/4, H2000T, and H3004 products).

An exemplary flow control agent for use in the powder coating composition is a polyacrylate commercially available under the tradename PERENOL from Henkel Corporation, Rocky Hill, CT Additionally useful polyacrylate flow control agents are commercially available under the tradename ACRYLON MFP from Protex France, and those commercially available from BYK-Chemie GmbH, Germany. Numerous other compounds known to persons skilled in the art also may be used as a flow control agent.

In certain embodiments, one or more flow control agents may be present in a powder coating composition of the present disclosure in an amount of at least 0.1 wt-%, or at least 0.2 wt-%, based on the total weight of the powder coating composition. In certain embodiments, one or more flow control agents may be present in an amount of up to 5 wt-%, or up to 1 wt-%, based on the total weight of the powder coating composition.

In certain preferred embodiments, powder coating compositions of the present disclosure include one or more surfactants. Examples of suitable surfactants for use in the powder coating composition include wetting agents, emulsifying agents, suspending agents, dispersing agents, and combinations thereof. In some embodiments one or more of the surfactants may be polymeric surfactant (e.g., an alkali-soluble resin). Examples of suitable surfactants for use in the coating composition include non-ionic and anionic surfactants.

In certain embodiments, one or more surfactants may be present in a powder coating composition of the present disclosure in an amount of at least 0.1 wt-%, or at least 0.2 wt-%, based on the total weight of the powder coating composition. In certain embodiments, one or more surfactants may be present in an amount of up to 10 wt-%, or up to 5 wt-%, based on the total weight of the powder coating composition.

For additives that are in particulate form (e.g., lubricants), the particles have particle sizes that are no larger than the powder polymer particles. Typically, they are in the submicron range (e.g., less than 1 micron, 100 nanometers or less, 50 nanometers or less, or 20 nanometers or less), although any suitable size may be employed. A useful method for determining particle sizes of the optional additives (e.g., lubricants) is laser diffraction particle size analysis.

Method of Making Powder Coating Composition

In certain embodiments, a metal packaging (e.g., a food, beverage, aerosol, or general packaging container, portion thereof, or metal closure) powder coating composition can be made as follows. In an initial step, powder polymer particles as described herein are provided. In certain embodiments, these are then combined with one or more charge control agents as described herein. These particles, preferably in contact with one or more charge control agents, are then used as is or with one or more optional additives as a powder coating composition that is suitable for use as a metal packaging (e.g., a food, beverage, aerosol, or general packaging container, portion thereof, or metal closure) powder coating composition as described herein.

The polymer particles may be any suitable polymer particles, including, for example, precipitated polymer particles, polymer particles formed by methods other than precipitation, or a combination of precipitated and non-precipitated polymer particles. Any suitable method may be used to form suitably sized precipitated particles of the present disclosure. In certain embodiments, the method includes providing a carrier (e.g., a solvent) having polymer material dispersed therein, preferably dissolved therein, and reducing the solubility of the polymer material in the carrier (e.g., by cooling the temperature of the carrier, by changing the composition of the carrier, or by changing the concentration of the polymer in the carrier) to form precipitated particles. In certain embodiments, the method includes: preparing a mixture of an organic solvent and a solid crystallizable polymer; heating the mixture to a temperature sufficient to disperse (and preferably dissolve), but not melt, the solid crystallizable polymer in the organic solvent; and cooling the mixture to form precipitated polymer particles.

In certain embodiments, the powder polymer particles may be prepared using an emulsion, suspension, solution, or dispersion polymerization method, which are well-known to those skilled in the art. For example, a polymer may be prepared in the form of an aqueous emulsion, suspension, solution, or dispersion using standard techniques and subsequently dried to form particles using any of a variety of techniques including, for example, spray drying, fluidized bed drying, vacuum drying, radiant drying, freeze drying, and flash drying, among others. Preferably, drying involves spray drying. Polymer particles produced using emulsion/suspension/dispersion/solution polymerization are not typically considered precipitated particles.

In certain embodiments, the powder polymer particles are not prepared by grinding a polymer to form ground polymer particles (that is, the particles are not provided as ground particles).

In certain embodiments, the powder polymer particles are provided as agglomerates of primary polymer particles, as described herein, which may be prepared using standard techniques well-known to those skilled in the art. For example, a polymer may be prepared in the form of an aqueous emulsion/dispersion/suspension/solution technique and subsequently dried using, for example, a spray drying technique. Spray drying may form agglomerates directly. Spray drying involves the atomization of a liquid feedstock into a spray of droplets and contacting the droplets with hot air in a drying chamber. The sprays are typically produced by either rotary (wheel) or nozzle atomizers. Evaporation of moisture from the droplets and formation of dry particles proceed under controlled temperature and airflow conditions. Powder particles are typically discharged substantially continuously from the drying chamber. Operating conditions and dryer design are selected according to the drying characteristics of the product specification.

Figure 2:
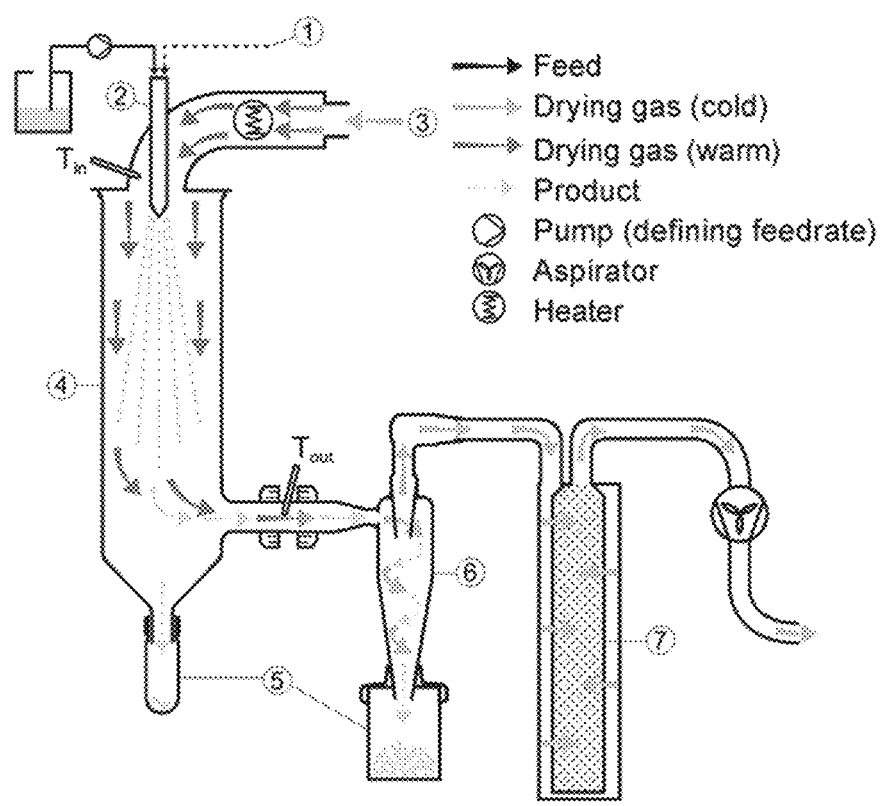
FIG. 2 is a schematic of a Spray Drying Apparatus (figure reproduced from Büchi B290 spray dryer product literature, BÜCHI Labortechnik AG, Flawil, Switzerland).

FIG. 2 shows a suitable spray drying apparatus (for example, the Büchi B290 lab-scale spray dryer) that uses a pressurized gas (1), such as compressed air or nitrogen, to generate an aerosolized spray of the liquid product via a stainless steel nozzle (2). This spray is coeluted with a drying gas, such as lab air or nitrogen (3), into a glass drying tower (4) where the droplets of liquid product are dewatered/desolvated by the heated air/gas, resulting in solid powder particles that are largely free of their original solvent or dispersant. A glass cyclone (6) then separates the powder from the heated solvent vapor. If a sample is to be collected to determine particle size and shape, it is typically collected at the collection jar (5) at the bottom of the cyclone (6). Finally, the water/solvent vapor passes through a particulate filter (7) to remove any fine particles before the vapor is exhausted or collected.

Typically, the agglomerated particles formed from a spray drying technique are spherical or substantially spherical. The particle size of the agglomerates will typically increase with higher solids content of the emulsion/dispersion/suspension/solution and/or with lower atomization pressure in the spray drying nozzles. Secondary drying (e.g., using a fluidized bed) can be done to remove bound water from the agglomerates if desired.

Alternatively, primary particles may be formed, e.g., by emulsion/dispersion/suspension/solution polymerization, or by precipitation, and subsequently aggregated and/or coalesced to form agglomerated particles using, for example, chemical aggregation or mechanical fusion (e.g., heating above the Tg of a polymer to fuse the primary particles into an agglomerated particle). Any suitable aggregation process may be used in forming the aggregated dispersion particles with or without additives (e.g., pigments, lubricants, surfactants).

An example of a particle aggregation process is described in U.S. Pat. No. 9,547,246 (Klier et al.), and includes forming an aqueous dispersion including a thermoplastic polymer, a stabilizing agent capable of promoting the formation of a stable dispersion or emulsion (e.g., a surfactant), optional additives, and an aggregating agent capable of causing complexation (e.g., alkali earth metal or transition metal salts) in a vessel. The mixture is then stirred until homogenized and heated to a temperature of, for example, about 50° C. The mixture may be held at such temperature for a period of time to permit aggregation of the particles to the desired size. Once the desired size of aggregated toner particles is achieved, the pH of the mixture may be adjusted in order to inhibit further aggregation. The particles may be further heated to a temperature of, for example, about 90° C. and the pH lowered in order to enable the particles to coalesce and spherodize. The heater is then turned off and the reactor mixture allowed to cool to room temperature, at which point the aggregated and coalesced particles are recovered and optionally washed and dried. The particle aggregation process may also be used starting from an aqueous dispersion including a thermoset polymer.

Also, the powder polymer particles of the present disclosure may be made using an emulsion aggregation process described in G. E. Kmiecik-Lawrynowicz, *DPP*2003: *IS&Ts International Conference on Digital Production Printing and Industrial Applications*, pages 211-213, for making toner particles for high quality digital color printing.

In certain embodiments, the powder polymer particles are combined with one or more charge control agents to form chargeable powder polymer particles, as described herein. Typically, the method of making a powder coating composition of the present disclosure includes applying one or more charge control agents to the powder polymer particles and forming a powder coating composition. The charge control agents (as with any of the optional additives described herein) may be added to the powder polymer particles during their formation (e.g., as in a spray drying process) or subsequent thereto.

In other embodiments, one or more charge control agents are introduced during, prior to, or both during and prior to, the spray drying process such that polymer droplets or nascent forming particles contact charge control agent. While not intending to be bound by theory, the presence of charge control agent during the spray drying process may be advantageous for purposes of enhancing mobility of the powder polymer particles, avoiding or inhibiting clumping of the powder polymer particles, and/or avoiding or inhibiting sticking of the powder polymer particles on process equipment.

One or more charge control agents may be added to dried particles (e.g., after a spray drying process). For example, one or more charge control agents may be applied to a surface of the powder polymer particles. This may involve completely coating the polymer particles with the one or more charge control agents. It may additionally, or alternatively, involve adhering the one or more charge control agents to the surface of the powder polymer particles.

This combination of charge control agents and powder polymer particles form chargeable particles. For example, the charging of powder particles, e.g., by friction or induction, can be affected using processes commonly known in photocopying technology or laser printer technology (which processes are elucidated in, for example, L. B. Schein, Electrophotography and Development Physics, pages 32-244, Volume 14, Springer Series in Electrophysics (1988)).

Standard methods of mixing may be used if one or more optional additives are used with the chargeable particles, which are well-known to those skilled in the art. The one or more optional additives may be combined with the powder polymer particles, the charge control agent(s), or both. Such optional additives may be added during powder polymer particle preparation or subsequent thereto. Certain of such additives may be incorporated into the powder polymer particles, coated on the powder polymer particles, or blended with the powder polymer particles.

The present disclosure also provides methods that include causing the metal packaging powder coating composition to be used on a metal substrate of metal packaging. In some cases where multiple parties are involved, a first party (e.g., the party that manufactures and/or supplies the metal packaging powder coating composition) may provide instructions, recommendations, or other disclosures about the metal packaging powder coating composition end use to a second party (e.g., a metal coater (e.g., a coil coater for beverage can ends), can maker, or brand owner). Such disclosures may include, for example, instructions, recommendations, or other disclosures relating to coating a metal substrate for subsequent use in forming packaging containers or portions thereof, coating a metal substrate of pre-formed containers or portions thereof, preparing powder coating compositions for such uses, cure conditions or process-related conditions for such coatings, or suitable types of packaged products for use with resulting coatings. Such disclosures may occur, for example, in technical data sheets (TDSs), safety data sheets (SDSs), regulatory disclosures, warranties or warranty limitation statements, marketing literature or presentations, or on company websites. A first party making such disclosures to a second party shall be deemed to have caused the metal packaging powder coating compositions to be used on a metal substrate of metal packaging (e.g., a container or closure) even if it is the second party that actually applies the composition to a metal substrate in commerce, uses such coated substrate in commerce on a metal substrate of packaging containers, and/or fills such coated containers with product.

Coated Metal Substrate and Method of Coating

The present disclosure also provides a coated metal substrate. The metal substrate is preferably of suitable thickness to form a metal food or beverage container (e.g., can), an aerosol container (e.g., can), a general packaging container (e.g., can), or a closure, e.g., for a glass jar. In certain embodiments, the metal substrate has an average thickness of up to 635 microns, or up to 375 microns. In certain embodiments, the metal substrate has an average thickness of at least 125 microns. In embodiments in which a metal foil substrate is employed in forming, e.g., a packaging article, the thickness of the metal foil substrate may be even thinner than that described above.

Such metal substrate has a hardened adherent coating disposed on at least a portion of a surface thereof. The hardened adherent coating is formed from a metal packaging (e.g., a food, beverage, or aerosol can) powder coating composition as described herein with or without one or more optional additives.

Hardened (e.g., cured) coatings of the disclosure preferably adhere well to metal (e.g., steel, stainless steel, tin-free steel (TFS), tin-plated steel, electrolytic tin plate (ETP), aluminum, etc.). They also provide high levels of resistance to corrosion or degradation that may be caused by prolonged exposure to, for example, food, beverage, or aerosol products.

In the context of a hardened adherent coating being disposed "on" a surface or substrate, both coatings applied directly (e.g., virgin metal or pre-treated metal such as electroplated steel) or indirectly (e.g., on a primer layer) to the surface or substrate are included. Thus, for example, a coating applied to a pre-treatment layer (e.g., formed from a chrome or chrome-free pretreatment) or a primer layer overlying a substrate constitutes a coating applied on (or disposed on) the substrate.

If a steel sheet is used as the metal substrate, the surface treatment may comprise one, two, or more kinds of surface treatments such as zinc plating, tin plating, nickel plating, electrolytic chromate treatment, chromate treatment, and phosphate treatment. If an aluminum sheet is used as the metal substrate, the surface treatment may include an inorganic chemical conversion treatment such as chromic phosphate treatment, zirconium phosphate treatment, or phosphate treatment; an organic/inorganic composite chemical conversion treatment based on a combination of an inorganic chemical conversion treatment with an organic component as exemplified by a water-soluble resin such as an acrylic resin or a phenol resin, and tannic acid; or an application-type treatment based on a combination of a water-soluble resin such as an acrylic resin with a zirconium salt.

The hardened adherent coating is preferably continuous. As such, it is free of pinholes and other coating defects that result in exposed substrate, which can lead to (i) unacceptable corrosion of the substrate, and can even potentially lead to a hole in the substrate and product leakage, and/or (ii) adulteration of the packaged product. Except in embodiments in which coating roughness or texture is desired (e.g., for certain exterior can coatings for aesthetic purposes), the hardened continuous coating is preferably smooth, especially for most interior can coatings.

In certain embodiments, the hardened continuous adherent coating has an average thickness of up to 100 microns (particularly the coating has texture), up to 50 microns, up to 25 microns, up to 20 microns, up to 15 microns, or up to 10 microns. Interior can coatings are typically less than 10 microns thick on average. In certain embodiments, the hardened adherent coating has an average thickness of at least 1 micron, at least 2 microns, at least 3 microns, or at least 4 microns.

The hardened coatings may be used as coatings on any suitable surface, including inside surfaces of metal packaging containers (e.g., food, beverage, or aerosol can bodies, such as three-piece aerosol cans or aluminum monobloc aerosol cans), outside surfaces of such container bodies, riveted can ends, pull tabs, and combinations thereof. The hardened coatings may also be used on interior or exterior surfaces of other packaging containers, or portions thereof, metal closures (e.g., for glass containers) including bottle crowns, or metered dose inhaler (MDI) cans. Such specific cans, with interior food-contact surfaces, riveted can ends, and pull tabs have specific flexibility requirements, as well as taste, toxicity, and other government regulatory requirements.

The powder coating compositions of the present disclosure may also be used on substrates other than rigid metal substrate, including substrates for use in packaging food or beverage products or other products. For example, the powder coating compositions may be used to coat the interior or exterior surfaces of metal or plastic pouches or other flexible packaging. The powder coating compositions may also be used to coat fiberboard or paperboard (e.g., as employed for Tetra Pack containers and the like); various plastic containers (e.g., polyolefins), wraps, or films; metal foils; or glass (e.g., exteriors of glass bottles to prevent scratching or provide desired color or other aesthetic effects).

In certain embodiments, the hardened coating includes less than 50 ppm, less than 25 ppm, less than 10 ppm, or less than 1 ppm, extractables, if any, when tested pursuant to the Global Extraction Test described in the Examples Section. Significantly, such coatings are suitable for use on food-contact surfaces. Thus, in certain embodiments, a metal packaging container (e.g., a food, beverage, or aerosol can) is provided that includes such coated metal substrate, particularly wherein the coated surface of the metal substrate forms an interior surface of the container body (which contacts a food, beverage or aerosol product). Alternatively, the coated surface is a surface of a riveted can end and/or a pull tab.

In certain embodiments, the metal substrate is in the form of a planar coil or sheet. Sheet coating involves applying a coating composition to separate pieces of a substrate that has been pre-cut into square or rectangular "sheets." Coil coating is a special application method in which coiled metal strips (e.g., aluminum) are unwound and then passed through pretreating, coating, and drying equipment before finally being rewound. It is believed the use of preferred powder coating compositions of the present disclosure can eliminate the need for the pretreatment step employed when using conventional liquid coatings, thereby simplifying the application process and removing cost. Coil coating allows for very efficient coating of large surface areas in a short time at high throughput.

For example, in some embodiments, the moving surface of a coil substrate in a continuous process is traveling at a line speed of at least 50 meters per minute, at least 100 meters per minute, at least 200 meters per minute, or at least 300 meters per minute. Typically, the line speed will be less than 400 meters per minute. In certain embodiments, the curing time of the coil coating applied coating compositions is at least 6 seconds, at least 10 seconds, or at least 12 seconds, and, in certain embodiments, up to 20 seconds, up to about 25 seconds, or up to about 30 seconds. In the context of thermal bakes to cure the coil coating, such curing times refer to the residence time in the oven(s). In such embodiments, the curing process is typically conducted to achieve peak metal temperatures of 200° C. to 260° C.

Thus, the process of applying a powder coating composition to a substrate according to the present disclosure is preferably used in a coil-coating process or in a sheet-coating process.

In certain embodiments, the hardened coating is formed from a metal packaging powder coating composition as described herein with or without one or more optional additives, particularly one with the powder polymer particles described herein and a lubricant. The lubricant may be present in the hardened coating in the powder polymer particles, on the powder polymer particles, in another ingredient used to form the powder coating composition (or the hardened coating formed therefrom), or a combination thereof. Alternatively or additionally, a lubricant as described herein (e.g., carnauba wax, synthetic wax, polytetrafluoroethylene wax, polyethylene wax, polypropylene wax, or a combination thereof) may be applied to the hardened coating or otherwise disposed on a surface of the hardened coating (e.g., via application of another powder composition). Similarly, in some embodiments, the lubricant may be applied in a separate powder layer applied to a first powder layer including the polymer particles of the present disclosure prior to coating cure (i.e., in a so called "dust-on-dust" application technique). However, when it is incorporated into or on the hardened coating, in certain embodiments, a lubricant is present in an amount of at least 0.1 wt-% (or at least 0.5 wt-%, or at least 1 wt-%), and in certain embodiments, a lubricant is present in an amount of up to 4 wt-% (or up to 3 wt-%, or up to 2 wt-%), based on the total weight of the powder coating composition (or hardened coating formed therefrom).

In certain embodiments, a hardened coating that includes an amorphous polymer (and/or semicrystalline polymer with amorphous portions) has a glass transition temperature (Tg) of at least 40° C., at least 50° C., at least 60° C., or at least 70° C., and in certain embodiments, a Tg of up to 150° C., up to 130° C., up to 110° C., or up to 100° C. For many packaging technologies, especially for interior can coatings for more aggressive products, higher Tg coatings are preferred for corrosion resistance.

In some embodiments, the hardened coating does not have any detectable Tg.

In certain embodiments, a hardened coating produced from preferred embodiments of the powder coating composition is capable of passing a 4T T-Bend test when disposed on conventional aluminum beverage can end stock at a conventional average dry film coating weight for an interior beverage can coating (e.g., about 2.3 grams per square meter for an interior soda beverage can coating). A useful T-bend testing procedure is described in ASTM D4145-10 (2010, Reapproved 2018).

Flexibility is especially important for a hardened coating on a metal substrate that is fabricated into a metal packaging container (e.g., a food, beverage, or aerosol can) or part of the container (e.g., can), such as a riveted can end or pull tab. Flexibility is important so that the coating can deflect with the metal substrate during post-cure fabrication steps (e.g., necking and dome reformation), or if the can is dropped from a reasonable height during transport or use.

Flexibility can be determined using the Flexibility Test described in the Examples Section, which measures the ability of a coated substrate to retain its integrity as it undergoes the formation process necessary to produce a riveted beverage can end. It is a measure of the presence or absence of cracks or fractures in the formed end. Preferably, a hardened coating formed from a coating composition described herein passes this Flexibility Test. More preferably, a coating composition, when applied to a cleaned and pretreated aluminum panel and subjected to a curative bake for an appropriate duration to achieve a 242° C. peak metal temperature (PMT) and a dried film thickness of approximately 7.5 milligram per square inch and formed into a fully converted 202 standard opening beverage can end, passes less than 5 milliamps of current while being exposed for 4 seconds to an electrolyte solution containing 1% by weight of NaCl dissolved in deionized water.

Method of Coating a Metal Substrate

A method of coating a metal substrate suitable for use in forming metal packaging (e.g., a metal packaging container such as a food, beverage, aerosol, or general packaging container (e.g., can), or a portion thereof, or a metal closure) is also provided. Such method includes: providing a metal packaging powder coating composition that includes particles (preferably includes triboelectrically charged particles) as described herein; directing the powder coating composition (preferably triboelectrically charged powder coating composition) to at least a portion of the metal substrate (e.g., coil or sheet), preferably by means of an electromagnetic field (e.g., electric field), or any other suitable type of applied field; and providing conditions effective for the powder coating composition to form a hardened continuous coating on at least a portion of the metal substrate.

In certain embodiments, directing the powder coating composition to at least a portion of the metal substrate, includes: feeding the powder coating composition to a transporter; and directing the powder coating composition (preferably, triboelectrically charged powder coating composition) from the transporter to at least a portion of the metal substrate, by means of an electromagnetic field (e.g., electric field), or any other suitable type of applied field.

In certain embodiments, directing the powder coating composition includes directing the powder coating composition (preferably, triboelectrically charged powder coating composition) from the transporter to at least a portion of the metal substrate by means of an electric field between the transporter and the metal substrate.

In certain embodiments, directing the powder coating composition includes: directing the powder coating composition from the transporter to a transfer medium by means of an electromagnetic field (e.g., electric field), or any other suitable type of applied field, between the transporter and the transfer medium; and transferring the powder coating composition from the transfer medium to at least a portion of the metal substrate. The transfer may be carried out by applying, for example, thermal energy (using thermal processing techniques), or other forces such as electrical, electrostatic, or mechanical forces.

This process is similar to conventional printing processes, but can result in a substantially (e.g., more than 90%) fully coated substrate, as opposed to a printing process, wherein the coverage is typically much less (e.g., only 10%) of the substrate. For example, the charging of the powder particles by friction or induction (known as triboelectric charging), and the transporting or conveying and the application to substrates can be effected using processes commonly known in photocopying technology or laser printer technology. In particular, an electric field can be applied using conventional methods, such as a corona discharge or a moving or fixed counter electrode. Such processes are elucidated in, for example, U.S. Pat. No. 6,342,273 (Handels et al.) and L. B. Schein, Electrophotography and Development Physics, pages 32-244, Volume 14, Springer Series in Electrophysics (1988).

In certain embodiments, a transfer medium can be used, including, for example conductive metallic drums. Transfer can be carried out in one or more steps using multiple transfer media.

In certain embodiments, the powder coating composition includes magnetic carrier particles, although non-magnetic particles may also be used. Suitable magnetic carrier particles have a core of, for example, iron, steel, nickel, magnetite, $\gamma$-$Fe_2O_3$, or certain ferrites such as for example CuZn, NiZn, MnZn and barium ferrites. Suitable non-magnetic carrier particles include glass, non-magnetic metal, polymer, and ceramic material. These particles can be of various shapes, for example, irregular or regular shape, and sizes (e.g., similar to the particle sizes of the powder polymer particles), although spherical, substantially spherical, or potato shaped are preferred.

In certain embodiments, the transporter includes a magnetic roller and the powder coating composition is conveyed by means of a magnetic roller as described in, for example, U.S. Pat. No. 4,460,266 (Kopp et al.). In addition to a magnetic roller or brush apparatus also useful in the present process are, for example, non-magnetic cascade development processes. In addition, transport by air, for example, powder cloud development, can be used, as described, for example, in U.S. Pat. No. 2,725,304 (Landrigan et al.).

Figure 3A:
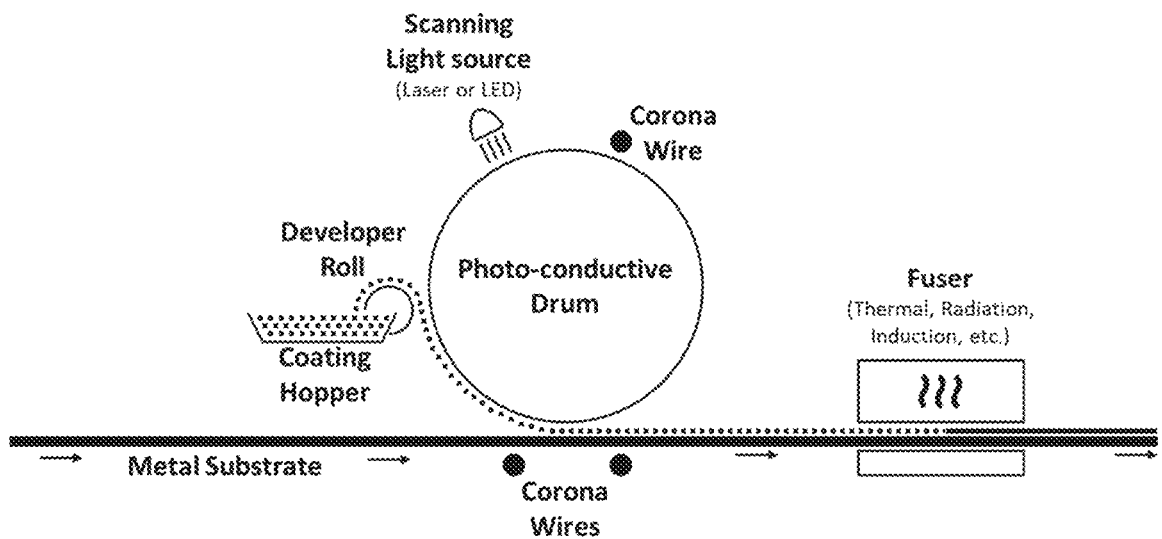
FIGS. 3A and 3B are line drawings of an application device capable of delivering a powder coating composition to a substrate.
Figure 3B:
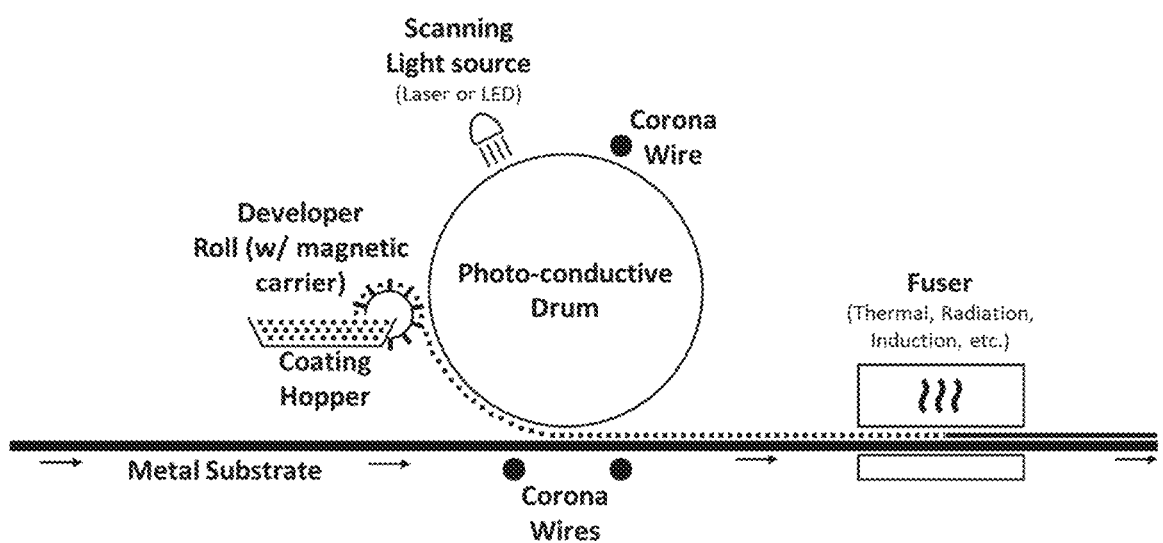

FIG. 3A provides a line drawing of an application device capable of delivering a powder coating composition to a substrate without the aid of magnetic carrier particles. FIG. 3B provides a line drawing of an application device capable of delivering a powder coating composition to a substrate with the aid of a magnetic carrier. During an exemplary process, a uniform charge (either positive or negative) is induced on the surface of a photo-conductive drum (i.e., a drum having a photo-conductive coating thereon) by a corona wire. A scanning light source (for example, either a laser and mirror assembly or a light emitting diode (LED) array) converts a computer-generated image into a corresponding pattern on the drum. The photo-conductive coating on the drum will invert to the opposite charge anywhere the light source impinges on the surface of the drum. Concurrently, a powder coating composition is triboelectrically charged by movement through a series of augers and a developer roll. This charge is such that the powder (once brought into close contact with the drum) is electrostatically adhered to the areas of the drum that were cross-charged by the scanning light source.

In some cases, as demonstrated by FIG. 3A, the powder coating formulation is developed such that no magnetic carrier particles are required. This is typically done by careful selection of charge control and flow control agents discussed elsewhere in this filing. In some cases, as demonstrated by FIG. 3B, magnetic carrier particles (which are generally not transferred to the drum or substrate) are employed to help the powder coating particles maintain their latent charge from triboelectric charging.

One or more corona wires, as shown in FIGS. 3A and 3B, then provide a sufficient opposite charge on the metal substrate to transfer the powder coating particles from the drum to the substrate, in the same pattern that the scanning light source created on the drum. The resulting pattern of powder coating particles on the metal substrate are then passed through a thermal, radiation, or induction fuser that causes the particles to fuse into one another and form a continuous coating.

In certain embodiments, the conditions effective for the powder coating composition to form a hardened coating on at least a portion of the metal substrate includes applying thermal energy (e.g., using a convection oven or induction coil), UV radiation, IR radiation, or electron beam radiation to the powder coating composition. Such processes can be carried out in one or more discrete or combined steps. In certain embodiments, the conditions include applying thermal energy. In certain embodiments, applying thermal energy includes using oven temperatures of at least 100° C. or at least 177° C. In certain embodiments, applying thermal energy includes using oven temperatures of up to 300° C. or up to 250° C. In certain embodiments, applying thermal energy includes heating the coated metal substrate over a suitable time period to a peak metal temperature (PMT) of at least 177° C. In certain embodiments, applying thermal energy includes heating the coated metal substrate over a suitable time period to a peak metal temperature (PMT) of at least 218° C. The time period may be as short as 5 seconds, or as long as 15 minutes, and preferably less than one minute for forming a coil coating. Preferably, this occurs in a continuous process.

Coated metal substrates of the present disclosure may be drawn and redrawn. Significantly, the coating on the resultant thinned metal substrate remains continuous and adherent.

Metal Packaging and Method of Making

The present disclosure also provides metal packaging (e.g., a metal packaging container such as a food, beverage, aerosol, or general packaging container (e.g., can), a portion thereof, or a metal closure) that includes a coated metal substrate as described herein. In certain embodiments, the coated surface of the metal substrate forms an interior surface of the container (e.g., can) or closure (although it can form an exterior surface). In certain embodiments, the coated surface of the metal substrate is a surface of a riveted can end, a pull tab, and/or a can body. In certain embodiments, the metal packaging container (e.g., food, beverage, or aerosol can) is filled with a food, beverage, or aerosol product.

In certain embodiments, a method of making metal packaging (e.g., a metal packaging container such as a food, beverage, aerosol, or general packaging container (e.g., can), a portion thereof, or a metal closure for a container such as a metal can or glass jar) is provided. The method includes: providing a metal substrate (e.g., coil or sheet) having a hardened continuous adherent coating disposed on at least a portion of a surface thereof, wherein: the metal substrate has an average thickness of up to 635 microns; the hardened continuous adherent coating is formed from a metal packaging powder coating composition; wherein the powder coating composition comprises powder polymer particles comprising a polymer having a number average molecular weight of at least 2000 Daltons, wherein the powder polymer particles have a particle size distribution having a D50 of less than 25 microns; and forming the substrate (e.g., by stamping) into at least a portion of a metal packaging container (e.g., food, beverage, aerosol, or general packaging can) or a portion thereof, or a metal closure for a container (e.g., metal can or glass jar).

For example, two-piece or three-piece cans or portions thereof such as stamped riveted beverage can ends (e.g., soda or beer cans) with a hardened coating formed from the powder coating composition described herein disposed thereon can be formed using such a method. Standard fabrication techniques, e.g., stamping, can be used.

In certain embodiments, the coated surface of the metal substrate forms an interior surface of a can. In certain embodiments, the coated surface of the metal substrate is a surface of a riveted can end, a pull tab, and/or a can body. In certain embodiments, the can is filled with a food, beverage, or aerosol product.

EXEMPLARY EMBODIMENTS

Embodiments A: Metal Packaging Powder Coating Composition

Embodiment A-1 is a metal packaging (e.g., a food, beverage, aerosol, or general packaging container (e.g., can), portion thereof, or metal closure) powder coating composition comprising: powder polymer particles (preferably, spray dried powder polymer particles) comprising a polymer having a number average molecular weight of at least 2000 Daltons, wherein the powder polymer particles have a particle size distribution having a D50 of less than 25 microns; and one or more charge control agents in contact with the powder polymer particles.

Embodiment A-2 is the powder coating composition of Embodiment A-1, wherein the powder polymer particles have a particle size distribution having a D50 of less than 20 microns, less than 15 microns, or less than 10 microns.

Embodiment A-3 is the powder coating composition of Embodiment A-1 or A-2, wherein the powder polymer particles have a particle size distribution having a D90 of less than 25 microns, less than 20 microns, less than 15 microns, or less than 10 microns.

Embodiment A-4 is the powder coating composition of any of the preceding embodiments, wherein the powder polymer particles have a particle size distribution having a D95 of less than 25 microns, less than 20 microns, less than 15 microns, or less than 10 microns.

Embodiment A-5 is the powder coating composition of any of the preceding embodiments, wherein the powder polymer particles have a particle size distribution having a D99 of less than 25 microns, less than 20 microns, less than 15 microns, or less than 10 microns.

Embodiment A-6 is the powder coating composition of any of the preceding embodiments, wherein the powder polymer particles have a particle size distribution having a D50 (in certain embodiments, a D90, D95, or a D99) of greater than 1 micron, greater than 2 microns, greater than 3 microns, or greater than 4 microns.

Embodiment A-7 is the powder coating composition of any of the preceding embodiments, wherein the powder coating composition as a whole has a particle size distribution having a D50 (preferably, a D90, D95, or a D99) of less than 25 microns, less than 20 microns, less than 15 microns, or less than 10 microns, and optionally also a D90 of less than 25 microns, less than 20 microns, less than 15 microns, or less than 10 microns.

Embodiment A-8 is the powder coating composition of any of the preceding embodiments comprising at least 50 wt-%, at least 60 wt-%, at least 70 wt-%, at least 80 wt-%, or at least 90 wt-% of the powder polymer particles, based on the total weight of the powder coating composition.

Embodiment A-9 is the powder coating composition of any of the preceding embodiments comprising up to 100 wt-%, up to 99.99 wt-%, up to 95 wt-%, or up to 90 wt-%, of the powder polymer particles, based on the total weight of the powder coating composition.

Embodiment A-10 is the powder coating composition of any of the preceding embodiments, wherein the one or more charge control agents are present in an amount of at least 0.01 wt-%, at least 0.1 wt-%, or at least 1 wt-%, based on the total weight of the powder coating composition (e.g., the charge control agent(s) and powder polymer particles).

Embodiment A-11 is the powder coating composition of any of the preceding embodiments, wherein the one or more charge control agents are present in an amount of up to 10 wt-%, up to 9 wt-%, up to 8 wt-%, up to 7 wt-%, up to 6 wt-%, up to 5 wt-%, up to 4 wt-%, or up to 3 wt-%, based on the total weight of the powder coating composition (e.g., the charge control agent(s) and powder polymer particles).

Embodiment A-12 is the powder coating composition of any of the preceding embodiments, wherein the powder polymer particles are chemically produced (as opposed to mechanically produced (e.g., ground) polymer particles).

Embodiment A-13 is the powder coating composition of any of the preceding embodiments, wherein the powder polymer particles have a shape factor of 100-140 (spherical and potato shaped), and preferably 120-140 (e.g., potato shaped).

Embodiment A-14 is the powder coating composition of any of the preceding embodiments, wherein the powder coating composition as a whole (i.e., the overall composition) has a shape factor of 100-140 (spherical and potato shaped), and preferably 120-140 (e.g., potato shaped).

Embodiment A-15 is the powder coating composition of any of the preceding embodiments, wherein the powder polymer particles have a compressibility index of 1 to 20 (or 1 to 10, 11 to 15, or 16 to 20).

Embodiment A-16 is the powder coating composition of any of the preceding embodiments, wherein the powder coating composition as a whole has a compressibility index of 1 to 20 (or 1 to 10, 11 to 15, or 16 to 20).

Embodiment A-17 is the powder coating composition of any of the preceding embodiments, wherein the powder polymer particles have a Haussner Ratio of 1.00 to 1.25 (or 1.00 to 1.11, 1.12 to 1.18, or 1.19 to 1.25).

Embodiment A-18 is the powder coating composition of any of the preceding embodiments, wherein the powder coating composition as a whole has a Haussner Ratio of 1.00 to 1.25 (or 1.00 to 1.11, 1.12 to 1.18, or 1.19 to 1.25).

Embodiment A-19 is the powder coating composition of any of the preceding embodiments, wherein the powder polymer particles comprise a thermoplastic polymer.

Embodiment A-20 is the powder coating composition of any of the preceding embodiments, wherein the powder polymer particles comprise a polymer having a melt flow index greater than 15 grams/10 minutes, greater than 50 grams/10 minutes, or greater than 100 grams/10 minutes.

Embodiment A-21 is the powder coating composition of any of the preceding embodiments, wherein the powder polymer particles comprise a polymer having a melt flow index of up to 200 grams/10 minutes, or up to 150 grams/10 minutes.

Embodiment A-22 is the powder coating composition of any of the preceding embodiments, wherein the powder coating composition as a whole exhibits a melt flow index greater than 15 grams/10 minutes, greater than 50 grams/10 minutes, or greater than 100 grams/10 minutes.

Embodiment A-23 is the powder coating composition of any of the preceding embodiments, wherein the powder coating composition as a whole exhibits a melt flow index of up to 200 grams/10 minutes, or up to 150 grams/10 minutes.

Embodiment A-24 is the powder coating composition of any of the preceding embodiments, wherein the powder polymer particles comprise a thermoset polymer.

Embodiment A-25 is the powder coating composition of any of the preceding embodiments, wherein the powder polymer particles comprise an amorphous polymer having a glass transition temperature (Tg) of at least 0° C., at least 30° C., at least 40° C., at least 50° C., at least 60° C., or at least 70° C.

Embodiment A-26 is the powder coating composition of any of the preceding embodiments, wherein the powder polymer particles comprise an amorphous polymer having a Tg of up to 150° C., up to 125° C., up to 110° C., up to 100° C., or up to 80° C. Embodiment A-27 is the powder coating composition of any of the preceding embodiments, wherein the powder polymer particles comprise a crystalline or semi-crystalline polymer having a melting point of at least 40° C.

Embodiment A-28 is the powder coating composition of any of the preceding embodiments, wherein the powder polymer particles comprise a crystalline or semi-crystalline polymer having a melting point of up to 130° C.

Embodiment A-29 is the powder coating composition of any of the preceding embodiments, wherein the powder polymer particles comprise a polymer selected from a polyacrylic, polyether, polyolefin, polyester, polyurethane, polycarbonate, polystyrene, or a combination thereof (i.e., copolymer or mixture thereof such as acrylonitrile butadiene styrene). Preferably, the polymer is selected from a polyacrylic, polyether, polyolefin, polyester, or a combination thereof.

Embodiment A-30 is the powder coating composition of any of the preceding embodiments, wherein the polymer Mn is at least 5,000 Daltons, at least 10,000 Daltons, or at least 15,000 Daltons.

Embodiment A-31 is the powder coating composition of any of the preceding embodiments, wherein the polymer Mn is up to 10,000,000 Daltons, up to 1,000,000 Daltons, up to 100,000 Daltons, or up to 20,00 Daltons.

Embodiment A-32 is the powder coating composition of any of the preceding embodiments, wherein the polymer has a polydispersity index (Mw/Mn) of less than 4, less than 3, less than 2, or less than 1.5.

Embodiment A-33 is the powder coating composition of any of the preceding embodiments, wherein the one or more charge control agents are disposed on a surface of the powder polymer particles (in certain embodiments, the polymer particles are at least substantially coated, or even completely coated, with charge control agent).

Embodiment A-34 is the powder coating composition of any of the preceding embodiments, wherein the one or more charge control agents enable the powder polymer particles to efficiently accept a charge to facilitate application to substrate.

Embodiment A-35 is the powder coating composition of Embodiment A-34, wherein the one or more charge control agents provide a triboelectric charge to the powder polymer particles by friction, during application to a substrate, thereby forming charged powder polymer particles.

Embodiment A-36 is the powder coating composition of any of the preceding embodiments, wherein the one or more charge control agents comprise particles having particle sizes in the sub-micron range (e.g., less than 1 micron, 100 nanometers or less, 50 nanometers or less, or 20 nanometers or less).

Embodiment A-37 is the powder coating composition of any of the preceding embodiments, wherein the one or more charge control agents comprise inorganic particles.

Embodiment A-38 is the powder coating composition of any of the preceding embodiments, wherein the one or more charge control agents comprise hydrophilic fumed aluminum oxide particles, hydrophilic precipitated sodium aluminum silicate particles, metal carboxylate and sulfonate particles, quaternary ammonium salts (e.g., quaternary ammonium sulfate or sulfonate particles), polymers containing pendant quaternary ammonium salts, ferromagnetic particles, transition metal particles, nitrosine or azine dyes, copper phthalocyanine pigments, metal complexes of chromium, zinc, aluminum, zirconium, calcium, or combinations thereof.

Embodiment A-39 is the powder coating composition of any of the preceding embodiments further comprising one or more optional additives selected from lubricants, adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, metal driers, and combinations thereof.

Embodiment A-40 is the powder coating composition of Embodiment A-39 further comprising one or more lubricants.

Embodiment A-41 is the powder coating composition of Embodiment A-40, wherein the one or more lubricants are present in the powder coating composition in an amount of at least 0.1 wt-%, at least 0.5 wt-%, or at least 1 wt-%, based on the total weight of the powder coating composition.

Embodiment A-42 is the powder coating composition of Embodiment A-40 or A-41, wherein the one or more lubricants are present in the powder coating composition in an amount of up to 4 wt-%, up to 3 wt-%, or up to 2 wt-%, based on the total weight of the powder coating composition.

Embodiment A-43 is the powder coating composition of any of Embodiments A-39 through A-42 further comprising one or more crosslinkers and/or catalysts.

Embodiment A-44 is the powder coating composition of any of the preceding embodiments, wherein the powder polymer particles comprise agglomerates (i.e., clusters) of primary polymer particles.

Embodiment A-45 is the powder coating composition of Embodiment A-44, wherein the agglomerates have a particle size of 1 micron to 25 microns.

Embodiment A-46 is the powder coating composition of Embodiment A-44 or A-45, wherein and the primary polymer particles have a primary particle size of 0.05 micron to 8 microns.

Embodiment A-47 is the powder coating composition of any of the preceding embodiments, wherein the powder polymer particles are spray dried powder polymer particles.

Embodiment A-48 is the powder coating composition of any of the preceding embodiments which is substantially free of each of bisphenol A, bisphenol F, and bisphenol S, structural units derived therefrom, or both.

Embodiment A-49 is the powder coating composition of any of the preceding embodiments which is substantially free of all bisphenol compounds, structural units derived therefrom, or both, except for TMBPF.

Embodiment A-50 is the powder coating composition of any of the preceding embodiments which forms a hardened coating that includes less than 50 ppm, less than 25 ppm, less than 10 ppm, or less than 1 ppm, extractables, if any, when tested pursuant to the Global Extraction Test.

Embodiment A-51 is the powder coating composition of any of the preceding embodiments which forms a hardened coating that adheres to a substrate, such as a metal substrate, according to the Adhesion Test with an adhesion rating of 9 or 10, preferably 10.

Embodiment A-52 is the powder coating composition of any of the preceding embodiments which forms a continuous hardened coating that is free of pinholes and other coating defects that result in exposed substrate. Such film imperfections/failures can be indicated by a current flow measured in milliamps (mA) using the Flat Panel Continuity Test described in the Examples Section.

Embodiment A-53 is the powder coating composition of any of the preceding embodiments which, when applied to a cleaned and pretreated aluminum panel and subjected to a curative bake for an appropriate duration to achieve a 242° C. peak metal temperature (PMT) and a dried film thickness of approximately 7.5 milligram per square inch and formed into a fully converted 202 standard opening beverage can end, passes less than 5 milliamps of current while being exposed for 4 seconds to an electrolyte solution containing 1% by weight of NaCl dissolved in deionized water.

Embodiments B: Method of Making a Metal Packaging Powder Coating Composition

Embodiment B-1 is a method of making a metal packaging (e.g., a food, beverage, aerosol, or general packaging container, portion thereof, or metal closure) powder coating composition, the method comprising: providing powder polymer particles (preferably, spray dried powder polymer particles) comprising a polymer having a number average molecular weight of at least 2000 Daltons; wherein the powder polymer particles have a particle size distribution having a D50 of less than 25 microns; and applying one or more charge control agents to the powder polymer particles and forming a powder coating composition; wherein the powder coating composition is a metal packaging (e.g., a food, beverage, aerosol, or general packaging container, portion thereof, or metal closure) powder coating composition.

Embodiment B-2 is the method of Embodiment B-1, wherein the powder polymer particles have a particle size distribution having a D50 of less than 20 microns, less than 15 microns, or less than 10 microns.

Embodiment B-3 is the method of Embodiment B-1 or B-2, wherein the powder polymer particles have a particle size distribution having a D90 of less than 25 microns, less than 20 microns, less than 15 microns, or less than 10 microns.

Embodiment B-4 is the method of any of the preceding embodiments, wherein the powder polymer particles have a particle size distribution having a D95 of less than 25 microns, less than 20 microns, less than 15 microns, or less than 10 microns.

Embodiment B-5 is the method of any of the preceding embodiments, wherein the powder polymer particles have a particle size distribution having a D99 of less than 25 microns, less than 20 microns, less than 15 microns, or less than 10 microns.

Embodiment B-6 is the method of any of the preceding embodiments, wherein the powder coating composition comprises at least 50 wt-%, at least 60 wt-%, at least 70 wt-%, at least 80 wt-%, or at least 90 wt-% of the powder polymer particles, based on the total weight of the powder coating composition.

Embodiment B-7 is the method of any of the preceding embodiments, wherein the powder coating composition comprises up to 100 wt-%, up to 99.99 wt-%, up to 95 wt-%, or up to 90 wt-%, of the powder polymer particles, based on the total weight of the powder coating composition.

Embodiment B-8 is the method of any of the preceding embodiments, wherein the powder coating composition comprises at least 0.01 wt-%, at least 0.1 wt-%, or at least 1 wt-%, of the one or more charge control agents, based on the total weight of the powder coating composition.

Embodiment B-9 is the method of any of the preceding embodiments, wherein the powder coating composition comprises up to 10 wt-%, up to 9 wt-%, up to 8 wt-%, up to 7 wt-%, up to 6 wt-%, up to 5 wt-%, up to 4 wt-%, or up to 3 wt-%, of the one or more charge control agents, based on the total weight of the powder coating composition.

Embodiment B-10 is the method of any of the preceding embodiments, wherein the powder polymer particles are chemically produced (as opposed to mechanically produced (e.g., ground) polymer particles).

Embodiment B-11 is the method of any of the preceding embodiments, wherein the powder polymer particles have a shape factor of 100-140 (spherical and potato shaped) (or 120-140 (e.g., potato shaped)).

Embodiment B-12 is the method of any of the preceding embodiments, wherein the powder polymer particles have a compressibility index of 1 to 20 (or 1 to 10, 11 to 15, or 16 to 20).

Embodiment B-13 is the method of any of the preceding embodiments, wherein the powder polymer particles have a Haussner Ratio of 1.00 to 1.25 (or 1.00 to 1.11, 1.12 to 1.18, or 1.19 to 1.25).

Embodiment B-14 is the method of any of the preceding embodiments, wherein providing the powder polymer particles comprises preparing a mixture of an organic solvent and a solid crystallizable polymer; heating the mixture to a temperature sufficient to disperse, but not melt, the solid crystallizable polymer in the organic solvent; and cooling the mixture to form precipitated polymer particles.

Embodiment B-15 is the method of any of Embodiments B-1 through B-13, wherein providing the powder polymer particles comprises forming an aqueous polymeric emulsion, suspension, solution, or dispersion; and drying the aqueous polymeric emulsion, suspension, solution, or dispersion to form powder polymer particles.

Embodiment B-16 is the method of Embodiment B-15, wherein drying comprises spray drying, fluidized bed drying, vacuum drying, radiant drying, freeze drying, or flash drying.

Embodiment B-17 is the method of Embodiment B-16, wherein drying comprises spray drying.

Embodiment B-18 is the method of Embodiment B-17, wherein applying the one or more charge control agents comprises introducing one or more charge control agents during, prior to, or both during and prior to, the spray drying process such that polymer droplets or nascent forming particles contact charge control agent.

Embodiment B-19 is the method of any of Embodiments B-1 through B-17, wherein applying the one or more charge control agents comprise applying one or more charge control agents to dry powder polymer particles.

Embodiment B-20 is the method of any of the preceding embodiments, wherein applying the one or more charge control agents comprises applying one or more charge control agents to a surface of the powder polymer particles.

Embodiment B-21 is the method of Embodiment B-20, wherein applying one or more charge control agents to a surface of the powder polymer particles comprises completely coating the polymer particles with one or more charge control agents.

Embodiment B-22 is the method of Embodiment B-20 or B-21, wherein applying one or more charge control agents to a surface of the powder polymer particles comprises adhering the one or more charge control agents to the surface of the powder polymer particles.

Embodiment B-23 is the method of any of the preceding embodiments, wherein the powder polymer particles comprise a thermoplastic polymer.

Embodiment B-24 is the method of any of the preceding embodiments, wherein the powder polymer particles comprise a polymer having a melt flow index greater than 15 grams/10 minutes, greater than 50 grams/10 minutes, or greater than 100 grams/10 minutes, and in certain embodiments, a melt flow index of up to 200 grams/10 minutes, or up to 150 grams/minutes.

Embodiment B-25 is the method of any of the preceding embodiments, wherein the powder polymer particles comprise an amorphous polymer having a glass transition temperature (Tg) of at least 0° C., at least 30° C., at least 40° C., at least 50° C., at least 60° C., or at least 70° C.

Embodiment B-26 is the method of any of the preceding embodiments, wherein the powder polymer particles comprise an amorphous polymer having a Tg of up to 150° C., up to 125° C., up to 110° C., up to 100° C., or up to 80° C.

Embodiment B-27 is the method of any of the preceding embodiments, wherein the powder polymer particles comprise a crystalline or semi-crystalline polymer having a melting point of at least 40° C.

Embodiment B-28 is the method of any of the preceding embodiments, wherein the powder polymer particles comprise a crystalline or semi-crystalline polymer having a melting point of up to 130° C.

Embodiment B-29 is the method of any of the preceding embodiments, wherein the powder polymer particles comprise a polymer selected from an acrylic (i.e., acrylate), polyether, polyolefin, polyester, polyurethane, polyurethane, polycarbonate, polystyrene, or a combination thereof (i.e., copolymer or mixture thereof such as acrylonitrile butadiene styrene).

Embodiment B-30 is the method of any of the preceding embodiments, wherein the polymer Mn is at least 5,000 Daltons, at least 10,000 Daltons, or at least 15,000 Daltons.

Embodiment B-31 is the method of any of the preceding embodiments, wherein the polymer Mn is up to 10,000,000 Daltons, up to 1,000,000 Daltons, up to 100,000 Daltons, or up to 20,00 Daltons.

Embodiment B-32 is the method of any of the preceding embodiments, wherein the polymer has a polydispersity index (Mw/Mn) of less than 4, less than 3, less than 2, or less than 1.5.

Embodiment B-33 is the method of any of the preceding embodiments, wherein the one or more charge control agents enable the powder polymer particles to efficiently accept a triboelectric charge to facilitate application to a substrate.

Embodiment B-34 is the method of any of the preceding embodiments, wherein the one or more charge control agents comprise particles having particle sizes in the sub-micron range (e.g., less than 1 micron, 100 nanometers or less, 50 nanometers or less, or 20 nanometers or less).

Embodiment B-35 is the method of any of the preceding embodiments, wherein the one or more charge control agents comprise inorganic particles.

Embodiment B-36 is the method of any of the preceding embodiments, wherein the one or more charge control agents comprise hydrophilic fumed aluminum oxide particles, hydrophilic precipitated sodium aluminum silicate particles, metal carboxylate and sulfonate particles, quaternary ammonium salts (e.g., quaternary ammonium sulfate or sulfonate particles), polymers containing pendant quaternary ammonium salts, ferromagnetic particles, transition metal particles, nitrosine or azine dyes, copper phthalocyanine pigments, metal complexes of chromium, zinc, aluminum, zirconium, calcium, or combinations thereof.

Embodiment B-37 is the method of any of the preceding embodiments further comprising adding one or more optional additives to the powder coating composition.

Embodiment B-38 is the method of Embodiment B-37, wherein adding one or more optional additives comprises combining the one or more optional additives with the powder polymer particles, the charge control agent(s), or both.

Embodiment B-39 is the method of Embodiment B-38, wherein adding one or more optional additives comprises incorporating the one or more optional additives into the powder polymer particles, coating the one or more optional additives on the powder polymer particles, or blending the one or more optional additives with the powder polymer particles.

Embodiment B-40 is the method of Embodiment B-39, wherein adding one or more optional additives comprises adding the one or more optional additives during powder polymer particle preparation.

Embodiment B-41 is the method of any of Embodiments B-37 through B-40, wherein the one or more optional additives are selected from lubricants, adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, metal driers, and combinations thereof.

Embodiment B-42 is the method of Embodiment B-41 further comprising one or more lubricants.

Embodiment B-43 is the method of Embodiment B-42, wherein the one or more lubricants are present in the powder coating composition in an amount of at least 0.1 wt-%, at least 0.5 wt-%, or at least 1 wt-%, based on the total weight of the powder coating composition.

Embodiment B-44 is the method of Embodiment B-41 or B-42, wherein the one or more lubricants are present in the powder coating composition in an amount of up to 4 wt-%, up to 3 wt-%, or up to 2 wt-%, based on the total weight of the powder coating composition.

Embodiment B-45 is the method of any of Embodiments B-41 through B-44 further comprising one or more crosslinkers and/or catalysts.

Embodiment B-46 is the method of any of the preceding embodiments, wherein the powder polymer particles comprise agglomerates (i.e., clusters) of primary polymer particles.

Embodiment B-47 is the method of Embodiment B-46, wherein the agglomerates have a particle size of 1 micron to 25 microns, and the primary polymer particles have a primary particle size of 0.05 micron to 8 microns.

Embodiment B-48 is the method of any of the preceding embodiments, wherein the powder coating composition is substantially free of each of bisphenol A, bisphenol F, and bisphenol S, structural units derived therefrom, or both.

Embodiment B-49 is the method of any of the preceding embodiments, wherein the powder coating composition is substantially free of all bisphenol compounds, structural units derived therefrom, or both, except for TMBPF.

Embodiment B-50 is the method of any of the preceding embodiments, wherein the powder coating composition forms a coating that includes less than 50 ppm, less than 25 ppm, less than 10 ppm, or less than 1 ppm, extractables, if any, when tested pursuant to the Global Extraction Test.

Embodiment B-51 is the method of any of the preceding embodiments, wherein the powder coating composition forms a coating that adheres to a substrate, such as a metal substrate, according to the Adhesion Test with an adhesion rating of 9 or 10, preferably 10.

Embodiment B-52 is the method of any of the preceding embodiments, wherein the powder coating composition forms a continuous hardened coating that is free of pinholes and other coating defects that result in exposed substrate. Such film imperfections/failures can be indicated by a current flow measured in milliamps (mA) using the Flat Panel Continuity Test described in the Examples Section.

Embodiment B-53 is the method of any of the preceding embodiments, wherein the powder coating composition which, when applied to a cleaned and pretreated aluminum panel and subjected to a curative bake for an appropriate duration to achieve a 242° C. peak metal temperature (PMT) and a dried film thickness of approximately 7.5 milligram per square inch and formed into a fully converted 202 standard opening beverage can end, passes less than 5 milliamps of current while being exposed for 4 seconds to an electrolyte solution containing 1% by weight of NaCl dissolved in deionized water.

Embodiment B-54 is the method of any of the preceding embodiments further comprising causing the metal packaging powder coating composition to be used on a metal substrate of metal packaging.

Embodiments C: Method of Coating a Metal Substrate

Embodiment C-1 is a method of coating a metal substrate suitable for use in forming metal packaging (e.g., a metal packaging container such as a food, beverage, or aerosol container (e.g., can), a portion thereof, or metal closure), the method comprising: providing a metal packaging powder coating composition, wherein the powder coating composition comprises powder polymer particles (preferably, spray dried powder polymer particles) comprising a polymer having a number average molecular weight of at least 2000 Daltons, wherein the powder polymer particles have a particle size distribution having a D50 of less than 25 microns; directing the powder coating composition to at least a portion of the metal substrate, wherein the metal substrate has an average thickness of up to 635 microns; and providing conditions effective for the powder coating composition to form a hardened continuous adherent coating on at least a portion of the metal substrate, wherein the hardened continuous adherent coating has an average thickness of up to 100 microns (e.g., for textured can exteriors) (preferably up to 50 microns, more preferably up to 25 microns, even more preferably up to 20 microns, still more preferably up to 15 microns, and most preferably up to 10 microns).

Embodiment C-2 is the method of Embodiment C-1, wherein the powder coating composition comprises at least 50 wt-%, at least 60 wt-%, at least 70 wt-%, at least 80 wt-%, or at least 90 wt-% of the powder polymer particles, based on the total weight of the powder coating composition.

Embodiment C-3 is the method of Embodiment C-1 or C-2, wherein the powder coating composition comprises up to 100 wt-%, up to 99.99 wt-%, up to 95 wt-%, or up to 90 wt-%, of the powder polymer particles, based on the total weight of the powder coating composition.

Embodiment C-4 is the method of any of the preceding embodiments, wherein the powder coating composition comprises one or more charge control agents in contact with the powder polymer particles.

Embodiment C-5 is the method of Embodiment C-4, wherein the powder coating composition comprises at least 0.01 wt-%, at least 0.1 wt-%, or at least 1 wt-%, of the one or more charge control agents, based on the total weight of the powder coating composition.

Embodiment C-6 is the method of Embodiment C-4 or C-5, wherein the powder coating composition comprises up to 10 wt-%, up to 9 wt-%, up to 8 wt-%, up to 7 wt-%, up to 6 wt-%, up to 5 wt-%, up to 4 wt-%, or up to 3 wt-%, of the one or more charge control agents, based on the total weight of the powder coating composition.

Embodiment C-6 is the method of any of the previous embodiments, wherein directing the powder coating composition comprises directing the powder coating composition (preferably, triboelectrically charged powder coating composition) to at least a portion of the metal substrate, by means of an electromagnetic field (e.g., an electric field), or any other suitable type of applied field.

Embodiment C-7 is the method of Embodiment C-6, wherein directing the powder coating composition comprises directing the powder coating composition to at least a portion of the metal substrate, by means of an electric field.

Embodiment C-8 is the method of any of the preceding embodiments, wherein directing the powder coating composition to at least a portion of the metal substrate comprises: feeding the powder coating composition to a transporter; and directing the powder coating composition from the transporter to at least a portion of the metal substrate, by means of an electromagnetic field.

Embodiment C-9 is the method of embodiment C-8, wherein directing the powder coating composition from the transporter comprises directing the powder coating composition from the transporter to at least a portion of the metal substrate by means of an electric field between the transporter and the metal substrate.

Embodiment C-10 is the method of Embodiment C-8 or C-9, wherein directing the powder coating composition from the transporter comprises: directing the powder coating composition from the transporter to a transfer medium by means of an electric field between the transporter and the transfer medium; and transferring the powder coating composition from the transfer medium to at least a portion of the metal substrate.

Embodiment C-11 is the method of Embodiment C-10, wherein the transfer medium comprises a conductive metallic drum.

Embodiment C-12 is the method of Embodiment C-10 or C-11, wherein transferring the powder coating composition from the transfer medium to at least a portion of the metal substrate comprises applying thermal energy, or electrical, electrostatic, or mechanical forces.

Embodiment C-13 is the method of any of embodiments C-8 through C-12, wherein the transporter comprises a magnetic roller, and the powder coating composition comprises magnetic carrier particles.

Embodiment C-14 is the method of any of the preceding embodiments, wherein providing conditions effective for the powder coating composition to form a hardened coating on at least a portion of the metal substrate comprises applying thermal energy (e.g., using a convection oven or induction coil), UV radiation, IR radiation, or electron beam radiation to the powder coating composition.

Embodiment C-15 is the method of embodiment C-14, wherein the conditions comprise applying thermal energy.

Embodiment C-16 is the method of embodiment C-15, wherein applying thermal conditions comprise applying thermal energy at a temperature of at least 100° C. or at least 177° C.

Embodiment C-17 is the method of embodiment C-15 of C-16, wherein applying thermal conditions comprise applying thermal energy at a temperature of up to 300° C. or up to 250° C.

Embodiment C-18 is the method of any of the preceding embodiments, wherein the metal substrate comprises steel, stainless steel, tin-free steel (TFS), tin-plated steel, electrolytic tin plate (ETP), or aluminum.

Embodiment C-19 is the method of any of the preceding embodiments, wherein the metal substrate has an average thickness of up to 375 microns.

Embodiment C-20 is the method of any of the preceding embodiments, wherein the metal substrate has an average thickness of at least 125 microns.

Embodiment C-21 is the method of any of the preceding embodiments, wherein the hardened continuous adherent coating has an average thickness of up to 25 microns, up to 20 microns, up to 15 microns, or up to 10 microns.

Embodiment C-22 is the method of any of the preceding embodiments, wherein the hardened adherent coating has an average thickness of at least 1 micron, at least 2 microns, at least 3 microns, or at least 4 microns.

Embodiment C-23 is the method of any of the preceding embodiments, wherein the powder polymer particles have a particle size distribution having a D50 of less than 20 microns, less than 15 microns, or less than 10 microns.

Embodiment C-24 is the method of any of the preceding embodiments, wherein the powder polymer particles have a particle size distribution having a D90 of less than 25 microns, less than 20 microns, less than 15 microns, or less than 10 microns.

Embodiment C-25 is the method of any of the preceding embodiments, wherein the powder polymer particles are chemically produced (as opposed to mechanically produced (e.g., ground) polymer particles).

Embodiment C-26 is the method of any of the preceding embodiments, wherein the powder polymer particles have a shape factor of 100-140 (spherical and potato shaped) (or 120-140 (e.g., potato shaped)).

Embodiment C-27 is the method of any of the preceding embodiments, wherein the powder polymer particles have a compressibility index of 1 to 20 (or 1 to 10, 11 to 15, or 16 to 20), and a Haussner Ratio of 1.00 to 1.25 (or 1.00 to 1.11, 1.12 to 1.18, or 1.19 to 1.25).

Embodiment C-28 is the method of any of the preceding embodiments, wherein the powder polymer particles comprise a thermoplastic polymer.

Embodiment C-29 is the method of any of the preceding embodiments, wherein the powder polymer particles comprise a polymer having a melt flow index greater than 15 grams/10 minutes, greater than 50 grams/10 minutes, or greater than 100 grams/10 minutes, and in certain embodiments, a melt flow index of up to 200 grams/10 minutes, or up to 150 grams/10 minutes.

Embodiment C-30 is the method of any of the preceding embodiments, wherein the powder polymer particles comprise an amorphous polymer having a glass transition temperature (Tg) of at least 0° C., at least 30° C., at least 40° C., at least 50° C., at least 60° C., or at least 70° C.

Embodiment C-31 is the method of any of the preceding embodiments, wherein the powder polymer particles comprise an amorphous polymer having a Tg of up to 150° C., up to 125° C., up to 110° C., up to 100° C., or up to 80° C. Embodiment C-32 is the method of any of the preceding embodiments, wherein the hardened coating does not have any detectable Tg.

Embodiment C-33 is the method of any of the preceding embodiments, wherein the powder polymer particles comprise a crystalline or semi-crystalline polymer having a melting point of at least 40° C. and up to 130° C.

Embodiment C-34 is the method of any of the preceding embodiments, wherein the powder polymer particles comprise a polymer selected from a polyacrylic, polyether, polyolefin, polyester, polyurethane, polycarbonate, polystyrene, or a combination thereof (i.e., copolymer or mixture thereof such as acrylonitrile butadiene styrene). Preferably, the polymer is selected from a polyacrylic, polyether, polyolefin, polyester, or a combination thereof.

Embodiment C-35 is the method of any of the preceding embodiments, wherein the polymer Mn is at least 5,000 Daltons, at least 10,000 Daltons, or at least 15,000 Daltons.

Embodiment C-36 is the method of any of the preceding embodiments, wherein the polymer Mn is up to 10,000,000 Daltons, up to 1,000,000 Daltons, up to 100,000 Daltons, or up to 20,00 Daltons.

Embodiment C-37 is the method of any of the preceding embodiments, wherein the polymer has a polydispersity index (Mw/Mn) of less than 4, less than 3, less than 2, or less than 1.5.

Embodiment C-38 is the method of any of Embodiments C-4 through C-37, wherein the one or more charge control agents enable the powder polymer particles to efficiently accept a triboelectric charge to facilitate application to a substrate.

Embodiment C-39 is the method of any of Embodiments C-4 through C-38, wherein the one or more charge control agents comprise particles having particle sizes in the submicron range (e.g., less than 1 micron, 100 nanometers or less, 50 nanometers or less, or 20 nanometers or less).

Embodiment C-40 is the method of any of Embodiments C-4 through C-39, wherein the one or more charge control agents comprise inorganic particles.

Embodiment C-41 is the method of any of Embodiments C-4 through C-40, wherein the one or more charge control agents comprise hydrophilic fumed aluminum oxide particles, hydrophilic precipitated sodium aluminum silicate particles, metal carboxylate and sulfonate particles, quaternary ammonium salts (e.g., quaternary ammonium sulfate or sulfonate particles), polymers containing pendant quaternary ammonium salts, ferromagnetic particles, transition metal particles, nitrosine or azine dyes, copper phthalocyanine pigments, metal complexes of chromium, zinc, aluminum, zirconium, calcium, or combinations thereof.

Embodiment C-42 is the method of any of the preceding embodiments, wherein the powder coating composition comprises one or more optional additives selected from lubricants, adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, metal driers, and combinations thereof.

Embodiment C-43 is the method of Embodiment C-42, wherein the powder coating composition further comprises one or more lubricants, which is incorporated into the hardened coating.

Embodiment C-44 is the method of any of the previous embodiments, further comprising applying one or more lubricants to the hardened coating.

Embodiment C-45 is the method of Embodiment C-43 or C-44, wherein the one or more lubricants are present in or on the hardened coating in an amount of at least 0.1 wt-%, at least 0.5 wt-%, or at least 1 wt-%, based on the total weight of the hardened coating.

Embodiment C-46 is the method of any of Embodiments C-43 through C-45, wherein the one or more lubricants are present in or on the hardened coating in an amount of up to 4 wt-%, up to 3 wt-%, or up to 2 wt-%, based on the total weight of the hardened coating.

Embodiment C-47 is the method of any of the preceding embodiments, wherein the powder polymer particles comprise agglomerates (i.e., clusters) of primary polymer particles.

Embodiment C-48 is the method of any of the preceding embodiments, wherein the powder coating composition is substantially free of each of bisphenol A, bisphenol F, and bisphenol S, structural units derived therefrom, or both.

Embodiment C-49 is the method of any of the preceding embodiments, wherein the powder coating composition is substantially free of all bisphenol compounds, structural units derived therefrom, or both, except for TMBPF.

Embodiment C-50 is the method of any of the preceding embodiments, wherein the coating includes less than 50 ppm, less than 25 ppm, less than 10 ppm, or less than 1 ppm, extractables, if any, when tested pursuant to the Global Extraction Test.

Embodiment C-51 is the method of any of the preceding embodiments, wherein the adherent coating adheres to a substrate, such as a metal substrate, according to the Adhesion Test with an adhesion rating of 9 or 10, preferably 10.

Embodiment C-52 is the method of any of the preceding embodiments, wherein the continuous hardened coating is free of pinholes and other coating defects that result in exposed substrate. Such film imperfections/failures can be indicated by a current flow measured in milliamps (mA) using the Flat Panel Continuity Test described in the Examples Section.

Embodiment C-53 is the method of any of the preceding embodiments, wherein the powder coating composition which, when applied to a cleaned and pretreated aluminum panel and subjected to a curative bake for an appropriate duration to achieve a 242° C. peak metal temperature (PMT) and a dried film thickness of approximately 7.5 milligram per square inch and formed into a fully converted 202 standard opening beverage can end, passes less than 5 milliamps of current while being exposed for 4 seconds to an electrolyte solution containing 1% by weight of NaCl dissolved in deionized water.

Embodiment C-54 is a coated metal substrate having a surface at least partially coated with a coating prepared by the method of any of the preceding embodiments.

Embodiment C-55 is metal packaging (e.g., a metal packaging container such as a food, beverage, aerosol, or general packaging container (e.g., can), a portion thereof, or a metal closure) comprising a metal substrate having a surface at least partially coated with a coating prepared by the method of any of embodiments C-1 through C-53.

Embodiment C-56 is the metal packaging of embodiment C-55, wherein the surface is an interior surface, an exterior surface, or both, of a container (e.g., can) body.

Embodiment C-57 is the metal packaging of embodiment C-55, wherein the surface is a surface of a riveted can end and/or a pull tab.

Embodiment C-58 is the metal packaging of embodiments C-55 to C-57, which is filled with a food, beverage, or aerosol product.

Embodiments D: Coated Metal Substrate

Embodiment D-1 is a coated metal substrate comprising a metal substrate having a hardened continuous adherent coating disposed on at least a portion of a surface thereof, wherein: the metal substrate has an average thickness of up to 635 microns; the hardened continuous adherent coating has an average thickness of up to 100 microns (preferably up to 50 microns, more preferably up to 25 microns, even more preferably up to 20 microns, still more preferably up to 15 microns, and most preferably up to 10 microns); the hardened continuous adherent coating is formed from a metal packaging can powder coating composition comprising powder polymer particles (preferably, spray dried powder polymer particles) comprising a polymer having a number average molecular weight of at least 2000 Daltons, wherein the powder polymer particles have a particle size distribution having a D50 of less than 25 microns; and preferably the hardened continuous adherent coating comprises less than 50 ppm, less than 25 ppm, less than 10 ppm, or less than 1 ppm, extractables, if any, when tested pursuant to the Global Extraction Test.

Embodiment D-2 is the coated metal substrate of embodiment D-1, wherein a lubricant is present in the powder polymer particles, on the powder polymer particles, in another ingredient used to form the powder coating composition, on a surface of the hardened coating, or a combination thereof.

Embodiment D-3 is the coated metal substrate of Embodiment D-2, wherein the lubricant is present in an amount of at least 0.1 wt-%, or at least 0.5 wt-%, or at least 1 wt-%, based on the total weight of the powder coating composition or hardened coating.

Embodiment D-4 is the coated metal substrate of Embodiments D-2 or D-3, wherein the lubricant is present in an amount of up to 4 wt-%, or up to 3 wt-%, or up to 2 wt-%, based on the total weight of the powder coating composition or hardened coating.

Embodiment D-5 is the coated metal substrate of any of the previous embodiments, wherein the powder coating composition comprises at least 50 wt-%, at least 60 wt-%, at least 70 wt-%, at least 80 wt-%, or at least 90 wt-% of the powder polymer particles, based on the total weight of the powder coating composition.

Embodiment D-6 is the coated metal substrate of any of the previous embodiments, wherein the powder coating composition comprises up to 100 wt-%, up to 99.99 wt-%, up to 95 wt-%, or up to 90 wt-%, of the powder polymer particles, based on the total weight of the powder coating composition.

Embodiment D-7 is the coated metal substrate of any of the preceding embodiments, wherein the powder coating composition comprises one or more charge control agents in contact with the powder polymer particles.

Embodiment D-8 is the coated metal substrate of Embodiment D-7, wherein the powder coating composition comprises at least 0.01 wt-%, at least 0.1 wt-%, or at least 1 wt-%, of the one or more charge control agents, based on the total weight of the powder coating composition.

Embodiment D-9 is the coated metal substrate of Embodiment D-7 or D-8, wherein the powder coating composition comprises up to 10 wt-%, up to 9 wt-%, up to 8 wt-%, up to 7 wt-%, up to 6 wt-%, up to 5 wt-%, up to 4 wt-%, or up to 3 wt-%, of the one or more charge control agents, based on the total weight of the powder coating composition.

Embodiment D-10 is the coated metal substrate of any of the preceding embodiments, wherein the metal substrate comprises steel, stainless steel, tin-free steel (TFS), tin-plated steel, electrolytic tin plate (ETP), or aluminum.

Embodiment D-11 is the coated metal substrate of any of the preceding embodiments, wherein the metal substrate has an average thickness of up to 375 microns.

Embodiment D-12 is the coated metal substrate of any of the preceding embodiments, wherein the metal substrate has an average thickness of at least 125 microns.

Embodiment D-13 is the coated metal substrate of any of the preceding embodiments, wherein the hardened adherent coating has an average thickness of up to 25 microns, up to 20 microns, up to 15 microns, or up to 10 microns.

Embodiment D-14 is the coated metal substrate of any of the preceding embodiments, wherein the hardened adherent coating has an average thickness of at least 1 micron, at least 2 microns, at least 3 microns, or at least 4 microns.

Embodiment D-15 is the coated metal substrate of any of the preceding embodiments, wherein the powder polymer particles have a particle size distribution having a D50 of less than 20 microns, less than 15 microns, or less than 10 microns.

Embodiment D-16 is the coated metal substrate of any of the preceding embodiments, wherein the powder polymer particles have a particle size distribution having a D90 of less than 25 microns, less than 20 microns, less than 15 microns, or less than 10 microns.

Embodiment D-17 is the coated metal substrate of any of the preceding embodiments, wherein the powder polymer particles are chemically produced (as opposed to mechanically produced (e.g., ground) polymer particles).

Embodiment D-18 is the coated metal substrate of any of the preceding embodiments, wherein the powder polymer particles have a shape factor of 100-140 (spherical and potato shaped) (or 120-140 (e.g., potato shaped)).

Embodiment D-19 is the coated metal substrate of any of the preceding embodiments, wherein the powder polymer particles have a compressibility index of 1 to 20 (or 1 to 10, 11 to 15, or 16 to 20).

Embodiment D-20 is the coated metal substrate of any of the preceding embodiments, wherein the powder polymer particles have a Haussner Ratio of 1.00 to 1.25 (or 1.00 to 1.11, 1.12 to 1.18, or 1.19 to 1.25).

Embodiment D-21 is the coated metal substrate of any of the preceding embodiments, wherein the powder polymer particles comprise a thermoplastic polymer.

Embodiment D-22 is the coated metal substrate of any of the preceding embodiments, wherein the powder polymer particles comprise a polymer having a melt flow index greater than 15 grams/10 minutes, greater than 50 grams/10 minutes, or greater than 100 grams/10 minutes, and in certain embodiments, a melt flow index of up to 200 grams/10 minutes, or up to 150 grams/10 minutes.

Embodiment D-23 is the coated metal substrate of any of the preceding embodiments, wherein the powder polymer particles comprise an amorphous polymer having a glass transition temperature (Tg) of at least 0° C., at least 30° C., at least 40° C., at least 50° C., at least 60° C., or at least 70° C.

Embodiment D-24 is the coated metal substrate of any of the preceding embodiments, wherein the powder polymer particles comprise an amorphous polymer having a Tg of up to 150° C., up to 125° C., up to 110° C., up to 100° C., or up to 80° C.

Embodiment D-25 is the coated metal substrate of any of the preceding embodiments, wherein the hardened coating does not have any detectable Tg.

Embodiment D-26 is the coated metal substrate of any of the preceding embodiments, wherein the powder polymer particles comprise a crystalline or semi-crystalline polymer having a melting point of at least 40° C. and up to 130° C.

Embodiment D-27 is the coated metal substrate of any of the preceding embodiments, wherein the powder polymer particles comprise a polymer selected from a polyacrylic, polyether, polyolefin, polyester, polyurethane, polycarbonate, polystyrene, or a combination thereof (i.e., copolymer or mixture thereof such as acrylonitrile butadiene styrene). Preferably, the polymer is selected from a polyacrylic, polyether, polyolefin, polyester, or a combination thereof.

Embodiment D-28 is the coated metal substrate of any of the preceding embodiments, wherein the polymer Mn is at least 5,000 Daltons, at least 10,000 Daltons, or at least 15,000 Daltons.

Embodiment D-29 is the coated metal substrate of any of the preceding embodiments, wherein the polymer Mn is up to 10,000,000 Daltons, up to 1,000,000 Daltons, up to 100,000 Daltons, or up to 20,00 Daltons.

Embodiment D-30 is the coated metal substrate of any of the preceding embodiments, wherein the polymer has a polydispersity index (Mw/Mn) of less than 4, less than 3, less than 2, or less than 1.5.

Embodiment D-31 is the coated metal substrate of any of Embodiments D-7 through D-30, wherein the one or more charge control agents enable the powder polymer particles to efficiently accept a triboelectric charge to facilitate application to a substrate.

Embodiment D-32 is the coated metal substrate of any of Embodiments D-7 through D-31, wherein the one or more charge control agents comprise particles having particle sizes in the sub-micron range (e.g., less than 1 micron, 100 nanometers or less, 50 nanometers or less, or 20 nanometers or less).

Embodiment D-33 is the coated metal substrate of any of Embodiments D-7 through D-32, wherein the one or more charge control agents comprise inorganic particles.

Embodiment D-34 is the coated metal substrate of any of Embodiments D-7 through D-33, wherein the one or more charge control agents comprise hydrophilic fumed aluminum oxide particles, hydrophilic precipitated sodium aluminum silicate particles, metal carboxylate and sulfonate particles, quaternary ammonium salts (e.g., quaternary ammonium sulfate or sulfonate particles), polymers containing pendant quaternary ammonium salts, ferromagnetic particles, transition metal particles, nitrosine or azine dyes, copper phthalocyanine pigments, metal complexes of chromium, zinc, aluminum, zirconium, calcium, or combinations thereof.

Embodiment D-35 is the coated metal substrate of any of the preceding embodiments, wherein the powder coating composition comprises one or more optional additives selected from adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, metal driers, and combinations thereof.

Embodiment D-36 is the coated metal substrate of any of the preceding embodiments, wherein the powder polymer particles comprise agglomerates (i.e., clusters) of primary polymer particles.

Embodiment D-37 is the coated metal substrate of Embodiment D-36, wherein the agglomerates have a particle size of 1 micron to 25 microns.

Embodiment D-38 is the coated metal substrate of Embodiment D-36 or D-37, wherein the primary polymer particles have a primary particle size of 0.05 micron to 8 microns.

Embodiment D-39 is the coated metal substrate of any of the preceding embodiments, wherein the powder coating composition is substantially free of each of bisphenol A, bisphenol F, and bisphenol S, structural units derived therefrom, or both.

Embodiment D-40 is the coated metal substrate of any of the preceding embodiments, wherein the powder coating composition is substantially free of all bisphenol compounds, structural units derived therefrom, or both, except for TMBPF.

Embodiment D-41 is the coated metal substrate of any of the preceding embodiments, wherein the adherent coating adheres to the metal substrate according to the Adhesion Test with an adhesion rating of 9 or 10, preferably 10.

Embodiment D-42 is the coated metal substrate of any of the preceding embodiments, wherein the continuous hardened coating is free of pinholes and other coating defects that result in exposed substrate. Such film imperfections/failures can be indicated by a current flow measured in milliamps (mA) using the Flat Panel Continuity Test described in the Examples Section.

Embodiment D-43 is the coated metal substrate of any of the preceding embodiments, wherein the powder coating composition which, when applied to a cleaned and pretreated aluminum panel and subjected to a curative bake for an appropriate duration to achieve a 242° C. peak metal temperature (PMT) and a dried film thickness of approximately 7.5 milligram per square inch and formed into a fully converted 202 standard opening beverage can end, passes less than 5 milliamps of current while being exposed for 4 seconds to an electrolyte solution containing 1% by weight of NaCl dissolved in deionized water.

Embodiment D-44 is the coated metal substrate of any of the preceding embodiment, wherein the metal substrate comprises a pre-treated or primed substrate.

Embodiment D-45 is metal packaging (e.g., a metal packaging container, a portion thereof, or a metal closure) comprising a coated metal substrate of any of the preceding embodiments.

Embodiment D-46 is the metal packaging of Embodiment 45, wherein the coated surface of the metal substrate forms an interior surface of a can body.

Embodiment D-47 is the metal packaging of Embodiment D-45 or D-46, wherein the coated surface of the metal substrate forms an exterior surface of a can body.

Embodiment D-48 is the metal packaging of Embodiment 45, wherein the coated surface is a surface of a riveted can end and/or a pull tab.

Embodiment D-49 is the metal packaging of Embodiments D-45 through D-48, wherein the can is filled with a food, beverage, or aerosol product.

Embodiments E: Method of Making Metal Packaging

Embodiment E-1 is a method of making metal packaging (e.g., a metal packaging container such as a food, beverage, aerosol, or general packaging container (e.g., can), a portion thereof, or a metal closure such as for a metal packaging container or a glass jar), the method comprising: providing a metal substrate having a hardened continuous adherent coating disposed on at least a portion of a surface thereof, wherein: the metal substrate has an average thickness of up to 635 microns; the hardened continuous adherent coating is formed from a metal packaging powder coating composition; wherein the powder coating composition comprises powder polymer particles (preferably, spray dried powder polymer particles) comprising a polymer having a number average molecular weight of at least 2000 Daltons, wherein the powder polymer particles have a particle size distribution having a D50 of less than 25 microns; and forming the substrate into at least a portion of a metal packaging container (e.g., a food, beverage, aerosol, or general packaging container (e.g., can)), a portion thereof, or a metal closure (e.g., for a metal packaging container or a glass jar).

Embodiment E-2 is the method of embodiment E-1, wherein a lubricant is present in the powder polymer particles, on the powder polymer particles, in another ingredient used to form the powder coating composition, on a surface of the hardened coating, or a combination thereof.

Embodiment E-3 is the method of Embodiment E-2, wherein the lubricant is present in an amount of at least 0.1 wt-%, or at least 0.5 wt-%, or at least 1 wt-%, based on the total weight of the powder coating composition or hardened coating.

Embodiment E-4 is the method of Embodiments E-2 or E-3, wherein the lubricant is present in an amount of up to 4 wt-%, or up to 3 wt-%, or up to 2 wt-%, based on the total weight of the powder coating composition or hardened coating.

Embodiment E-5 is the method of any of the previous embodiments, wherein the powder coating composition comprises at least 50 wt-%, at least 60 wt-%, at least 70 wt-%, at least 80 wt-%, or at least 90 wt-% of the powder polymer particles, based on the total weight of the powder coating composition.

Embodiment E-6 is the method of any of the previous embodiments, wherein the powder coating composition comprises up to 100 wt-%, up to 99.99 wt-%, up to 95 wt-%, or up to 90 wt-%, of the powder polymer particles, based on the total weight of the powder coating composition.

Embodiment E-7 is the method of any of the preceding embodiments, wherein the powder coating composition comprises one or more charge control agents in contact with the powder polymer particles.

Embodiment E-8 is the method of Embodiment E-7, wherein the powder coating composition comprises at least 0.01 wt-%, at least 0.1 wt-%, or at least 1 wt-%, of the one or more charge control agents, based on the total weight of the powder coating composition.

Embodiment E-9 is the method of Embodiment E-7 or E-8, wherein the powder coating composition comprises up to 10 wt-%, up to 9 wt-%, up to 8 wt-%, up to 7 wt-%, up to 6 wt-%, up to 5 wt-%, up to 4 wt-%, or up to 3 wt-%, of the one or more charge control agents, based on the total weight of the powder coating composition.

Embodiment E-10 is the method of any of the preceding embodiments, wherein the metal substrate comprises steel, stainless steel, tin-free steel (TFS), tin-plated steel, electrolytic tin plate (ETP), or aluminum.

Embodiment E-11 is the method of any of the preceding embodiments, wherein the metal substrate has an average thickness of up to 375 microns.

Embodiment E-12 is the method of any of the preceding embodiments, wherein the metal substrate has an average thickness of at least 125 microns.

Embodiment E-13 is the method of any of the preceding embodiments, wherein the hardened adherent coating has an average thickness of up to 100 microns (preferably up to 50 microns, more preferably up to 25 microns, even more preferably up to 20 microns, still more preferably up to 15 microns, and most preferably up to 10 microns).

Embodiment E-14 is the method of any of the preceding embodiments, wherein the hardened adherent coating has an average thickness of at least 1 micron, at least 2 microns, at least 3 microns, or at least 4 microns.

Embodiment E-15 is the method of any of the preceding embodiments, wherein the powder polymer particles have a particle size distribution having a D50 of less than 20 microns, less than 15 microns, or less than 10 microns.

Embodiment E-16 is the method of any of the preceding embodiments, wherein the powder polymer particles have a particle size distribution having a D90 of less than 25 microns, less than 20 microns, less than 15 microns, or less than 10 microns.

Embodiment E-17 is the method of any of the preceding embodiments, wherein the powder polymer particles are chemically produced (as opposed to mechanically produced (e.g., ground) polymer particles).

Embodiment E-18 is the method of any of the preceding embodiments, wherein the powder polymer particles have a shape factor of 100-140 (spherical and potato shaped) (or 120-140 (e.g., potato shaped)).

Embodiment E-19 is the method of any of the preceding embodiments, wherein the powder polymer particles have a compressibility index of 1 to 20 (or 1 to 10, 11 to 15, or 16 to 20).

Embodiment E-20 is the method of any of the preceding embodiments, wherein the powder polymer particles have a Haussner Ratio of 1.00 to 1.25 (or 1.00 to 1.11, 1.12 to 1.18, or 1.19 to 1.25).

Embodiment E-21 is the method of any of the preceding embodiments, wherein the powder polymer particles comprise a thermoplastic polymer.

Embodiment E-22 is the method of any of the preceding embodiments, wherein the powder polymer particles comprise a polymer having a melt flow index greater than 15 grams/10 minutes, greater than 50 grams/10 minutes, or greater than 100 grams/10 minutes, and in certain embodiments, a melt flow index of up to 200 grams/10 minutes, or up to 150 grams/10 minutes.

Embodiment E-23 is the method of any of the preceding embodiments, wherein the powder polymer particles comprise an amorphous polymer having a glass transition temperature (Tg) of at least 0° C., at least 30° C., at least 40° C., at least 50° C., at least 60° C., or at least 70° C.

Embodiment E-24 is the method of any of the preceding embodiments, wherein the powder polymer particles comprise an amorphous polymer having a Tg of up to 150° C., up to 125° C., up to 110° C., up to 100° C., or up to 80° C.

Embodiment E-25 is the method of any of the preceding embodiments, wherein the hardened coating does not have any detectable Tg.

Embodiment E-26 is the method of any of the preceding embodiments, wherein the powder polymer particles comprise a crystalline or semi-crystalline polymer having a melting point of at least 40° C. and up to 130° C.

Embodiment E-27 is the method of any of the preceding embodiments, wherein the powder polymer particles comprise a polymer selected from an acrylic (i.e., acrylate), polyether, polyolefin, polyester, polyurethane, polyurethane, polycarbonate, polystyrene, or a combination thereof (i.e., copolymer or mixture thereof such as acrylonitrile butadiene styrene).

Embodiment E-28 is the method of any of the preceding embodiments, wherein the polymer Mn is at least 5,000 Daltons, at least 10,000 Daltons, or at least 15,000 Daltons.

Embodiment E-29 is the method of any of the preceding embodiments, wherein the polymer Mn is up to 10,000,000 Daltons, up to 1,000,000 Daltons, up to 100,000 Daltons, or up to 20,00 Daltons.

Embodiment E-30 is the method of any of the preceding embodiments, wherein the polymer has a polydispersity index (Mw/Mn) of less than 4, less than 3, less than 2, or less than 1.5.

Embodiment E-31 is the method of any of Embodiments E-7 through E-30, wherein the one or more charge control agents enable the powder polymer particles to efficiently accept a triboelectric charge to facilitate application to a substrate.

Embodiment E-32 is the method of any of Embodiments E-7 through E-31, wherein the one or more charge control agents comprise particles having particle sizes in the submicron range (e.g., less than 1 micron, 100 nanometers or less, 50 nanometers or less, or 20 nanometers or less).

Embodiment E-33 is the method of any of Embodiments E-7 through E-32, wherein the one or more charge control agents comprise inorganic particles.

Embodiment E-34 is the method of any of Embodiment E-7 through E-33, wherein the one or more charge control agents comprise hydrophilic fumed aluminum oxide particles, hydrophilic precipitated sodium aluminum silicate particles, metal carboxylate and sulfonate particles, quaternary ammonium salts (e.g., quaternary ammonium sulfate or sulfonate particles), polymers containing pendant quaternary ammonium salts, ferromagnetic particles, transition metal particles, nitrosine or azine dyes, copper phthalocyanine pigments, metal complexes of chromium, zinc, aluminum, zirconium, calcium, or combinations thereof.

Embodiment E-35 is the method of any of the preceding embodiments, wherein the powder coating composition comprises one or more optional additives selected from adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, and combinations thereof.

Embodiment E-36 is the method of any of the preceding embodiments, wherein the powder polymer particles comprise agglomerates (i.e., clusters) of primary polymer particles.

Embodiment E-37 is the method of Embodiment E-36, wherein the agglomerates have a particle size of 1 micron to 25 microns.

Embodiment E-38 is the method of Embodiment E-36 or E-37, wherein the primary polymer particles have a primary particle size of 0.05 micron to 8 microns.

Embodiment E-39 is the method of any of the preceding embodiments, wherein the powder coating composition is substantially free of bisphenol A, bisphenol F, and bisphenol S, structural units derived therefrom, or both.

Embodiment E-40 is the method of any of the preceding embodiments, wherein the powder coating composition is substantially free of all bisphenol compounds, structural units derived therefrom, or both, except for TMBPF.

Embodiment E-41 is the method of any of the preceding embodiments wherein the hardened continuous adherent coating comprises less than 50 ppm, less than 25 ppm, less than 10 ppm, or less than 1 ppm, extractables, if any, when tested pursuant to the Global Extraction Test.

Embodiment E-42 is the method of any of the preceding embodiments, wherein the adherent coating adheres to the metal substrate according to the Adhesion Test with an adhesion rating of 9 or 10, preferably 10.

Embodiment E-43 is the method of any of the preceding embodiments, wherein the continuous hardened coating is free of pinholes and other coating defects that result in exposed substrate. Such film imperfections/failures can be indicated by a current flow measured in milliamps (mA) using the Flat Panel Continuity Test described in the Examples Section.

Embodiment E-44 is the method of any of the preceding embodiments, wherein the powder coating composition which, when applied to a cleaned and pretreated aluminum panel and subjected to a curative bake for an appropriate duration to achieve a 242° C. peak metal temperature (PMT) and a dried film thickness of approximately 7.5 milligram per square inch and formed into a fully converted 202 standard opening beverage can end, passes less than 5 milliamps of current while being exposed for 4 seconds to an electrolyte solution containing 1% by weight of NaCl dissolved in deionized water.

EXAMPLES

These Examples are merely for illustrative purposes and are not meant to be overly limiting on the scope of the appended embodiments. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the embodiments, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods. The following abbreviations may be used in the following examples: ppm=parts per million; phr=parts per hundred rubber; mL=milliliter; L=liter; m=meter, mm=millimeter, cm=centimeter, kg=kilogram, g=gram, min=minute, s=second, hrs=hour, ° C.=degrees Celsius, ° F.=degrees Farenheit, MPa=megapascals, and N-m=Newton-meter, Mn=number average molecular weight, cP=centipoise.

Test Methods

Unless indicated otherwise, the following test methods may be utilized.

Adhesion Test

Adhesion testing was performed according to ASTM D 3359-17 (2017), Test Method B, for coatings ≤125 microns thick, using SCOTCH 610 tape (available from 3M Company of Saint Paul, MN) and a lattice pattern consisting of 4 scratches across and 4 scratches down (roughly 1-2 mm apart). The test is typically repeated 3 times per sample. Adhesion is rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 9 or 10 are typically desired for commercially viable coatings. Thus, herein, an adhesion rating of 9 or 10, preferably 10, is considered to be adherent.

Differential Scanning calorimetry for Tg

Samples of powder composition for differential scanning calorimetry ("DSC") testing are weighed into standard sample pans, and analyzed using the standard DSC heat-cool-heat method. The samples are equilibrated at −60° C., then heated at 20° C. per minute to 200° C., cooled to −60° C., and then heated again at 20° C. per minute to 200° C. Glass transition temperatures are calculated from the thermogram of the last heat cycle. The glass transition is measured at the inflection point of the transition.

Molecular Weight Determination by Gel Permeation Chromatography

Samples for Gel Permeation Chromatography ("GPC") testing are prepared by first dissolving the powder polymer in a suitable solvent (e.g., THF if appropriate for a given powder polymer). An aliquot of this solution is then analyzed by GPC along with mixtures of polystyrene ("PS")

standards. The molecular weights of the samples are calculated after processing the GPC runs and verifying the standards.

Global Extraction Test

The global extraction test is designed to estimate the total amount of mobile material that can potentially migrate out of a coating and into food packed in a coated can. Typically, a coated substrate is subjected to water or solvent blends under a variety of conditions to simulate a given end-use.

Acceptable extraction conditions and media can be found in 21 CFR § 175.300, paragraphs (d) and (e). The extraction procedure used in the current invention was conducted in accordance with the Food and Drug Administration (FDA) "Preparation of Premarket Submission for Food Contact Substances: Chemistry Recommendations," (December 2007). The allowable global extraction limit as defined by the FDA regulation is 50 parts per million (ppm).

The single-sided extraction cells are made according to the design found in the Journal of the Association of Official Agricultural Chemists, 47(2):387(1964), with minor modifications. The cell is 9 in (inches)×9 in×0.5 in with a 6 in×6 in open area in the center of the TEFLON spacer. This allows for 36 in² or 72 in² of test article to be exposed to the food simulating solvent. The cell holds 300 mL of food simulating solvent. The ratio of solvent to surface area is then 8.33 mL/in² and 4.16 mL/in² when 36 in² and 72 in² respectively of test article are exposed.

For the purpose of this invention, the test articles consist of 0.0082-inch-thick 5182 aluminum alloy panels, pretreated with Permatreat® 1903 (supplied by Chemetall GmbH, Frankfurt am Main, Germany). These panels are coated with the test coating (completely covering at least the 6 in×6 in area required to fit the test cell) to yield a final, dry film thickness of 11 grams per square meter (gsm) following a 10 second curative bake resulting in a 242° C. peak metal temperature (PMT). Two test articles are used per cell for a total surface area of 72 in² per cell. The test articles are extracted in quadruplicate using 10% aqueous ethanol as the food-simulating solvent. The test articles are processed at 121° C. for two hours, and then stored at 40° C. for 238 hours. The test solutions are sampled after 2, 24, 96 and 240 hours. The test article is extracted in quadruplicate using the 10% aqueous ethanol under the conditions listed above.

Each test solution is evaporated to dryness in a pre-weighed 50 mL beaker by heating on a hot plate. Each beaker is dried in a 250° F. (121° C.) oven for a minimum of 30 minutes. The beakers are then placed into a desiccator to cool and then weighed to a constant weight. Constant weight is defined as three successive weighings that differ by no more than 0.00005 g.

Solvent blanks using Teflon sheet in extraction cells are similarly exposed to simulant and evaporated to constant weight to correct the test article extractive residue weights for extractive residue added by the solvent itself. Two solvent blanks are extracted at each time point and the average weight is used for correction.

Total nonvolatile extractives are calculated as follows:

$$E_x = \frac{e}{s}$$

where: Ex=Extractive residues (mg/in²)
e=Extractives per replicate tested (mg)
s Area extracted (in²)

Preferred coatings give global extraction results of less than 50 ppm, less than 25 ppm, than 10 ppm, or less than 1 ppm. Most preferably, the global extraction results are optimally non-detectable.

Flat Panel Continuity Test

This test measures the continuity of a coating applied to a flat metal substrate and indicates the presence or absence of a continuous film, largely free of pores, cracks, or other defects that could expose the metal substrate. This method may be used for both laboratory and commercially coated steel and aluminum substrates. A test assembly is employed that consists of: a non-conducting, solid base (large enough to support the test panel); a hinged clamping mechanism that is mounted to the base; a non-conductive electrolyte holding cell, connected to the clamping mechanism in such a way that it can be lowered and sealed onto the test panel (resulting in a 6 inch-diameter, circular area on the test panel being exposed to the electrolyte); a hole in the electrolyte holding cell large enough to fill the cell with electrolyte; and an electrode inserted into the electrolyte holding cell. A WACO Enamel Rater II (available from the Wilkens-Anderson Company, Chicago, IL), with an output voltage of 6.3 volts is used in conjunction with the test assembly (as described below) to measure metal exposure in the form of electrical current. The electrolyte solution used in the following test consists of 1%-by-weight Sodium Chloride dissolved in deionized water.

An 8-inch by 8-inch panel of metal is coated and cured with the coating to be tested, as prescribed by the formula or technical data sheet. If no coating thickness or cure schedule is prescribed for the test coating, test panels should be coated in such a way to yield a final, dry film thickness of 11 grams per square meter (gsm) utilizing a curative bake with an appropriate duration to achieve a 242° C. peak metal temperature (PMT). Each test panel may only be used once and should be visibly free of scratches or abrasions. The test panel is placed in the test assembly with the test coating facing up. The electrolyte holding cell is then lowered onto the test panel and locked in place by closing the clamp. The positive lead wire from the enamel rater is connected to the edge of the panel in an area free of coating. A small area may need to be sanded or scraped to expose the bare metal substrate. The electrolyte cell is then filled with enough electrolyte solution to ensure contact with the cell's negative post. The negative lead wire from the enamel rater is connected to the negative post on top of the cell. Finally, the probe on the Waco enamel rater is lowered to activate the test current.

Film imperfections/failure will be indicated by a current flow measured in milliamps (mA). The initial milliamp reading is recorded for each panel tested, and results are reported in milliamps. If more than one determination per variable is run, the average reading is reported. Preferred coatings of the present invention pass less than 10 mA when tested as described above, more preferably less than 5 mA, most preferably less than 2 mA, and optimally less than 1 mA.

Flexibility Test

This test measures the ability of a coated substrate to retain its integrity as it undergoes the formation process necessary to produce a fabricated article such as a riveted beverage can end. It is a measure of the presence or absence of cracks or fractures in the formed end. The end is typically placed on a cup filled with an electrolyte solution. The cup is inverted to expose the surface of the end to the electrolyte solution. The intensity of the current that passes through the end is then measured. If the coating remains intact (no cracks or fractures) after fabrication, minimal current will pass through the end.

For the present evaluation, fully converted 202 standard opening beverage ends were exposed for a period of 4 seconds to a room-temperature electrolyte solution comprised of 1% NaCl by weight in deionized water. The coating to be evaluated was present on the interior surface of the beverage end at a dry film thickness of 6 to 7.5 milligrams per square inch ("msi") (or 9.3 to 11.6 grams per square meter), with 7 msi being the target thickness and having been cured as prescribed by the formula or technical data sheet. If no cure schedule is prescribed for the test coating, test panels should be coated utilizing a curative bake with an appropriate duration to achieve a 242° C. peak metal temperature (PMT). Metal exposure was measured using a WACO Enamel Rater II (available from the Wilkens-Anderson Company, Chicago, IL) with an output voltage of 6.3 volts. The measured electrical current intensity, in milliamps, is reported. End continuities are typically tested initially and then after the ends are subjected to pasteurization, Dowfax, or retort.

Preferred coatings of the present invention initially pass less than 10 milliamps (mA) when tested as described above, more preferably less than 5 mA, most preferably less than 2 mA, and optimally less than 1 mA. After pasteurization, Dowfax detergent test, or retort, preferred coatings give continuities of less than 20 mA, more preferably less than 10 mA, even more preferably less than 5 mA, and even more preferably less than 1 mA.

Preparation of Polyester Polymer Particles

The general procedure employed for polyester particles is described in Examples 1 or 3 of U.S. Pat. No. 9,920,217 (Skillman et al.). Dry powder having a suitable particle size distribution, shape factor, and the like is achieved, for example, via spray drying.

Preparation of Acrylic Polymer Particles

Preparation of Acid-Functional Acrylic Pre-Polymer A:

A premix of 2245.54 parts glacial methacrylic acid, 1496.93 parts styrene, 1247.41 parts ethyl acrylate (EA), 2345.70 parts n-butanol, 167.58 parts deionized water, and 299.34 parts t-butyl peroctoate are prepared in a premix vessel. To a 5-liter reaction vessel equipped with a stirrer, reflux condenser, thermocouple, heating and cooling capability, and inert gas blanket, 1778.65 parts n-butanol and 85.25 parts deionized water are added. With agitation and an inert gas blanket on, the reaction vessel is heated to 97° C. Once within the temperature range, 46.44 parts t-butyl peroctoate is added. Five minutes after the t-butyl peroctoate addition, the premix is added at a constant rate to the reaction vessel over two and a half hours maintaining the temperature range of 97° C. to 102° C. After the premix addition is complete, the premix vessel is rinsed with 118.63 parts n-butanol going into the reaction vessel. Immediately after rinsing, a second premix of 59.33 parts t-butyl peroctoate and 24.00 parts n-butanol is added to the reaction vessel over 60 minutes maintaining the temperature range. At the end of the addition, the premix vessel is rinsed into the reaction vessel with 22.00 parts n-butanol. Thirty minutes after rinsing the second premix vessel, 12.89 parts t-butyl peroctoate and 1.00 parts n-butanol are added to the reaction vessel. The reaction is allowed to proceed for an additional 2 hours at temperature. Following the hold, 47.32 parts deionized water is added and the reaction vessel cooled to less than 60° C. This process produces an acid functional acrylic pre-polymer with solids of approximately 50.0% nonvolatile mass (NVM), an acid number of approximately 290, and a Brookfield viscosity of approximately 25,000 centipoise at 80° F. (26.7° C.).

Preparation of Emulsion Polymer Using Acid-Functional Acrylic Pre-Polymer A as the Surfactant:

To a 5-liter reaction vessel equipped with a stirrer, reflux condenser, thermocouple, heating and cooling capability, and inert gas blanket, 326.7 parts A and 950.92 parts deionized water is added. With the agitation activated, the inert gas blanket on and system is set to partial reflux. To the vessel 39.3 parts 29% aqueous ammonium hydroxide is added. The temperature is set to 100° C. and the n-butanol is distilled under atmospheric pressure. Once n-butanol distillation subsided, the vessel is cooled to 50° C. and 314.85 part of deionized water is added to the vessel and heat is reengaged and set to 70° C. In the meantime a monomer premix of 214.76 parts styrene and 252.11 parts butyl acrylate (BA) is prepared. To the vessel 4.61 parts benzoin and 7.40 parts deionized water are added and temperature was set to 81° C. At temperature, 4.89 parts 35% hydrogen peroxide solution and 2.80 parts deionized water are added to the reaction vessel. The monomer premix is added exactly 5 minutes after hydrogen peroxide addition at a constant rate over 30 minutes. Following the monomer premix addition, 16.52 parts deionized water is added and the reaction is allowed to proceed for 10 minutes. Following the brief hold, 0.80 parts benzoin, 0.83 parts 35% hydrogen peroxide solution, and 5.55 parts deionized water are added to the reaction vessel. The reaction is allowed to proceed for another 45 minutes. At the end of this hold, 0.26 parts benzoin, 0.28 part 35% hydrogen peroxide solution, and 5.58 parts deionized water are added. The reaction once again is allowed to stir for 2 hours at temperature. The heat is disengaged at the end of the hold and 2.52 parts TRIGONOX A-W70, 0.35 parts iron complex solution, 1.74 parts erythorbic acid, 1.87 parts 29% aqueous ammonium hydroxide, and 17.74 parts deionized water is added to the vessel. The reaction is allowed to exotherm and cool to room temperature. This process produces an acrylic emulsion with solids of 31.3% NVM, and normal average particle size of 2.4 microns.

Preparation of Coating Composition Using Acrylic Emulsion Polymer

The acrylic emulsion is dried to form dry acrylic powder polymer particles by spray drying, for example, using a B-290 mini-spray drier from Buchi, which may optionally be further modified to prevent agglomeration. A hydrophobic silica charge control agent is added in an amount of 2-3 wt-%, based on the total weight of charge control agent and powder polymer particles. Aluminum oxide and aluminum hydroxide flow modifiers are added to enhance fluidity. The acrylic powder particles in the mixture are charged by friction between the particles and the surface of a doctor blade. The charge distribution may be assessed by using a charge spectrometer such as that available under the trade name ESPART by Hosokawa Micron Powder Systems (Osaka, Japan).

The coating composition is filled in a magnetic brush unit mounted at a distance of 2.5 millimeters (mm) from a rotating metal drum available as the 1 d-tester (developer life time tester) from Epping GmbH. On the rotating drum an aluminum sheet of 0.1 mm thickness is mounted. The rotation speed of the drum (i.e., coating speed) is 100 mm/minute, the speed of the magnetic brush is 130 meter/minute in the same direction as the drum. The doctor blade of the magnetic brush is adjusted to a distance of 1.5 mm to the magnetic roller. The magnetic pole is adjusted −10 degrees compared to the line between both rotating axes.

The development potential of the drum against the developer roller is set to 1000V. The coated aluminum sheet, obtained after one development step, is then cured in an oven at 200° C. to obtain a homogeneous powder coating with an average coating thickness of 25 microns and a tolerance of less than ±10%.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the embodiments set forth herein as follows.

What is claimed is:

1. A method comprising:
providing a metal packaging powder coating composition, wherein the powder coating composition comprises chemically produced powder polymer particles and magnetic carrier particles; wherein the powder polymer particles comprise a polymer having a number average molecular weight of at least 2000 Daltons, and wherein the powder polymer particles have a particle size distribution having a D50 of less than 20 microns;
directing the powder coating composition to at least a portion of a metal substrate, wherein the metal substrate is a metal substrate for forming metal packaging and has an average thickness of up to 635 microns; and
providing conditions effective for the powder coating composition to form a hardened continuous adherent coating on at least a portion of the metal substrate, wherein the hardened continuous adherent coating has an average thickness of up to 100 microns.

2. The method of claim 1, wherein the magnetic carrier particles are not transferred to the metal substrate.

3. The method of claim 1, wherein the magnetic carrier particles have a core comprising iron, steel, nickel, magnetite, $\gamma$-$Fe_2O_3$, or ferrites.

4. The method of claim 1, wherein the powder coating composition further comprises non-magnetic carrier particles.

5. The method of claim 1, wherein the chemically produced powder polymer particles comprise agglomerates of primary polymer particles.

6. The method of claim 1, wherein the powder coating composition further comprises one or more charge control agents in contact with the chemically produced powder polymer particles.

7. The method of claim 1, wherein the powder coating composition further comprises one or more lubricants, or the method further comprises applying one or more lubricants to the hardened coating.

8. The method of claim 1, wherein directing the powder coating composition to at least a portion of the metal substrate comprises:
feeding the powder coating composition to a transporter; and
directing the powder coating composition from the transporter to at least a portion of the metal substrate, by means of an electromagnetic field.

9. The method of claim 1, wherein the chemically produced powder polymer particles are spray dried powder polymer particles.

10. The method of claim 1, wherein the chemically produced powder polymer particles comprise a polymer selected from a polyacrylic, polyether, polyolefin, polyester, polyurethane, polycarbonate, polystyrene, or a combination thereof.

11. The method of claim 1, further comprising forming the substrate having the hardened continuous adherent coating thereon into at least a portion of a metal packaging container, a portion thereof, or a metal closure.

12. A method comprising:
providing a metal packaging powder coating composition, wherein the powder coating composition comprises chemically produced powder polymer particles and magnetic carrier particles; wherein the powder polymer particles comprise a polymer having a number average molecular weight of at least 2000 Daltons, wherein the powder polymer particles have a particle size distribution having a D50 of less than 20 microns;
directing the powder coating composition to at least a portion of a metal substrate, wherein the magnetic carrier particles are not transferred to the metal substrate, and wherein the metal substrate is a metal substrate for forming a food, beverage, or aerosol container, a portion thereof, or a metal closure, and has an average thickness of up to 635 microns; and
providing conditions effective for the powder coating composition to form a hardened continuous adherent coating on at least a portion of the metal substrate, wherein the hardened continuous adherent coating has an average thickness of up to 100 microns.

13. The method of claim 12, wherein the chemically produced powder polymer particles are spray dried powder polymer particles.

14. The method of claim 12, wherein the magnetic carrier particles have a core comprising iron, steel, nickel, magnetite, $\gamma$-$Fe_2O_3$, or ferrites.

15. The method of claim 12, wherein the powder coating composition further comprises one or more charge control agents in contact with the chemically produced powder polymer particles.

16. The method of claim 12, wherein the powder coating composition further comprises one or more lubricants, or the method further comprises applying one or more lubricants to the hardened coating.

17. The method of claim 12, wherein directing the powder coating composition to at least a portion of the metal substrate comprises:
feeding the powder coating composition to a transporter; and
directing the powder coating composition from the transporter to at least a portion of the metal substrate, by means of an electromagnetic field.

18. The method of claim 12, wherein the chemically produced powder polymer particles comprise a polymer selected from a polyacrylic, polyether, polyolefin, polyester, polyurethane, polycarbonate, polystyrene, or a combination thereof.

19. The method of claim 12, wherein the hardened continuous adherent coating includes less than 50 ppm of extractables, if any, when tested pursuant to a Global Extraction Test using an extraction procedure conducted in accordance with the Food and Drug Administration FDA "Preparation of Premarket Submission for Food Contact Substances: Chemistry Recommendations," (December 2007), and exhibits an adhesion rating of 9 or 10 when tested pursuant to ASTM D 3359-17 (2017), Test Method B, Adhesion Test.

20. The method of claim 12, wherein the hardened continuous adherent coating has an average thickness of up to 50 microns.

21. The method of claim 12, wherein the chemically produced powder polymer particles have a particle size distribution having a D90 of less than 20 microns.

22. The method of claim 12, wherein the chemically produced powder polymer particles comprise agglomerates of primary polymer particles.

23. A method of making metal packaging, the method comprising:
   providing a metal substrate having a hardened continuous adherent coating disposed on at least a portion of a surface thereof, wherein:
      the metal substrate has an average thickness of up to 635 microns; and
      the hardened continuous adherent coating is formed from a metal packaging powder coating composition; wherein the metal packaging powder coating composition comprises magnetic carrier particles and chemically produced powder polymer particles; wherein the powder polymer particles comprise a polymer having a number average molecular weight of at least 2000 Daltons, wherein the powder polymer particles have a particle size distribution having a D50 of less than 20 microns; and
   forming the substrate into at least a portion of a metal packaging container, a portion thereof, or a metal closure.

24. The method of claim 23, wherein the hardened continuous adherent coating disposed on at least a portion of a surface of the metal substrate does not include the magnetic carrier particles.

25. The method of claim 23, wherein the chemically produced powder polymer particles comprise a polymer selected from a polyacrylic, polyether, polyolefin, polyester, polyurethane, polycarbonate, polystyrene, or a combination thereof.

26. The method of claim 23, wherein forming comprises forming the substrate into a riveted can end.

27. The method of claim 23, wherein the chemically produced powder polymer particles comprise agglomerates of primary polymer particles.

28. The method of claim 23, wherein the chemically produced powder polymer particles are spray dried powder polymer particles.

* * * * *